(12) United States Patent
Wang et al.

(10) Patent No.: US 10,473,916 B2
(45) Date of Patent: Nov. 12, 2019

(54) MULTIPLE-VIEW COMPRESSED-SENSING ULTRAFAST PHOTOGRAPHY (MV-CUP)

(71) Applicant: Washington University, St. Louis, MO (US)

(72) Inventors: Lihong Wang, St. Louis, MO (US); Jinyang Liang, St. Louis, MO (US); Liren Zhu, St. Louis, MO (US); Cheng Ma, St. Louis, MO (US)

(73) Assignee: Washington University, St. Louis, MO (US)

( * ) Notice: Subject to any disclaimer, the term of this patent is extended or adjusted under 35 U.S.C. 154(b) by 386 days.

(21) Appl. No.: 15/441,207

(22) Filed: Feb. 23, 2017

(65) Prior Publication Data

US 2017/0163971 A1     Jun. 8, 2017

Related U.S. Application Data

(63) Continuation-in-part of application No. 15/505,853, filed as application No. PCT/US2015/053326 on Sep. 30, 2015.
(Continued)

(51) Int. Cl.
*G02B 26/08* (2006.01)
*H04N 13/218* (2018.01)
(Continued)

(52) U.S. Cl.
CPC ....... *G02B 26/0833* (2013.01); *H04N 13/218* (2018.05)

(58) Field of Classification Search
CPC ..... H04N 13/218; G01S 17/00; G01S 17/003; G01J 2011/005
See application file for complete search history.

(56) References Cited

U.S. PATENT DOCUMENTS 10,154,204 B2   12/2018   Yuan et al.
10,200,605 B2   2/2019    Yuan
(Continued)

FOREIGN PATENT DOCUMENTS

EP      0474264 A2      3/1992
WO      2012083206 A1   6/2012

OTHER PUBLICATIONS

Velten, A. et al. Recovering three-dimensional shape around a corner using ultrafast time-of-flight imaging. Nature Communications 3:745 doi: 10.1038/ncomms1747. (Year: 2012).*
(Continued)

*Primary Examiner* — Eric L Bolda
(74) *Attorney, Agent, or Firm* — Armstrong Teasdale LLP

(57) ABSTRACT

A system and method for compressed-sensing ultrafast photography for two-dimensional dynamic imaging is disclosed. The system and method may capture non-repetitive time-evolving events at up to about 100 billion frames per second. In an aspect, a digital micromirror device (DMD) may be added as the spatial encoding module. By using the DMD and applying the CUP reconstruction algorithm, a conventional 1D streak camera may be transformed to a 2D ultrafast imaging device. The resultant system may capture a single, non-repetitive event at up to 100 billion frames per second with appreciable sequence depths (up to about 350 frames per acquisition). In another aspect, a dichroic mirror may be used to separate signals into two color channels, and may further expand CUP's functionality into the realm of four-dimensional x, y, λ, t ultrafast imaging, maximizing the information content that may be simultaneously acquired from a single instrument.
On the basis of compressed sensing (CS), CUP may encode the spatial domain with a pseudo-random binary pattern, followed by a shearing operation in the temporal domain, performed using a streak camera with a fully opened
(Continued)

entrance slit. This encoded, sheared three-dimensional (3D) x, y, t scene may then be measured by a 2D detector array, such as a CCD, within a single snapshot. The image reconstruction process follows a strategy similar to CS-based image restoration—iteratively estimating a solution that minimizes an objective function. However, unlike CS-based image restoration algorithms, which target the reconstruction of a 2D x, y image, CUP reconstruction recovers a 3D x, y, t movie by applying regularization over both the spatial domain and the temporal domain.

8 Claims, 48 Drawing Sheets
(12 of 48 Drawing Sheet(s) Filed in Color)

Related U.S. Application Data

(60) Provisional application No. 62/057,830, filed on Sep. 30, 2014, provisional application No. 62/298,552, filed on Feb. 23, 2016.

(51) Int. Cl.
    *G01S 17/00*    (2006.01)
    *G06T 1/00*     (2006.01)

(56) References Cited

U.S. PATENT DOCUMENTS

| | | | |
|---|---|---|---|
| 2002/0067535 A1 | 6/2002 | Trezza | |
| 2008/0035834 A1 | 2/2008 | Gleckler | |
| 2008/0062287 A1 | 3/2008 | Agrawal et al. | |
| 2011/0260036 A1 | 10/2011 | Baranuik et al. | |
| 2012/0075423 A1 | 3/2012 | Kirmani et al. | |
| 2012/0300062 A1 | 11/2012 | Pandharkar et al. | |
| 2013/0100250 A1 | 4/2013 | Raskar et al. | |
| 2014/0284457 A1 | 9/2014 | Smits | |
| 2015/0120241 A1 | 4/2015 | Kadambi et al. | |
| 2015/0221093 A1* | 8/2015 | Sagawa | G01B 11/2513 345/419 |
| 2016/0231549 A1 | 8/2016 | Bosworth et al. | |

OTHER PUBLICATIONS

Satat et al., "Locating and classifying fluorescent tags behind turbid layers using time-resolved inversion," Nature Communications, 6(6021): 1-14 (2015).
Abolghasemi et al., "A gradient-based alternating minimization approach for optimization of the measurement matrix in compressive sensing," Signal Processing 92(4): 999-1009 (2012).
Advanced Scientific Concepts, Products overview, http://www.advancedscientificconcepts.com/products/products.html Accessed on Aug. 22, 2015.
Afonso et al., "An augmented Lagrangian approach to the constrained optimization formulation of imaging inverse problems," IEEE Transactions on Image Processing, 20(3): 681-695 (2011).
Afonso et al., "Fast Image Recovery Using Variable Splitting and Constrained Optimization," IEEE Transactions on Image Processing, 19(9): 2345-2356 (2010).
Bell et al., "Toward superfast three-dimensional optical metrology with digital micromirror device platforms," Optical Engineering, 53(11): 112206-112206 (Apr. 1, 2014).
Bioucas-Dias et al., "A New TwIST: Two-Step Iterative Shrinkage/Thresholding Algorithms for Image Restoration," IEEE Transactions on Image Processing, 16(12): 2992-3004 (2007).
Chambolle, A., "An Algorithm for Total Variation Minimization and Applications," Journal of Mathematical Imaging and Vision, 20(1): 89-97, (2004).
Deepan et al., "Multiple-image encryption by space multiplexing based on compressive sensing and the double-random phase-encoding technique," Applied Optics, 53(2): 4539-4547 (Jul. 10, 2014).
Figueiredo et al., "Gradient Projection for Sparse Reconstruction: Application to Compressed Sensing and Other Inverse Problems," IEEE Journal of Selected Topics in Signal Processing, 1(4): 586-597 (2007).
Gao et al., "Single-shot compressed ultrafast photography at one hundred billion frames per second," Nature, 516 (7529): 74-77 (Dec. 4, 2014).
Gariepy et al., "Single-photon sensitive light-in-fight imaging," Nature Communications, 6(6021): 1-6 (2015).
Geng, J. "Structured-light 3D surface imaging: a tutorial," Advances in Optics & Photonics, 3(2): 128-160 (2011).
Gilbert et al., Sparse Recovery Using Sparse Matrices. Proceedings of the IEEE, 98(6): 937-947 (2010).
Goda et al., "Serial time-encoded amplified imaging for real-time observation of fast dynamic phenomena," Nature, 458(7242): 1145-1149 (2009).
Hansard et al., "Time-of-Flight Cameras: Principles, Methods and Applications," Springer, 2012 (101 pages).
Heshmat et al., "Single-shot ultrafast imaging using parallax-free alignment with a tilted lenslet array," in CLEO: 2014, OSA Technical Digest (online) (Optical Society of America, 2014), paper STu3E.7 (2 pages).
Huang et al., "Fast three-step phase-shifting algorithm," Applied Optics, 45(21): 4086-5091 (2006).
International Search Report and Written Opinion issued for PCT/US2015/053326 dated Jul. 1, 2016 (12 pages).
Javidi et al., Encrypted optical memory using double-random phase encoding, Applied Optics, 36(5): 1054-1058 (1997).
Kondo et al., "Development of "HyperVision HPV-X" High-Speed Video Camera," Shimadzu Review, 69: 285-291 (2012).
Li et al., "Single-shot tomographic movies of evolving light-velocity objects," Nature Communications, 5(3085): 1-12 (Jan. 22, 2014).
Liang et al., "Encrypted Three-dimensional Dynamic Imaging using Snapshot Time-of-flight Compressed Ultrafast Photography," Scientific Reports, 5(15504): 1-10 (Oct. 27, 2015).
Medina et al., "Compact laser radar and three-dimensional camera," J. of Optical Society of America A, 23(4): 800-805 (2006).
Nakagawa et al., "Sequentially timed all-optical mapping photography (STAMP)," Nature Photonics, 8(9): 695-700, (Aug. 10, 2014).
Shiraga et al., "Two-dimensional sampling-image x-ray streak camera for ultrafast imaging of inertial confinement fusion plasmas," Review of Scientific Instruments, 70(1): 620-623 (1999).
Stettner et al., "Eye-safe laser radar 3D imaging," SPIE Proceedings, 4377: 46-56 (2001).
Velten et al. "Recovering three-drensional shape around a corner using ultrafast time-of-flight imaging," Nature Communications, 3(745): 1-8 (2012).
Velten et al., "Slow art with a trillion frames per second camera," ACM SIGGRAPH 2011 Talks, 44 (2011).
Wright et al., "Sparse Reconstruction by Separable Approximation," IEEE Transactions on Signal Processing, 57(7): 2479-2493 (2009).
Harmany, Z. T. et al., "Spatio-temporal Compressed Sensing with Coded Apertures and Keyed Exposures," arXiv preprint arXiv:1111.7247 (2011).
Extended European Search Report for Application No. EP15862801, dated May 15, 2018 (11 pages).
Supplementary European Search Report and Written Opinion for Application No. EP15862801, dated Jun. 4, 2018 (7 pages).
TED https://www.youtube.com/watch?v=Y_9vd4HWIVA; Jul. 26, 2012.
Non-Final Office Action for U.S. Appl. No. 15/505,853 dated Jun. 17, 2019, pp. 1-18.

* cited by examiner

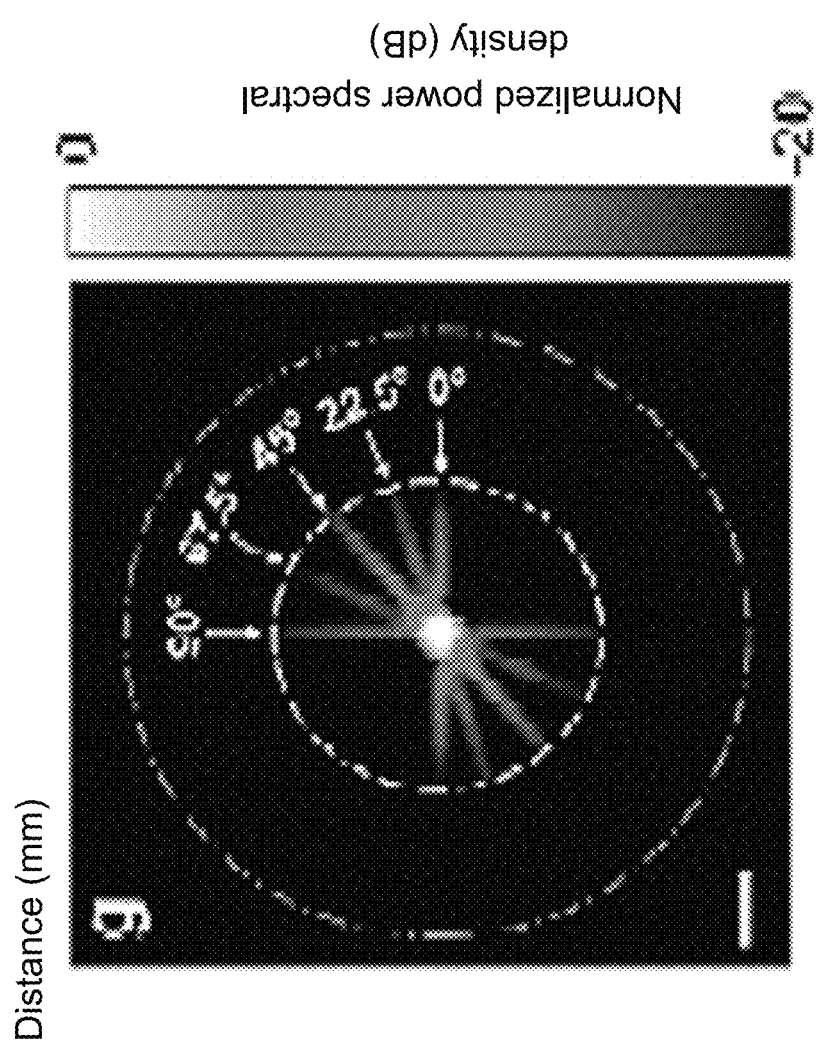

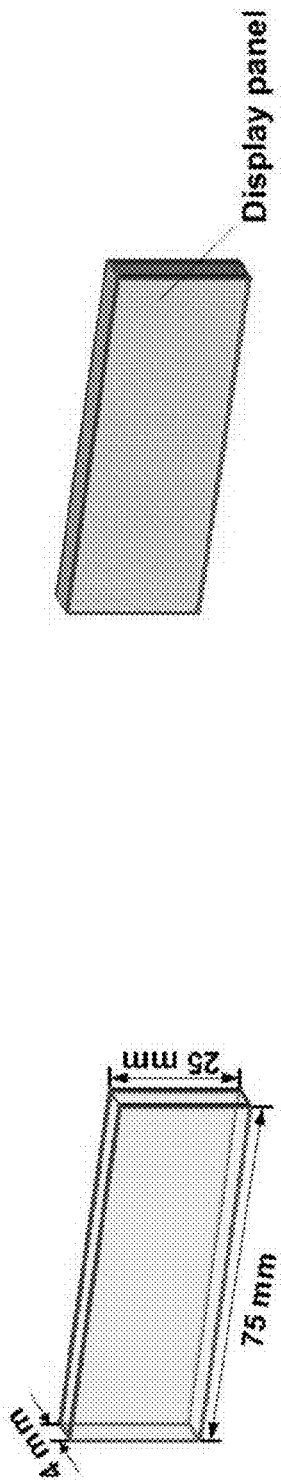
FIG. 26A
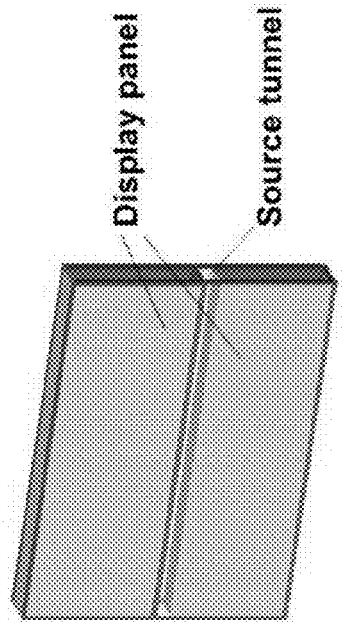
FIG. 26B
FIG. 26D
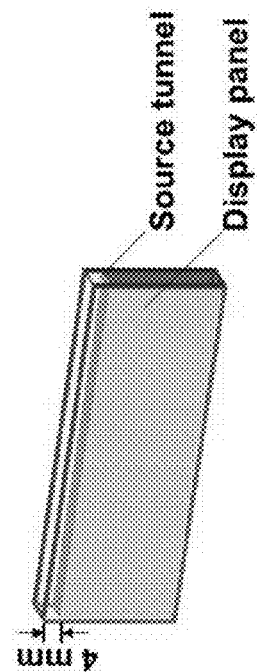
FIG. 26C

MULTIPLE-VIEW COMPRESSED-SENSING ULTRAFAST PHOTOGRAPHY (MV-CUP)

CROSS-REFERENCE TO RELATED APPLICATIONS

This application is a continuation-in-part of U.S. patent application Ser. No. 15/505,853 filed on Feb. 22, 2017, which is hereby incorporated by reference in its entirety. This application further claims the benefit of U.S. Provisional Patent Application No. 62/298,552 filed on Feb. 23, 2016, which is hereby incorporated by reference in its entirety. U.S. patent application Ser. No. 15/505,853 is a 35 U.S.C. § 371 national stage application of PCT Application No. PCT/US2015/053326, filed on Sep. 30, 2015, which is hereby incorporated by reference in its entirety. PCT Application No. PCT/US2015/053326 claims the benefit of U.S. Provisional Patent Application No. 62/057,830 filed on Sep. 30, 2014, which is hereby incorporated by reference in its entirety.

STATEMENT REGARDING FEDERALLY SPONSORED RESEARCH & DEVELOPMENT

This invention was made with government support under grant EB016986 awarded by the National Institutes of Health. The U.S. government has certain rights in the invention.

FIELD OF THE INVENTION

The present invention relates to systems and methods of compressed-sensing ultrafast photography (CUP). In particular, the present invention relates to about 100 billion frames per second dynamic imaging of non-repetitive events.

BACKGROUND

Capturing transient scenes at a high imaging speed has been pursued by photographers for centuries, tracing back to Muybridge's 1878 recording of a horse in motion and Mach's 1887 photography of a supersonic bullet. However, not until the late 20$^{th}$ century were breakthroughs achieved in demonstrating ultra-high speed imaging (>100 thousand, or $10^5$, frames per second). In particular, the introduction of electronic imaging sensors, such as the charge-coupled device (CCD) and complementary metal-oxide-semiconductor (CMOS), revolutionized high-speed photography, enabling acquisition rates up to ten million ($10^7$) frames per second. Despite the widespread impact of these sensors, further increasing frame rates of imaging systems using CCD or CMOS are fundamentally limited by their on-chip storage and electronic readout speed.

The formation of a photonic Mach cone by a superluminal light source in a medium—i.e., a source traveling faster than the speed of light in that medium—can be theoretically predicted. Yet, thus far, photonic Mach cones have eluded experimental visualization owing to the challenges in producing superluminal light sources and achieving light-speed imaging at sufficiently high framing rates.

When an object moves supersonically in air, the induced pressure wave eventually develops into a shock wave because higher-amplitude pressure travels faster. Manifesting as an abrupt wavefront, the shock wave is heard as a sudden "crack" or "boom", called a sonic boom 1. The wavefront forms a salient cone—defined as the Mach cone—with the vertex anchored at the object. Mach cones have been observed with various supersonic objects, such as aircraft and bullets. A Mach cone can be created with a moving source in any other medium provided that the source's speed exceeds the propagation speed of the excited waves in the same medium. For instance, Mach cones have been observed in the cases of a moving ship in water, a moving electron in plasma, and a moving magnetic field pulse in ferromagnets.

Although superluminal (i.e., faster-than-light) travel in vacuum is forbidden by Einstein's special theory of relativity, a superluminal light source may be generated in a medium with a refractive index greater than unity. For example, a high-energy charged particle (such as an electron) barreling through a medium can polarize the medium along its track and thereby trigger a cascade of photon emissions. When the speed of this high-energy charged particle exceeds the speed of light in this medium, these emitted photons constructively interfere with each other, forming so-called Cherenkov radiation—the photonic equivalent of a sonic boom. The Cherenkov-radiation-induced photonic Mach cone is important in disciplines such as particle physics, astrophysics, and medical imaging. Because light travels orders of magnitude faster than sound, a photonic Mach cone is much more challenging to produce in a standard laboratory setting and to observe in real-time (defined as the actual time during which a single event occurs) than the sonic counterpart. To confirm experimental generation of the photonic Mach cone using a superluminal light source, an imaging method that is sufficiently fast to enable real-time visualization of the cone is needed.

SUMMARY

Provided herein is a multi-view compressed-sensing ultrafast photography system to obtain a series of final recorded images of an object. The system may include spatiotemporal integrating module to receive a first series of object images and to produce a spatiotemporally integrated image. The system may also include a spatial encoding module to receive a first series of object images and to produce a second series of spatially encoded images. Each spatially encoded image of the second series includes a first view that includes comprising one object image of the first series superimposed with a pseudo-random binary spatial pattern and a second view that includes the one object image of the first series superimposed with a complementary pseudo-random binary spatial pattern. The first view and the second view are positioned in spatially separate regions within an entire field of view. The system also includes a temporal encoding module operatively coupled to the spatial encoding module. The temporal encoding module is configured to receive an entire field of view of each spatially encoded image of the second series, to deflect each spatially encoded image by a temporal deflection distance proportional to time-of-arrival, and to record each deflected image as a third series of spatially/temporally encoded images. Each spatially/temporally encoded image of the third series includes the first view and the second view of one spatially encoded image of the second series deflected by the temporal deflection distance.

Further provided herein is a method of obtaining a series of final recorded images of an object using a compressed-sensing ultrafast photography system at a rate of up to one billion frames per second. The method includes collecting a first series of object images. The method also includes superimposing a pseudo-random binary spatial pattern and a complementary pseudo-random binary spatial pattern onto each object image of the first series to produce a first view and a second view, respectively, of a second series of spatially encoded images. The method further includes deflecting each spatially encoded image of the second series by a temporal deflection distance proportional to a time-of-arrival of each spatially encoded image, recording each deflected spatially encoded image as a third series of spatially/temporally encoded images, and reconstructing a fourth series of final object images by processing each spatially/temporally encoded image of the third series according to an image reconstruction algorithm.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following figures illustrate various aspects of the disclosure.

FIG. 2G is a graph summarizing the spatial frequency responses of a CUP system according to one aspect for five different orientations of a stripe pattern.

FIG. 26A is an illustration of an empty thin display panel used in an apparatus to generate photonic Mach cones made by microscope cover slides with dimensions of 75 mm×25 mm×4 mm.

FIG. 26B is an illustration of a top display panel used in an apparatus to generate photonic Mach cones.

FIG. 26C is an illustration of a bottom display panel with a source tunnel used in an apparatus to generate photonic Mach cones.

FIG. 26D is an illustration of a completed plate assembly used to generate photonic Mach cones.

While multiple embodiments are disclosed, still other embodiments of the present disclosure will become apparent to those skilled in the art from the following detailed description, which shows and describes illustrative embodiments of the disclosure. As will be realized, the invention is capable of modifications in various aspects, all without departing from the spirit and scope of the present disclosure. Accordingly, the drawings and detailed description are to be regarded as illustrative in nature and not restrictive.

DETAILED DESCRIPTION

Provided herein are systems and methods for compressed-sensing ultrafast photography (CUP) for capturing images at up to 100 billion ($10^{11}$) frames per second. CUP overcomes the shortcomings of previous existing ultrafast imaging techniques by measuring two spatial coordinates (x, y) as well as time (t) with a single camera snapshot, thereby allowing observation of transient events occurring on a time scale down to tens of picoseconds. In an aspect, CUP may be used to visualize at least four fundamental physical phenomena using single laser pulses: laser pulse reflection, laser pulse refraction, photon racing in two media, and faster-than-light travel of non-information. Moreover, CUP's functionality may be expanded in reproducing colors of different wavelengths $\lambda$, thereby enabling single-shot four-dimensional (4D) (x, y, $\lambda$, t) measurements of a pulsed-laser-pumped fluorescence emission process with unprecedented temporal resolution. In addition, another aspect of the CUP method, time of flight CUP (ToF-CUP), may obtain the time-of-flight of pulsed light scattered by an object in order to reconstruct a volumetric image of the object from a single snapshot.

Compressed-Sensing Ultrafast Photography System a. Configuration

Figure 1:
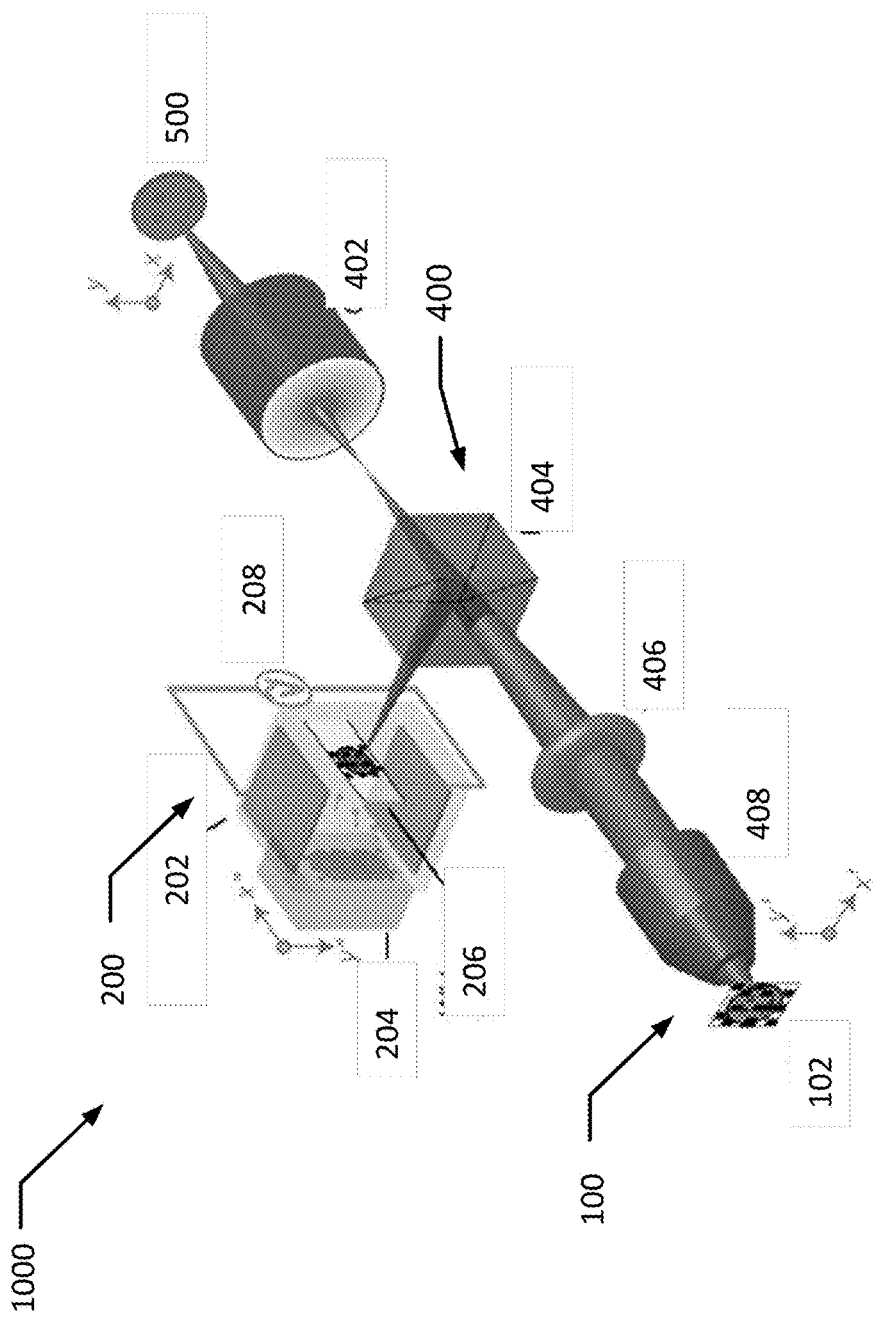
FIG. 1 is a schematic diagram illustrating the elements of a compressed ultrafast photography (CUP) system according to one aspect.

Provided herein is a compressed-sensing ultrafast photography system to obtain a series of recorded images of an object. FIG. 1 is a schematic diagram of a CUP system 1000 in one aspect. Referring to FIG. 1, the CUP system 1000 may include a spatial encoding module 100 and a temporal encoding module 200 operatively coupled to the spatial encoding module 100. The system 1000 may further include a spectral separation module 300 (not illustrated) operatively coupled to the spatial encoding module 100 and the temporal encoding module 200.

In an aspect, the spatial encoding module 100 receives a first series of object images and produces a second series of spatially encoded images. Each of the spatially encoded images of the second series includes an object image of the first series superimposed with a pseudo-random binary spatial pattern. The temporal encoding module 200 may receive an entire field of view of each spatially encoded image of the second series, deflect each spatially encoded image of the second series by a temporal deflection distance proportional to the time-of-arrival of each portion of each spatially encoded image of the second series. The temporal encoding module 200 also records each deflected spatially encoded image as a third series of spatially and temporally encoded images. Each spatially and temporally encoded image of the third series may include an object image superimposed with a pseudo-random binary spatial pattern and deflected by the temporal deflection distance.

In an aspect, the spectral separation module 300 deflects each spatially encoded image of the second series by a spectral deflection distance. In one aspect, the spectral deflection distance of the spectral encoding module 300 may be oriented perpendicular to the temporal deflection distance of the temporal encoding module 200. In an aspect, the spectral separation module 300 may receive the second series of spatially encoded images from the spatial encoding module. In another aspect, the spectral separation module 300 deflects a first spectral portion of each spatially encoded image including a first wavelength and a second spectral portion of each spatially encoded image including a second wavelength by a first and second spectral deflection distance proportional to the first and second wavelengths, respectively. In yet another aspect, the spectral separation module may produce a fourth series of spatially/spectrally encoded images, each spatially/spectrally encoded image comprising an object image superimposed with a pseudo-random binary spatial pattern and with the first and second spectral portions deflected by spectral deflection distances. In another aspect, the spectral separation module 300 may deflect more than 2 spectral portions corresponding to more than 2 different wavelengths. In various other aspects, the spectral separation module 300 may deflect up to 3 spectral portions corresponding to 3 different wavelengths, up to 4 spectral portions corresponding to 4 different wavelengths, up to 5 spectral portions corresponding to 5 different wavelengths, up to 6 spectral portions corresponding to 6 different wavelengths, up to 7 spectral portions corresponding to 7 different wavelengths, up to 8 spectral portions corresponding to 8 different wavelengths, up to 9 spectral portions corresponding to 9 different wavelengths, and up to 10 spectral portions corresponding to 10 different wavelengths.

Figure 5A:
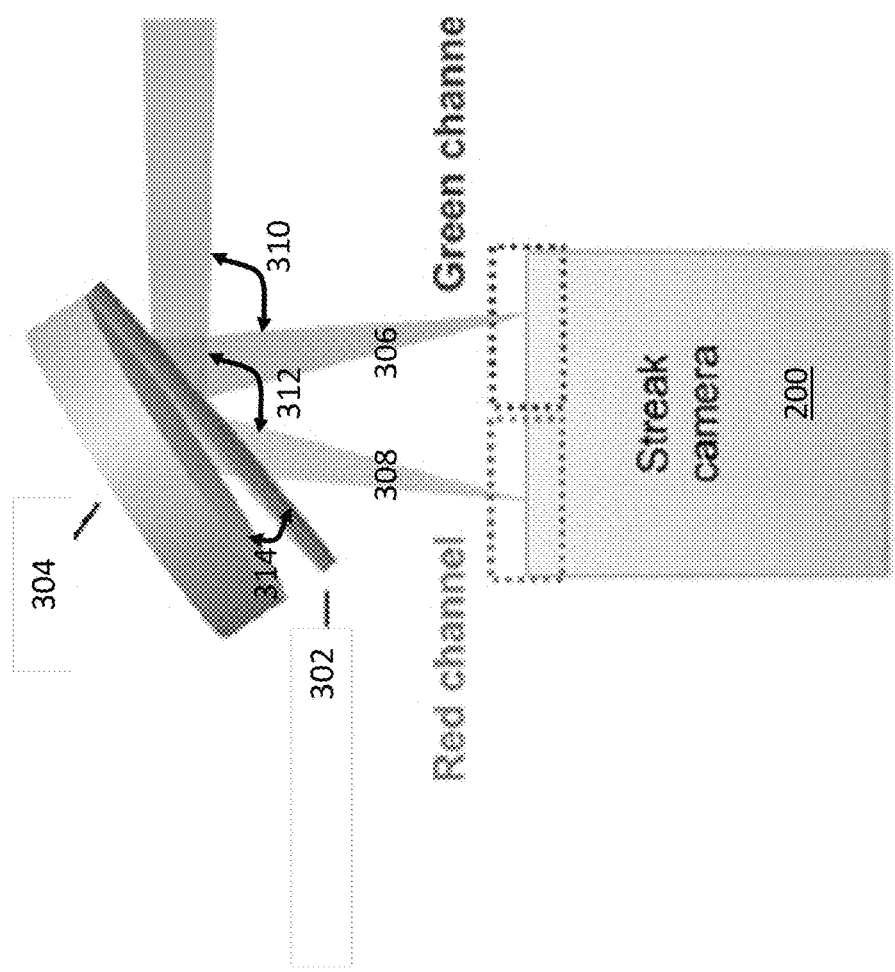
FIG. 5A is a schematic diagram illustrating the elements of a multicolor compressed-sensing ultrafast photography (Multicolor-CUP) system according to one aspect.

FIG. 5A is a schematic diagram of a spectral separation module 300 in one aspect. Referring to FIG. 5A, the spectral separation module 300 may include a dichroic filter 302 mounted on a mirror 304 at a tilt angle 314. In this aspect, the first spectral portion 306 of each spatially encoded image including the first wavelength reflects off of the dichroic filter 302 at a first angle 310 and the second spectral portion 308 of each spatially encoded image including the second wavelength passes through the dichroic filter 302 and reflects off of the mirror at a second angle 312 comprising the combined first angle 310 and tilt angle 314.

Referring again to FIG. 1, the spatial encoding module 100 may include a digital micromirror device (DMD) 102. The DMD 102 may include an array of micromirrors, where each micromirror may be configured to reflect or absorb a portion of the object image according to the pseudo-random binary pattern.

In various aspects, the temporal encoding module 200 enables temporal shearing of the spatially encoded images and spatiotemporal integration to produce the spatially and temporally encoded images of the third series of images to be analyzed according to the CUP image reconstruction methods described herein below. In various aspects, the temporal encoding module 200 includes any camera capable of performing the temporal shearing and spatiotemporal integration used to form a single spatially and temporally encoded image to be reconstructed according to the CUP reconstruction method described herein. In one aspect, the camera's exposure time spans the entire data acquisition process. During the exposure, images recorded from the previous time points are shifted in one spatial dimension and mixed with images recorded at following time points. All these temporally-sheared images are recorded in a single snapshot as the camera output. Non-limiting examples of camera types suitable for use as a temporal encoding module 200 includes a streak cameras, time-delay-and-integration (TDI) cameras, frame transfer CCD cameras including various types of sCMOS, ICCD, and EMCCD cameras that employ frame transfer CCD sensors.

Referring again to FIG. 1, the temporal encoding module 200 may include a streak camera 202, a 2D detector array 204, and combinations thereof in one aspect. The 2D detector array 204 may include, but is not limited to a CCD, CMOS, or any other detector array capable of capturing the encoded 3D scene. In an aspect, the entrance slit 206 of the streak camera 202 may be fully open. The temporal deflection distance may be proportional to the time-of-arrival and a sweep voltage 208 triggered within the streak camera 202. In one aspect, a CCD may be coupled to a streak camera 202 to form the temporal encoding module 200, such that the streak camera 202 performs a shearing operation in the temporal domain and the encoded 3D scene is measured by the CCD.

As used herein, the term "streak camera" refers to an ultrafast photo-detection system that transforms the temporal profile of a light signal into a spatial profile by shearing photoelectrons perpendicular to their direction of travel with a time-varying voltage. When used in conjunction with a narrow entrance slit, a typical streak camera is a one-dimensional (1D) imaging device. The narrow entrance slit, which ranges from about 10-50 μm in width, limits the imaging field of view (FOV) to a line. To achieve two-dimensional (2D) imaging with the narrow slit, additional mechanical or optical scanning may be incorporated along the other spatial axis. Although this paradigm is capable of providing a frame rate fast enough to catch photons in motion, the event itself must be repetitive, following exactly the same spatial-temporal pattern while the entrance slit of a streak camera scans across the entire FOV. In cases where the physical observations are either difficult or impossible to repeat, such as optical rogue waves, a nuclear explosion, or gravitational collapse in a supernova, this 2D streak imaging method is inapplicable.

Referring again to FIG. 1, 2D dynamic imaging is enabled using the streak camera 202 without employing any mechanical or optical scanning mechanism with a single exposure by fully opening the entrance slit 206 to receive a 2D image. In various aspects, the exposure time of the streak camera 202 outfitted with a fully-opened entrance slit 206 spans the time course of entire events, thereby obviating the need to observe multiple events as described previously in connection with the streak camera 202 with narrow entrance slit 206. In various aspects, the spatial encoding of the images performed by the spatial encoding module 100 enables the streak camera 202 to receive 2D images with minimal loss of spatial information.

Referring again to FIG. 1, the system 1000 may further include an optical module 400 to direct the first series of object images to the spatial encoding module 100 and to direct the second series of spatially encoded images to the temporal encoding module 200. The optical module 400 may include, but is not limited to a camera lens 402, a beam splitter 404, a tube lens 406, an objective 408, and combinations thereof. In an aspect, the optical module 400 includes the camera lens 402 operatively coupled to the beam splitter 404, the tube lens 406 coupled to the beam splitter 404, and an objective 408 operatively coupled to the tube lens 406. In this aspect, the camera lens 402 receives the first series of object images, the objective 408 is operatively coupled to the spatial encoding module 100 to deliver the first series of object images, and the beam splitter 404 is operatively coupled to the temporal encoding module 200 to deliver the second series of spatially encoded images via the objective 408 and tube lens 406.

In an aspect, the system 1000 may further include a microscope not illustrated) operatively coupled to the spatial encoding module 102. The first series of object images may include images of microscopic objects obtained by the microscope. In another aspect, the system 1000 may further include a telescope (not illustrated) operatively coupled to the spatial encoding module 100. In this other aspect, the first series of object images comprise images of distant objects obtained by the telescope.

Referring back to FIG. 1, the object 500 may first be imaged by a camera lens 402. In an aspect, the camera lens 402 may have a focal length (F.L.) of about 75 mm. The intermediate image may then be passed to a DMD 102 by a 4-f imaging system including a tube lens 406 (F.L.=about 150 mm) and a microscope objective 408 (F.L.=about 45 mm, NA=about 0.16). To encode the input image, a pseudo-random binary pattern may be generated and displayed on the DMD 102, with a single pixel size of about 21.6 μm×21.6 μm (3×3 binning). Since the DMD's resolution pixel size (7.2 μm×7.2 μm) may be much larger than the light wavelength, the diffraction angle may be small (~4°). With a collecting objective 408 of an N.A.=0.16, the throughput loss caused by DMD's diffraction may be negligible.

The light reflected from the DMD 102 may be collected by the same microscope objective 408 and tube lens 406, reflected by a beam splitter 404, and imaged onto the entrance slit 206 of a streak camera 202. To allow 2D imaging, this entrance slit 206 may be opened to its maximal width (about 5 mm). Inside the streak camera 202, a sweeping voltage 208 may be applied along the y" axis, deflecting the encoded images towards different y" locations according to their times of arrival. The final temporally dispersed image may be captured by a CCD 204 within a single exposure. In an aspect, the CCD 204 may have 512×672 pixels; 12.9×12.9 μm$^2$ pixel size; and 2×2 binning.

b. Effective Field-of-View Measurement

Figure 8:
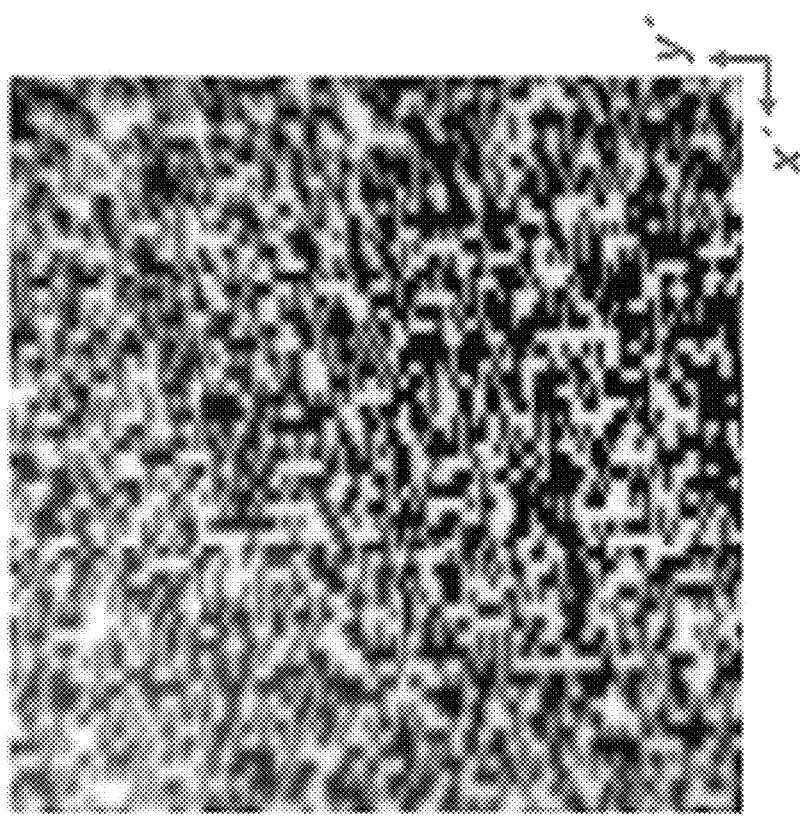
FIG. 8 is an image of a temporally undispersed CCD image of a mask used to encode the uniformly illuminated field with a pseudo-random binary pattern according to the CUP imaging method according to one aspect.

In CUP, a streak camera temporally disperses the light. The streak camera's entrance slit may be fully opened to a 17 mm×5 mm rectangle (horizontal×vertical axes). Without temporal dispersion, the image of this entrance slit on the CCD may have an approximate size of 510×150 pixels. However, because of a small angle between each individual micro-mirror's on-state normal and the DMD's surface normal, the DMD as a whole may need to be tilted horizontally so that the incident light can be exactly retroreflected. With an NA of 0.16, the collecting objective's depth of focus thereby may limit the horizontal encoding field of view (FOV) to approximately 150 pixels at the CCD. FIG. 8 shows a temporally undispersed CCD image of the DMD mask, which encodes the uniformly illuminated field with a pseudo-random binary pattern. The effective encoded FOV is approximately 150×150 pixels. Note that with temporal dispersion, the image of this entrance slit on the CCD may be stretched along the y" axis to approximately 150×500 pixels.

c. Calibration

To calibrate for operator matrix C, defined herein below, a uniform scene may be used as the input image and a zero sweeping voltage may be applied in the streak camera. The coded pattern on the DMD may therefore be directly imaged onto the CCD without introducing temporal dispersion. A background image may also be captured with all DMD pixels turned on. The illumination intensity non-uniformity may be corrected for by dividing the coded pattern image by the background image pixel by pixel, yielding operator matrix C. Note that because CUP's image reconstruction may be sensitive to mask misalignment, a DMD may be used for better stability rather than premade masks that would require mechanical swapping between system alignment and calibration or data acquisition.

d. Time of Flight CUP 3D Imaging System

In various aspects, the CUP imaging system 1000 may be modified by the addition of an illumination source conduct time of flight CUP (ToF-CUP) 3D imaging. In these various aspects, the CUP system is synchronized with short-pulsed laser illumination to enable dynamic three-dimensional (3D) imaging. By leveraging the time-of-flight (ToF) information of pulsed light backscattered by the object, ToF-CUP can reconstruct a volumetric image from a single camera snapshot. In addition, the approach unites the encryption of depth data with the compressed acquisition of 3D data in a single snapshot measurement, thereby allowing efficient and secure data storage and transmission.

Figure 9:
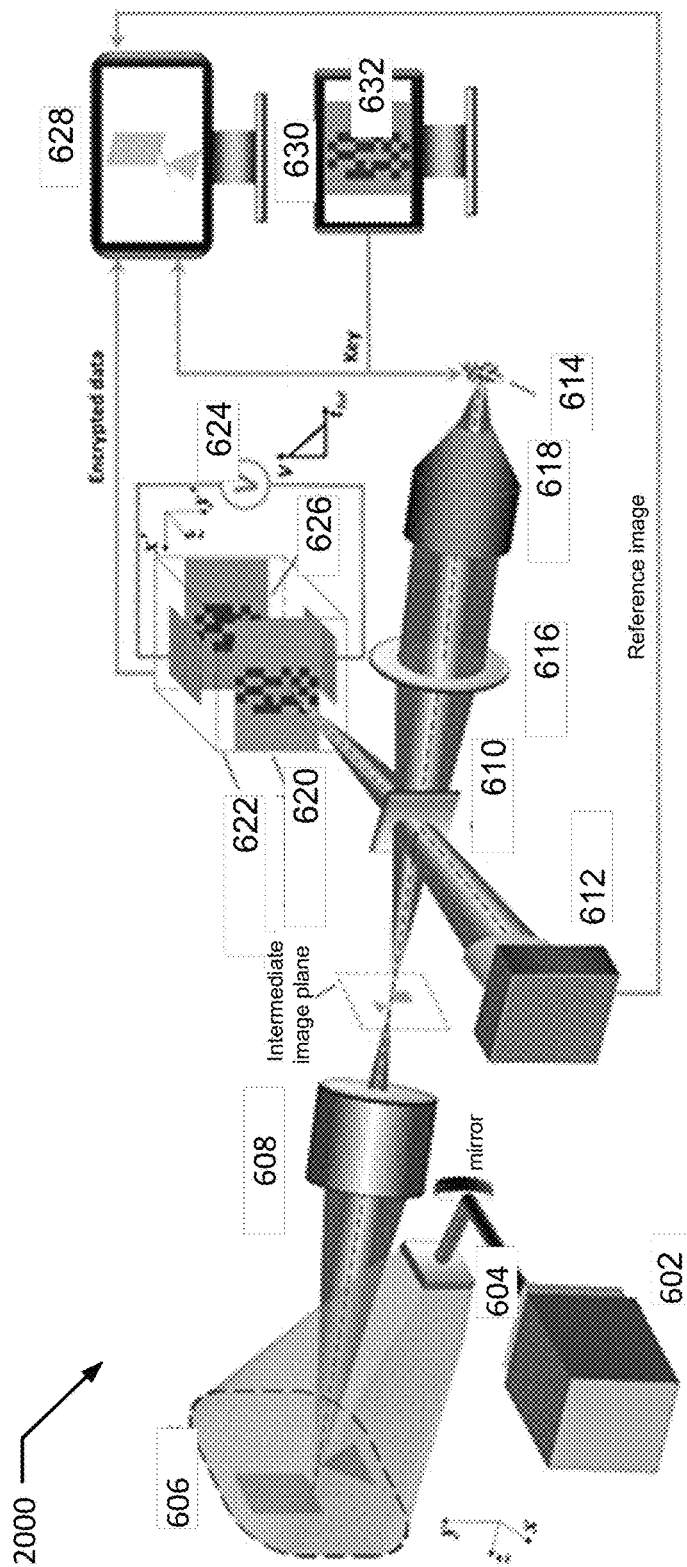
FIG. 9 is a schematic diagram illustrating a time of flight-compressed ultrafast photography (ToF-CUP) 3D imaging system according to one aspect.

FIG. 9 is a schematic diagram of a ToF-CUP 3D imaging system 2000 in one aspect. A solid-state pulsed laser (532 nm wavelength, 7 ps pulse duration) is used as the light source 602. The laser beam passes through an engineered diffuser 604 and illuminates a 3D object 606. The object 606 is first imaged by a camera zoom lens 608 (focal length 18-55 mm). Following the intermediate image plane, a beam splitter 610 reflects half of the light to an external CCD camera 612, hereinafter called the reference camera, which records a reference 2D image of the 3D object 606. The other half of the light is transmitted through the beam splitter 610 and passed to a digital micromirror device (DMD) 614 by a 4-f imaging system consisting of a tube lens 616 and a microscope objective 618 (focal length 45 mm, numerical aperture 0.16). The total demagnification of the imaging system 2000 from the object 606 to the DMD 614 is about 46-fold.

To encrypt the input image, a pseudo-random binary pattern 632 is generated by the host 630 as the key and displayed on the DMD 614. Each encoded pixel in the binary pattern 632 contains 3×3 DMD pixels (21.6 µm×21.6 µm). The encrypted image is retro-reflected through the same 4-f system, reflected by the beam splitter 610, and imaged onto the fully opened entrance slit 620 (~5 mm wide) of a streak camera 622. Deflected by a time-varying sweeping voltage 624, V, the light signal lands at various spatial locations on the y' axis according to its ToF. This temporally sheared image is recorded by an internal CCD sensor 624 in a single snapshot. This CCD sensor 626 has 672×512 binned pixels (2×2 binning), and each encoded pixel is imaged by 3×3 binned CCD pixels. Finally, the encrypted data is transmitted to the user 628 who decrypts the image with the key provided by the host 630.

The external CCD camera 612 is synchronized with the streak camera 622 for each snapshot. An USAF resolution target is used to co-register images acquired by these two devices. Used as an intensity mask, the reference image is overlaid with the reconstructed 3D image to enhance the image quality. For each snapshot, the reconstructed 3D datacube contains $N_x \times N_y \times N_z = 150 \times 150 \times 350$ voxels along the x, y, and z axes, respectively. In the x-y plane, this size gives a maximum imaging field-of-view (FOV) of $L_x \times L_y = 150$ mm×150 mm. Given the collocated illumination and detection, the depth z, can be calculated by $$z = n_z \frac{cd}{2v} (1 \leq n_z \leq N_z), \quad (5)$$

where $n_z$ is the pixel index along the z axis, d is the CCD's binned pixel size along the y' axis, and v is the shearing velocity of the streak camera 622. In our experiments, $N_z=350$, d=12.9 µm, and v is set to 0.66 mm/ns. Therefore, the maximum depth range is $L_x=1050$ mm.

Multi-View Compressed-Sensing Ultrafast Photography System

Further provided herein is a multi-view compressed-sensing ultrafast photography (MV-CUP) system to obtain a series of recorded images of an object. In various aspects, the (MV-CUP) system enables imaging of two dimensional (2D) light-speed dynamic scenes, such as a photonic Mach cone, in real time with a single exposure, with enhanced clarity compared to the CUP system described herein above. As a computational imaging approach, the MV-CUP system operates in two steps: data acquisition and image reconstruction. During data acquisition, MV-CUP acquires three different views of the dynamic scene that includes imaging information previously discarded by the CUP system.

A first image obtained and used by the MV-CUP system is a spatiotemporally integrated image that is akin to an image in traditional photography. The spatiotemporally integrated image is a direct image of the scene, defined herein as a field of view containing a full range of movement of an object during a recorded event. The spatiotemporally integrated image is produced by temporally integrating all recorded frames of the entire event over the exposure time.

The other two images obtained by the MV-CUP system record the temporal information of the dynamic scene in the form of two views using a compressed sensing paradigm similar to the compressed sensing paradigm described herein above. In both the CUP system and the MV-CUP system, each image of the first series of images is spatially encoded by superimposing a pseudo-random binary spatial pattern using a digital micromirror device (DMD). Each micromirror of the digital micromirror array used by the MV-CUP system is configured to deflect light in either a first direction or a second direction according to a pseudo-random spatial pattern. The MV-CUP system obtains a first spatially encoded view that includes all portions of the original image deflected in the first direction by the DMD, and a second spatially encoded view that includes all portions of the original image deflected in the second direction by the DMD. Both views are directed to separate regions of a field of view that is then temporally encoded by the temporal encoding module.

The first spatially encoded view corresponds to the spatially encoded image obtained by the CUP system. Light deflected in the second direction by the DMD is considered to be absorbed by the DMD according to the methods used by the CUP system. However, the light deflected in the second direction by the DMD that was previously discarded by the CUP system is instead captured as a second spatially encoded view by the MV-CUP system as a second view. As described in additional detail herein below, each of the first spatially encoded views comprise each of the first series of images superimposed with the pseudo-random spatial pattern, and each of the second spatially encoded views comprise each of the first series of images superimposed with a complementary pseudo-random spatial pattern.

In various aspects, the complementary pseudo-random spatial pattern comprises a pattern in which each portion of the first series of images that appear in the pseudo-random spatial pattern is removed in the complementary pseudo-random spatial pattern, and vice versa. As a result, a superposition of each first view and each second view would yield the original image from the first series of images. Without being limited to any particular theory, the use of the first and second spatially encoded views by the MV-CUP system enhances the quality of the resulting reconstructed images relative to comparable images obtained using the CUP system.

In various aspects, the image reconstruction methods used by the MV-CUP system recover the dynamic scene from the three-view data by exploiting the spatiotemporal sparsity of the event, which holds in most, if not all, experimental conditions. A compressed-sensing reconstruction algorithm, developed from the two-step iterative shrinkage/thresholding (TwIST) algorithm is employed, as described in additional detail herein below.

Figure 18:
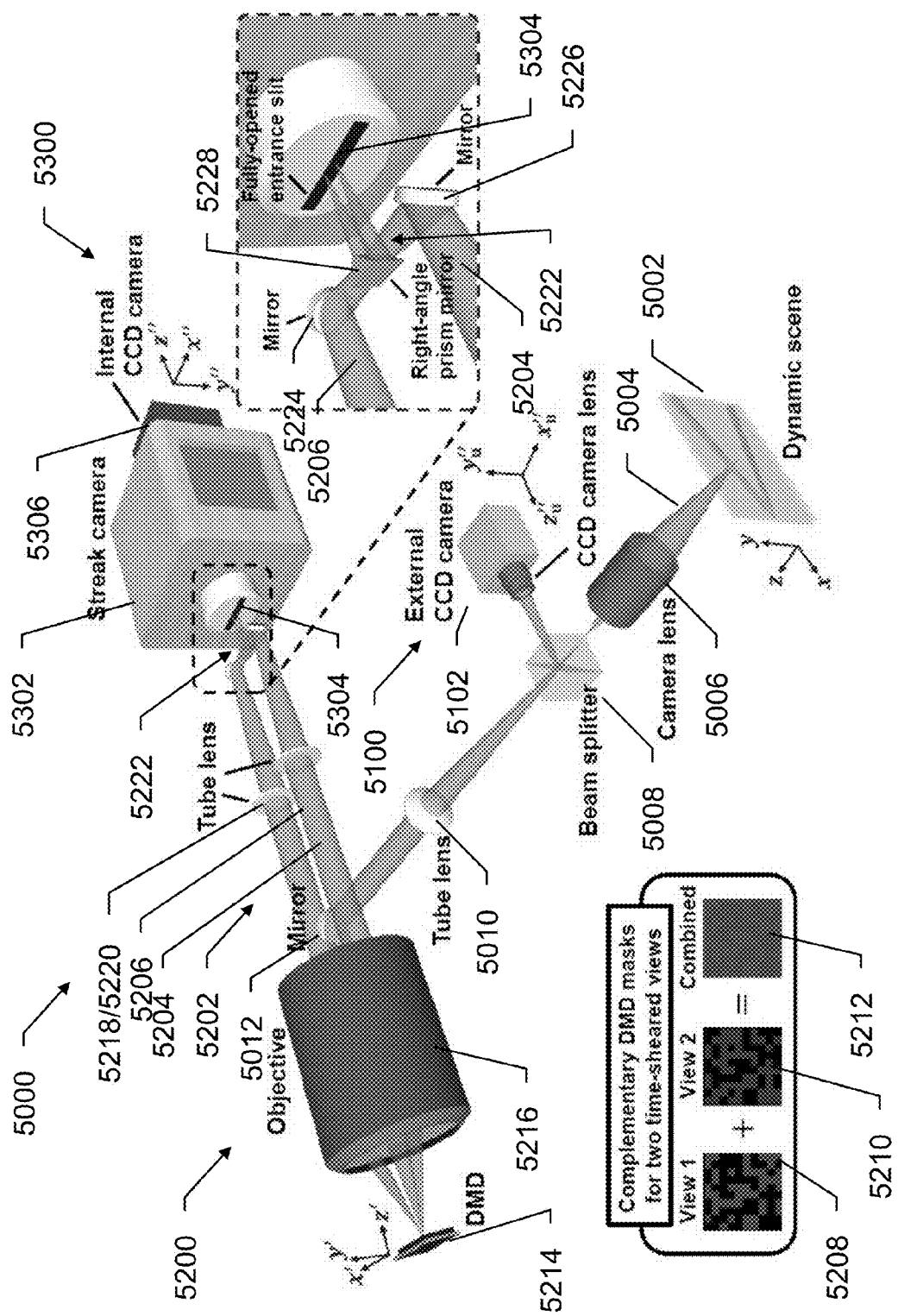
FIG. 18 is a schematic diagram of an MV-CUP imaging system, including a charge-coupled device (CCD) and a digital micromirror device (DMD). A lower left inset shows an illustration of complementary spatial encoding for two time-sheared views in which the "on" pixels are depicted in red for View 1 and in crimson for View 2, with the "off" pixels depicted in black for both views. The combined mask shows that the two spatial encodings are complementary. An upper right inset shows a close-up of the configuration before the streak camera's entrance slit (black dashed box). Light beams in both views are folded by a planar mirror and a right-angle prism mirror before entering the fully-opened entrance slit of the streak camera.
Figure 19A:
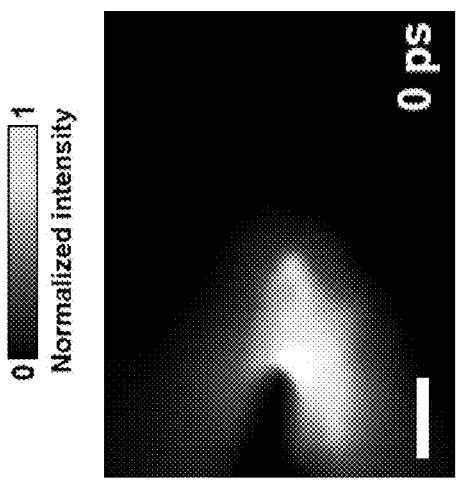
FIGS. 19A, 19B, 19C, and 19D contain images of single-shot time-resolved imaging of light patterns at times 0 ps, 40 ps, 80 ps, and 120 ps, respectively, for a laser pulse propagating faster in a source tunnel ($n_s$=1.0) than the scattered light in the display panels ($n_d$=1.4). Scale bar (in top left subpanel), 10 mm.
Figure 19B:
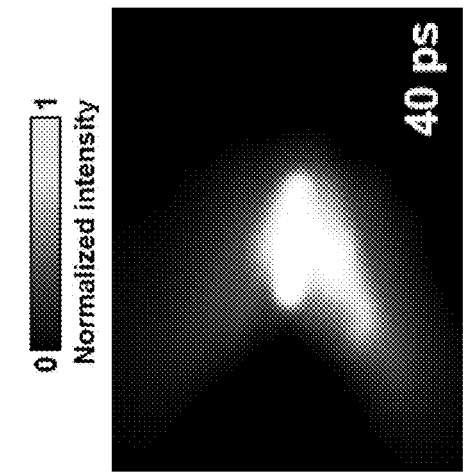
Figure 19C:
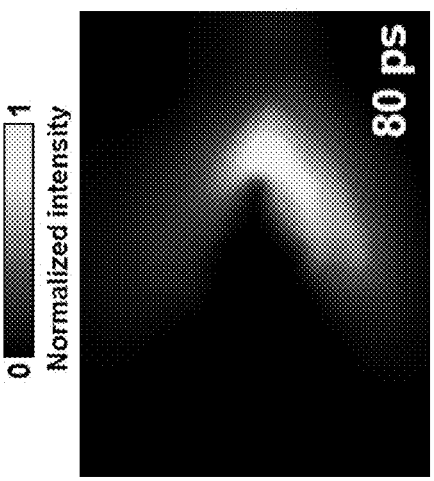
Figure 19D:
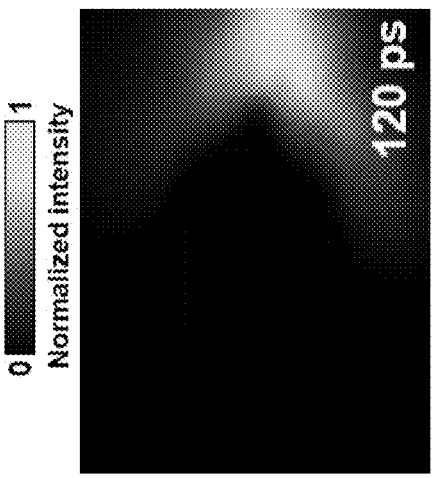
Figure 20A:
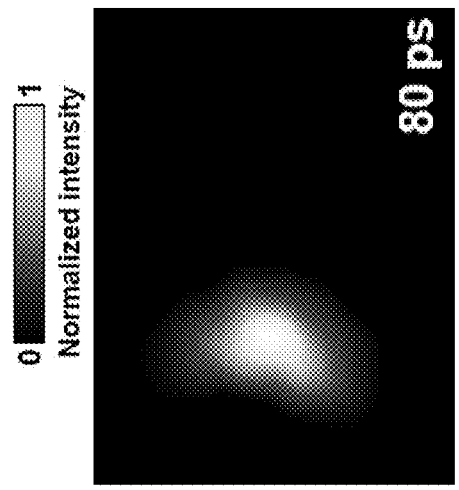
FIGS. 20A, 20B, 20C, and 20D contain images of single-shot time-resolved imaging of light patterns at times 0 ps, 40 ps, 80 ps, and 120 ps, respectively, for a laser pulse propagating slower in the source tunnel (ns=1.8) than scattered light does in the display panels (nd=1.4). Scale bar (in top left subpanel), 10 mm.
Figure 20B:
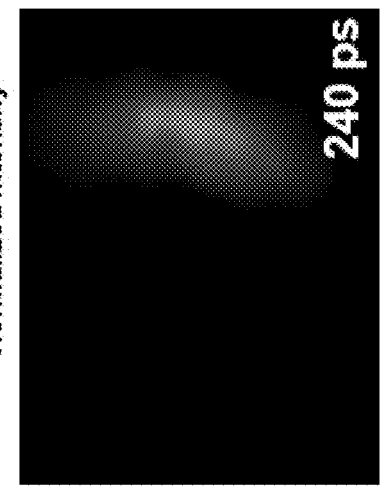
Figure 20C:
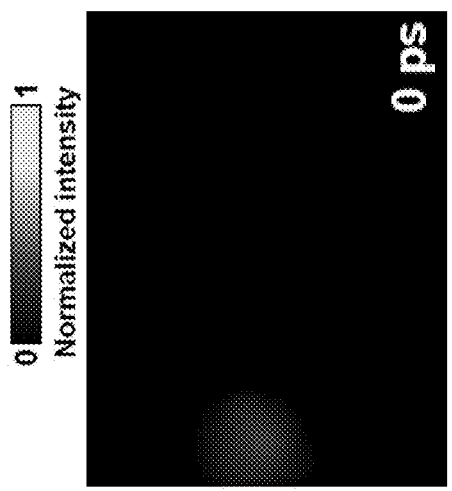
Figure 20D:
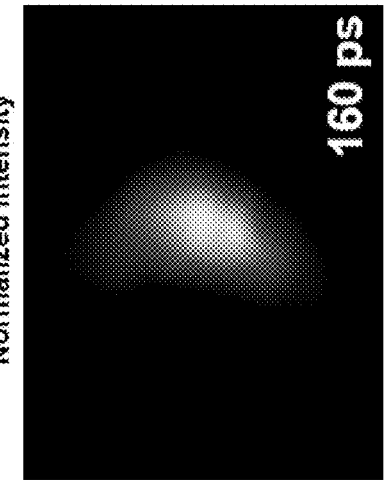

FIG. 18 is a schematic diagram of an MV-CUP system 5000 in one aspect. The MV-CUP system 5000 may include a spatiotemporal integrating module 5100, a spatial encoding module 5200 and a temporal encoding module 5300 operatively coupled to the spatial encoding module 5200.

In various aspects, the spatiotemporal integrating module 5100 includes an external camera 5102 configured to receive a first series of object images obtained from a dynamic scene 5002. Any known video camera with suitable resolution may be used as the external camera 5102 including, but not limited to, an external CCD camera, as illustrated in FIG. 18. In one aspect, the first series of object images 5004 may be received from the dynamic scene 5002 via a camera lens 5006 operatively coupled to a beam splitter 5008.

In an aspect, the spatial encoding module 5200 receives the first series of object images 5004 and produces a second series of spatially encoded images 5202. In various aspects, each of the spatially encoded images of the second series 5202 includes a first view 5204 that includes an object image of the first series 5004 superimposed with a pseudo-random binary spatial pattern 5208 and a second view 5206 that includes the same object image of the first series superimposed with a complementary pseudo-random binary spatial pattern 5210. In various aspects, the pseudo-random binary spatial pattern 5208 and the complementary pseudo-random binary spatial pattern 5210 include portions of the object image that when combined form the entire object image 5212, as illustrated in the inset image of FIG. 18.

In one aspect, the spatial encoding module 5200 includes a digital micromirror device (DMD) 5214 configured to superimpose the pseudo-random binary spatial pattern 5208 and complementary pseudo-random binary spatial pattern 5210 on each of the first series of object images 5004 as described in detail herein below. In another aspect, the spatial encoding module 5200 includes a stereoscope objective 5216 to receive the first series of object images 5004 and to receive the first view 5204 and the second view 5206 of the second series of spatially encoded images 5202 from the DMD 5214.

In various aspects, the spatial encoding module 5200 is operatively coupled to the temporal encoding module 5300. In one aspect, the stereoscope objective 5216 of the spatial encoding module 5200 is operatively coupled to first and second tube lenses 5218/5220 that deliver first and second views 5204/5206, respectively to the temporal encoding module 5300. In another aspect, the scale of the first and second views 5204/5206 may be reduced and directed to separate regions of a field of view by additional mirrors 5222 prior to delivery to the temporal encoding module 5300.

The temporal encoding module 5200 may receive an entire field of view of each spatially encoded image of the second series 5202, and may further deflect each spatially encoded image of the second series 5202 by a temporal deflection distance proportional to the time-of-arrival of each portion of each spatially encoded image of the second series. The temporal encoding module 200 also records each deflected spatially encoded image as a third series of spatially and temporally encoded images. Each spatially and temporally encoded image of the third series may include an object image superimposed with a pseudo-random binary spatial pattern and deflected by the temporal deflection distance.

In various aspects, the temporal encoding module 5200 includes any suitable time-shearing camera 5302 without limitation. Non-limiting examples of suitable time-shearing cameras include streak cameras, time-delay and integration cameras (TDI), frame transfer CCD cameras including various types of sCMOS, ICCD, and EMCCD cameras that employ frame transfer CCD sensors. In one aspect, the time-shearing camera 5302 includes an entrance 5304 to receive the second series 5202 of spatially encoded images and a detector 5306 including, but not limited to, a CCD camera to record the spatially and temporally encoded images in the third series of images produced by the temporal encoding module 5300.

Referring again to FIG. 18, the MV-CUP system 5000, in use obtains images of one or more objects within the dynamic scene 5002 using the camera lens 5006. The beam splitter 5008 equally divides the incident light containing the first series of images 5004 into two components. The reflected component is imaged by an external camera 5102, such as an external charge-coupled device (CCD) camera to form the time-unsheared view. The transmitted component passes through a 4f imaging system, consisting of a tube lens 5010, a mirror 5012, and a stereoscope objective 5216, to a digital micromirror device (DMD) 5214. To spatially encode the scene, a pseudo-random binary pattern 5208 is displayed on the DMD 5214. Each encoding pixel is turned to either +12° ("on") or −12° ("off") from the DMD's surface normal and reflects the incident light in one of the two directions. Both reflected light beams 5204/5206, masked with complementary patterns 5208/5210, are collected by the same stereoscope objective 5216. The collected beams 5204/5206 are sent through tube lenses 5218/5220, then folded by a planar mirrors 5224/5226, and again by a right-angle prism mirror 5228 (upper right inset in FIG. 18) to form two images in separate horizontal areas on the entrance 5304 of a time-shearing camera 5302, including, but not limited to, an entrance slit of a streak camera. Inside the time-shearing camera 5302, a sweeping voltage or other suitable time-shearing means shears the encoded light distribution along the y" axis according to the time of arrival. These temporally sheared frames therefore land at different spatial positions along the y" axis and are temporally integrated, pixel by pixel, by a detector 5306 including, but not limited to, an internal CCD camera in a streak camera, to form a spatially and temporally encoded third series of images that include temporally encoded first and second spatially encoded views 5204/5206 received from the spatial encoding module 5200.

MV-CUP's unique paradigm of data acquisition and image reconstruction enables several prominent advantages. First, facilitated by the streak camera, the MV-CUP system can image a non-repetitive dynamic scene at 100 billion frames per second with a single snapshot measurement, circumventing the necessity of repetitive measurements by pump-probe ultrafast imaging. Second, MV-CUP imaging avoids the specialized active illumination required by other single-shot ultrafast imagers, enabling passive imaging of dynamic light-scattering scenes. Third, compared with other streak-camera-based ultrafast imaging methods, the MV-CUP system has a light throughput of nominally 100%, excluding imperfect losses from the optical elements. Fourth, by recording two complementarily encoded time-sheared views, MV-CUP imaging prevents any loss of information from spatial encoding, as preferred by compressed sensing. Fifth, the time-unsheared view obtained by the spatiotemporal integrating module enriches the observation by adding an additional perspective. Thus, the dual complementary masking and triple-view recording of the scene represent two major enhancements of the original single-masking and single-view implementation of the CUP system described herein above.

By way of non-limiting example, in the MV-CUP system, the dynamic scene may be first imaged by a camera lens (Fujinon CF75HA-1) with a focal length of 75 mm. Following the intermediate imaging plane, a beam splitter (Thorlabs BS013) may reflect half of the light to an external CCD camera (Point Grey GS3-U3-28S4M-C). The other half of the light may pass through the beam splitter and may be imaged to a digital micromirror device (DMD, Texas Instruments DLP LightCrafter 3000) through a 4f system consisting of a tube lens (Thorlabs AC508-100-A) and a stereoscope objective (Olympus MV PLAPO 2XC; NA=0.50). The spatially encoded images may be projected to the entrance slit of a streak camera (Hamamatsu C7700) through another two 4f systems containing the same stereoscope objective, tube lenses (Thorlabs AC254-75-A), planar mirrors, and the right-angle prism mirror. The shearing velocity of the streak camera may be set to v=1.32 mm/ns. The spatially encoded, temporally sheared images may be acquired by an internal CCD camera (Hamamatsu, ORCA-R2) with a sensor size of 672×512 binned pixels (2×2 binning, binned pixel size d=12.9 μm). The reconstructed frame rate, r, may be determined by r=v/d to be 100 billion frames per second. In practice, the reconstructed datacube size, $N_x \times N_y \times N_t$, may be limited by the size of the internal CCD camera, $N_R \times N_C$, where $N_R$ and $N_C$ are the number of rows and columns. In MV-CUP, to acquire the two complementarily encoded views simultaneously, the internal CCD camera in the streak camera may be split horizontally into two equal regions. As a result, the number of reconstructed voxels along the horizontal axis must have a dimension satisfying $N_x \leq N_C/2$. In addition, considering that the temporal shearing occurs along the vertical axis, the number of reconstructed voxels on the vertical and time axes must meet the requirement of $N_y + N_t - 1 \leq N_R$. With a fully-opened entrance slit (17 mm×5 mm in the horizontal and vertical axes), each temporal frame may have an approximate size of $N_x \times N_y = 330 \times 200$, which provides an approximate sequence depth of $N_t = 300$. Thus, the reconstructed datacube size in MV-CUP imaging in this non-limiting example may be $N_x \times N_y \times N_t = 330 \times 200 \times 300$.

The MV-CUP imaging system provides novel approaches to potentially visualize a variety of superluminal phenomena at scales from microscopic particles to distant galaxies. By way of non-limiting example, the MV-CUP system may facilitate particle physics experiments. When two particle beams collide in high-energy devices including, but not limited to, Fermilab's Tevatron or CERN's large hadron collider, multiple collision events may occur at different temporal and spatial points, and each of these events may produce photons and other particles. The ability of the MV-CUP imaging system to obtain high-speed images from a single event may enable real-time visualization of Cherenkov-radiation-induced photonic Mach cones from particles generated in such collision events, and further enabling the characterization of spatiotemporal details of these ultrafast phenomena and revealing new insights into fundamental physics. A photonic Mach cone generated by in the laboratory was imaged using the MV-CUP imaging system as described herein below in Example 15.

CUP Method

Presented herein is an ultrafast 2D imaging technique, compressed-sensing ultrafast photography (CUP), which can capture non-repetitive events at up to 100 billion frames per second. CUP takes advantage of the compressibility of an event datacube and realizes an acquisition of petahertz data flux (105 frame pixels×1011 frames per second) using a CCD with only 0.3 megapixels. CUP has been demonstrated by imaging transient events involving fundamental physical phenomena such as light reflection, refraction, laser pulses racing in different media, and FTL travel of non-information. Furthermore, by utilizing a custom-built spectral separation unit, multicolor CUP may be accomplished, expanding its functionality into the realm of 4D x, y, λ, t ultrafast imaging.

In an aspect, the method may include obtaining a series of final recorded images of an object using a compressed-sensing ultrafast photography system at a rate of up to one billion frames per second. The method may include collecting a first series of object images, superimposing a pseudo-random binary spatial pattern onto each object image of the first series to produce a second series of spatially encoded images, deflecting each spatially encoded image of the second series by a temporal deflection distance proportional to a time-of-arrival of each spatially encoded image, recording each deflected spatially encoded image as a third series of spatially/temporally encoded images, and reconstructing a fourth series of final object images by processing each spatially/temporally encoded image of the third series according to an image reconstruction algorithm.

The CUP system's frame rate and temporal resolution may be determined by the shearing velocity of the streak camera: a faster shearing velocity results in a higher frame rate and temporal resolution. Unless the illumination is intensified, however, the shortened observation time window may reduce the signal-to-noise ratio, which may reduce image reconstruction quality. The shearing velocity thus may be balanced to accommodate a specific imaging application at a given illumination intensity.

In an aspect, the size of the reconstructed event datacube, $N_x \times N_y \times N_t$ ($N_x$, $N_y$, and $N_t$: the numbers of voxels along x, y, and t), may be influenced by the acceptance NA of the collecting objective, photon shot noise, and sensitivity of the photocathode tube as well as by the number of binned CCD pixels ($N_R \times N_C$; $N_R$, the number of rows; $N_C$, the number of columns). Provided that the image formation closely follows the ideal forward model, the number of binned CCD pixels may become an additional influencing factor on the size of the reconstructed event datacube. Along the horizontal direction, the number of reconstructed voxels may be less than the number of detector columns, i.e. $N_x \leq N_C$. In multicolor CUP, this becomes $N_x \leq N_C/N_L$, where $N_L$ is the number of spectral channels (i.e. wavelengths). Along the vertical direction, to avoid field clipping, the sampling obeys $N_y+N_t-1 \leq N_R$ because the spatial information and temporal information overlap and occupy the same axis.

Secure communication using CUP may be possible because the operator O is built upon a pseudo-randomly generated code matrix sheared at a preset velocity. The encrypted scene therefore may be decoded by only recipients who are granted access to the decryption key. Using a DMD (instead of a premade mask) as the field encoding unit in CUP facilitates pseudo-random key generation and potentially allows the encoding pattern to be varied for each exposure transmission, thereby minimizing the impact of theft with a single key decryption on the overall information security. Furthermore, compared with other compressed-sensing-based secure communication methods for either a 1D signal or a 2D image, CUP operates on a 3D dataset, allowing transient events to be captured and communicated at faster speed.

CUP may be potentially coupled to a variety of imaging modalities, such as microscopes and telescopes, allowing imaging of transient events at scales from cellular organelles to galaxies. For example, in conventional fluorescence lifetime imaging microscopy (FLIM), point scanning or line scanning is typically employed to achieve 2D fluorescence lifetime mapping. However, since these scanning instruments cannot collect light from all elements of a dataset in parallel, there is a loss of throughput by a factor of $N_x \times N_y$ (point scanning) or $N_y$ (line scanning) when measuring an image of $N_x \times N_y$ pixels. Additionally, scanning-based FLIM suffers from severe motion artifacts when imaging dynamic scenes, limiting its application to fixed or slowly varying samples. By integrating CUP with FLIM, parallel acquisition of a 2D fluorescence lifetime map may be accomplished within a single snapshot, thereby providing a simple solution to these long-standing problems in FLIM.

a. Image Formation and Reconstruction

In an aspect, CUP may operate in two steps: image formation and image reconstruction. In a non-limiting example, the image formation may be described by a forward model. During this step, the input image may be encoded with a pseudo-random binary pattern and then temporally dispersed along a spatial axis using a streak camera. Mathematically, this process is equivalent to successively applying a spatial encoding operator, C, and a temporal shearing operator, S, to the intensity distribution from the input dynamic scene, I(x, y, t):

$$I_s(x'',y'',t) = SCI(x,y,t), \quad (1)$$

where $I_s(x'',y'',t)$ represents the resultant encoded, sheared scene. Next, $I_s$ may be imaged by a CCD, a process that may be mathematically formulated as Eqn. 2:

$$E(m,n) = TI_s(x'',y'',t). \quad (2)$$

where T is a spatiotemporal integration operator (spatially integrating over each CCD pixel and temporally integrating over the exposure time). E(m,n) is the optical energy measured at pixel m, n on the CCD. Substituting Eqn. 1 into Eqn. 2 yields $$E(x',y') = OS(x,y,t), \quad (3)$$

where O represents a combined linear operator, i.e. O=TSC.

The image reconstruction is solving the inverse problem of Eq. 3. Given the operator O and spatiotemporal sparsity of the event, the input scene, I(x,y,t), can reasonably be estimated from measurement, E(m,n), by adopting a compressed-sensing algorithm, such as Two-Step Iterative Shrinkage/Thresholding (TwIST). The reconstructed frame rate, r, is determined by $$r = \frac{v}{\Delta y''}. \quad (4)$$

where v is the temporal shearing velocity of the operator S, i.e., the shearing velocity of the streak camera, and $\Delta y''$ is the CCD's binned pixel size along the temporal shearing direction of the operator S.

b. Forward Model

CUP's image formation process may use a forward model. The intensity distribution of the dynamic scene, I(x, y, t), is first imaged onto an intermediate plane by an optical imaging system. Under the assumption of unit magnification and ideal optical imaging—i.e., the point-spread-function (PSF) approaches a delta function, the intensity distribution of the resultant intermediate image is identical to that of the original scene. To encode this image, a mask which contains pseudo-randomly distributed, squared, and binary-valued (i.e., either opaque or transparent) elements is placed at this intermediate image plane. The image immediately after this encoding mask has the following intensity distribution:

$$I_c(x', y', t) = \sum_{i,j} I(x', y', t) C_{ij} rect\left[\frac{x'}{d'} - \left(i + \frac{1}{2}\right), \frac{y'}{d'} - \left(j + \frac{1}{2}\right)\right]. \quad (5)$$

Here, C is an element of the matrix representing the coded mask, i, j are matrix element indices, and d' is the mask pixel size. For each dimension, the rectangular function is defined as $$rect(x) = \begin{cases} 1, & \text{if } |x| \leq \frac{1}{2} \\ 0, & \text{else} \end{cases}.$$

In this section, a mask or camera pixel is equivalent to a binned DMD or CCD pixel defined in the experiment.

Figure 7:
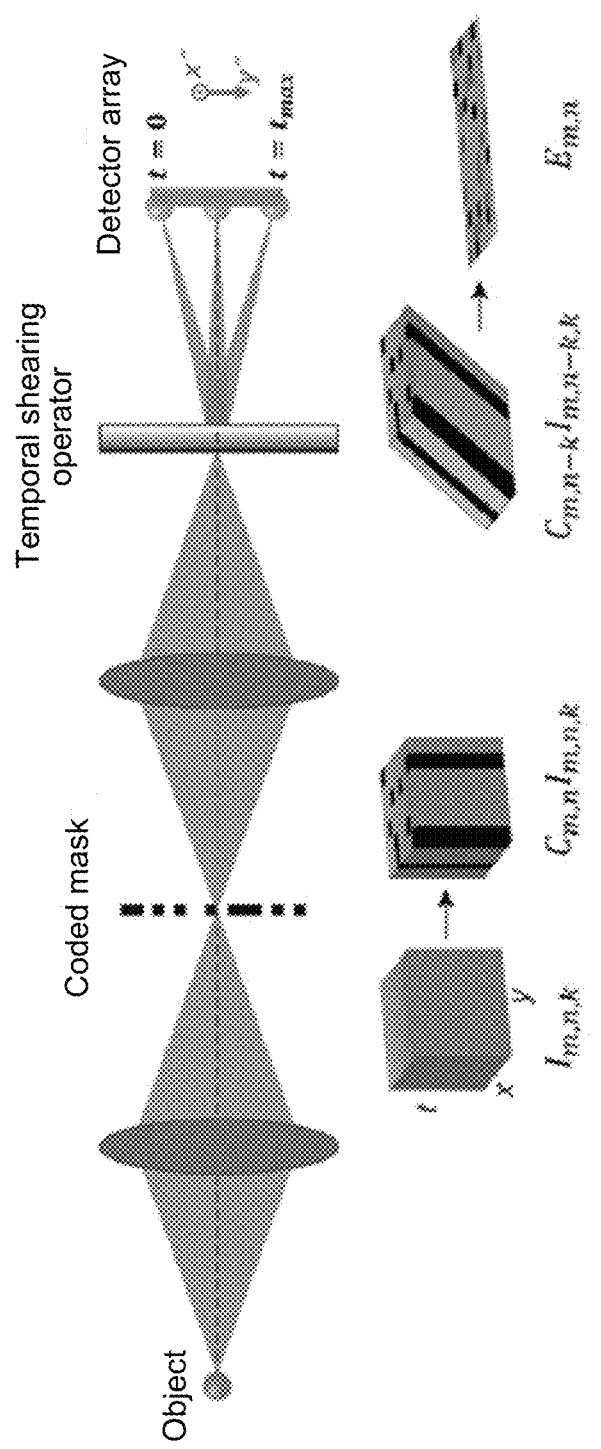
FIG. 7 is a schematic diagram illustrating a CUP image formation model according to one aspect.

This encoded image is then passed to the entrance port of a streak camera. By applying a voltage ramp, the streak camera acts as a shearing operator along the vertical axis (axis in FIG. 7) on the input image. FIG. 7 is a CUP image formation model, where x, y, are spatial coordinates; t is time; m, n, k are matrix indices; $I_{m,n,k}$ is input dynamic scene element; $C_{m,m}$ is coded mask matrix element; $C_{m,n-k}I_{m,n-k,k}$ is encoded and sheared scene element; $E_{m,n}$ is image element energy measured by a 2D detector array; and $t_{max}$ is maximum recording time.

If ideal optics are assumed with unit magnification, the sheared image may be expressed as $$I_s(x'',y'',t) = I_c(x'',y''-vt,t), \quad (6)$$

where v is the shearing velocity of the streak camera.

$I_s(x'', y'', t)$ is then spatially integrated over each camera pixel and temporally integrated over the exposure time. The optical energy, E(m,n), measured at pixel m, n, is $$E(m, n) = \int dt \int dx'' \int dy'' I_s(x'', y'', t) rect\left[\frac{x''}{d''} - \left(m + \frac{1}{2}\right), \frac{y''}{d''} - \left(n + \frac{1}{2}\right)\right]. \quad (7)$$

Here, d'' is the camera pixel size. Accordingly, the input scene, I(x, y, t), can be voxelized into $I_{i,j,k}$ as follows:

$$I(x, y, t) \approx \sum_{i,j,k} I_{i,j,k} rect\left[\frac{x}{d''} - \left(i + \frac{1}{2}\right), \frac{y}{d''} - \left(j + \frac{1}{2}\right), \frac{t}{\Delta_t} - \left(k + \frac{1}{2}\right)\right], \quad (8)$$

where $\Delta_t = d''/v$. If the mask elements are mapped 1:1 to the camera pixels (i.e., $d'=d''$) and perfectly registered, combining Eq. 5-8 yields $$E(m, n) = \frac{d''^3}{v} \sum_{k=0}^{n-1} C_{m,n-k} I_{m,n-k,k}. \quad (9)$$

Here $C_{m,n-k} I_{m,n-k,k}$ represents a coded, sheared scene, and the inverse problem of Eq. S5 can be solved using existing compressed-sensing algorithms.

It is worth noting that only those indices where n−k>0 should be included in Eqn. 9. Thus, to convert Eqn. 9 into a matrix equation, the matrices C and I need to be augmented with an array of zeros. For example, to estimate a dynamic scene with dimensions $N_x \times N_y \times N_t$, where the coded mask itself has dimensions $N_x \times N_y$, the actual matrices I and C used in Eq. 9 will have dimensions $N_x \times (N_y + N_{t-1}) \times N_t$ and $N_x \times (N_y + N_{t-1})$, respectively, with zeros padded to the ends. After reconstruction, these extra voxels, containing nonzero values due to noise, are simply discarded.

c. CUP Image Reconstruction Algorithm

Given prior knowledge of the coded mask matrix, to estimate the original scene from the CUP measurement, the inverse problem of Eqn. 9 needs to be solved. This process can be formulated in a more general form as $$\operatorname{argmin}\left\{\frac{1}{2}\|E - OI\|^2 + \beta\Phi(I)\right\}, \quad (10)$$

where O is the linear operator, $\Phi(I)$ is the regularization function, and $\beta$ is the regularization parameter. In CUP image reconstruction, an algorithm called Two-Step Iterative Shrinkage/Thresholding (TwIST) may be used, with $\Phi(I)$ in the form of total variation (TV):

$$\Phi_{TV}(I) = \sum_{k=0}^{N_t-1} \sum_{i=1}^{N_x \times N_y} \sqrt{(\Delta_i^h I_k)^2 + (\Delta_i^v I_k)^2} + \sum_{m=1}^{N_x} \sum_{i=1}^{N_y \times N_t} \sqrt{(\Delta_i^h I_m)^2 + (\Delta_i^v I_m)^2} + \sum_{n=1}^{N_y} \sum_{i=1}^{N_x \times N_t} \sqrt{(\Delta_i^h I_n)^2 + (\Delta_i^v I_n)^2}. \quad (11)$$

Here the discretized form of I is assumed to have dimensions $N_x \times N_y \times N_t$, and m, n, k are the three indices. $I_m$, $I_n$, $I_k$ denote the 2D lattices along the dimensions m, n, k, respectively. $\Delta_i^k$ and $\Delta_i^v$ are horizontal and vertical first-order local difference operators on a 2D lattice. In TwIST, the minimization of the first term, $\|E-OI\|^2$, occurs when the actual measurement E closely matches the estimated measurement OI, while the minimization of the second term, $\beta\Phi(I)$, encourages I to be piecewise constant (i.e., sparse in the gradient domain). The weighting of these two terms is empirically adjusted by the regularization parameter, $\beta$, to lead to the results that are most consistent with the physical reality. To reconstruct a datacube of size 150×150×350 (x, y, t), approximately ten minutes is required on a computer with Intel i5-2500 CPU (3.3 GHz) and 8 GB RAM. The reconstruction process may be further accelerated by using GPUs.

Traditionally, the TwIST algorithm is initialized with a pseudo-random matrix as the discretized form of and then converged to a solution by minimizing the objective function in Eqn. 10. Thus no spatiotemporal information about the event is typically employed in the basic TwIST algorithm. However, it is important to remember that the solution of TwIST might not converge to a global minimum, and hence might not provide a physically reasonable estimate of the event. Therefore, the TwIST algorithm may include a supervision step that models the initial estimate of the event. For example, if the spatial or temporal range within which an event occurs is known a priori, one can assign non-zero values to only the corresponding voxels in the initial estimate of the discretized form of I and start optimization thereafter. Compared with the basic TwIST algorithm, the supervised-TwIST approach can significantly reduce reconstruction artefacts and therefore provide a more reliable solution.

d. ToF-CUP Image Reconstruction Algorithm

In various aspects, the CUP system is provided with active illumination to enable ToF-CUP 3D imaging that uses the time of flight of photons backscattered from a 3D object to reconstruct a 3D image of an object. For collocated illumination and detection, the round-trip ToF signal carries information about the depth, z, relative to the point of light incidence on the object's surface, which can be recovered by $$z = ct_{ToF}/2, \quad (12)$$

where $t_{ToF}$ is the ToF of received photons, and c is the speed of light. The factor of two in the denominator on the right side of Eq. 12 accounts for the round-trip flight of photons.

A collimated laser beam illuminates the 3D object having intensity reflectivity R(x, y, z). The backscattered light signal from this 3D object, $I(x, y, t_{ToF})$, enters the ToF-CUP system 2000 described herein. The depth information of the 3D object is conveyed as the ToF of the backscattered light signal. Mathematically, this process can be described by $$I(x,y,t_{ToF}) = PR(x,y,z) \quad (13)$$

where P is a linear operator for light illumination and backscattering. Considering that the scattering is a linear process, $I(x, y, t_{ToF})$ is linearly proportional to R(x, y, z).

The ToF-CUP system then images this 3D object in three steps. First, the collected photons are spatially encrypted with a pseudo-random binary pattern, in which each pixel is set to either on or off. This pattern also acts as the decryption key to unlock and retrieve the image of the 3D object. Second, a streak camera temporally shears the ToF signal along the vertical direction. Third, the encrypted and sheared image is recorded on a CCD sensor in the streak camera via pixel-wise spatiotemporal integration. The optical energy measured at pixel (m, n) on the CCD, E(m, n), is related to the original 3D light intensity reflectivity, R(x, y, z), by $$E(m,n) = TSCPR(x,y,z) \quad (14)$$

Here, T, S, and C are linear operators that represent spatiotemporal integration, temporal shearing, and spatial encryption, respectively. Equation 14 shows that the encryption process is inherently embedded in the ToF-CUP method.

Image decryption can be computationally performed by users who are granted the decryption key. If the 3D object is spatiotemporally sparse, $I(x, y, t_{ToF})$ can be reasonably estimated by solving the inverse problem of Eq. (14) using compressed-sensing algorithms. In one aspect, a two-step iterative shrinkage/thresholding (TwIST) algorithm may be used, which minimizes a convex objective function given by $$\arg\min[\tfrac{1}{2}\|E-TSCPR\|^2+\lambda\Phi_{TV}(PR)], \quad (15)$$

where $\Phi_{TV}$, denotes the total-variation (TV) regularizer that encourages sparsity in the gradient domain during reconstruction.

The TwIST algorithm is initialized with a pseudo-random matrix of the discretized form of PR and then converged to a solution by minimizing the objective function in Eq. 15. The regularization parameter $\lambda$, which controls the weight of the TV regularizer, is adjusted empirically to provide the best for a given physical reality. Finally, R(x, y, z) can be recovered given the linear relation between the backscattered light signal and the intensity reflectivity of the object. Further, in continuous shooting mode, the evolution of the 3D images over the "slow time", $t_s$, R(x, y, z, $t_s$), can be recovered by decrypting sequential snapshots. Here, the "slow time", $t_s$, relative to $t_{ToF}$, is defined as the time of capture of the imaged volume.

Besides security, the ToF-CUP method offers the advantage of more efficient information storage and transmission because data is compressed during acquisition. ToF-CUP method compresses a 3D datacube with $N_x \times N_y \times N_z$ voxels to a 2D encrypted image with $N_x \times (N_y+N_z-1)$ pixels. The data compression ratio can therefore be calculated as $$\eta_d = \frac{N_y \times N_z}{(N_y + N_z - 1)}.$$

With me current setup ($N_y=150$ and $N_z=350$), $\eta_d=105$. Therefore, ToF-CUP can potentially improve the data transmission rate by over two orders of magnitude. However, compared with optical bandwidth-limited images, the implementation of ToF-CUP degrades the spatial resolutions by factors of 1.8 and 2.2 along the x and y axes. In addition, the depth resolution is degraded by 3.3 along the z axis, compared to the streak camera's native resolution in resolving a ToF signal. Thus, regarding actual information content, the data compression ratio may be estimated by $$\eta_i = \frac{\eta_d}{1.8 \times 2.2 \times 3.3}.$$

For the current system, $\eta_i=8.0$.

MV-CUP Method

In various aspects, the MV-CUP system described herein above makes use of ultrafast 2D imaging techniques enhanced by the use of multiple views in a compressed-sensing method, which can capture non-repetitive events at up to 100 billion frames per second. Like the CUP imaging method, the MV-CUP imaging method takes advantage of the compressibility of an event datacube and realizes an acquisition of petahertz data flux ($10^5$ frame pixels$\times 10^{11}$ frames per second) using a CCD or other detector with only 0.3 megapixels.

Figure 23:
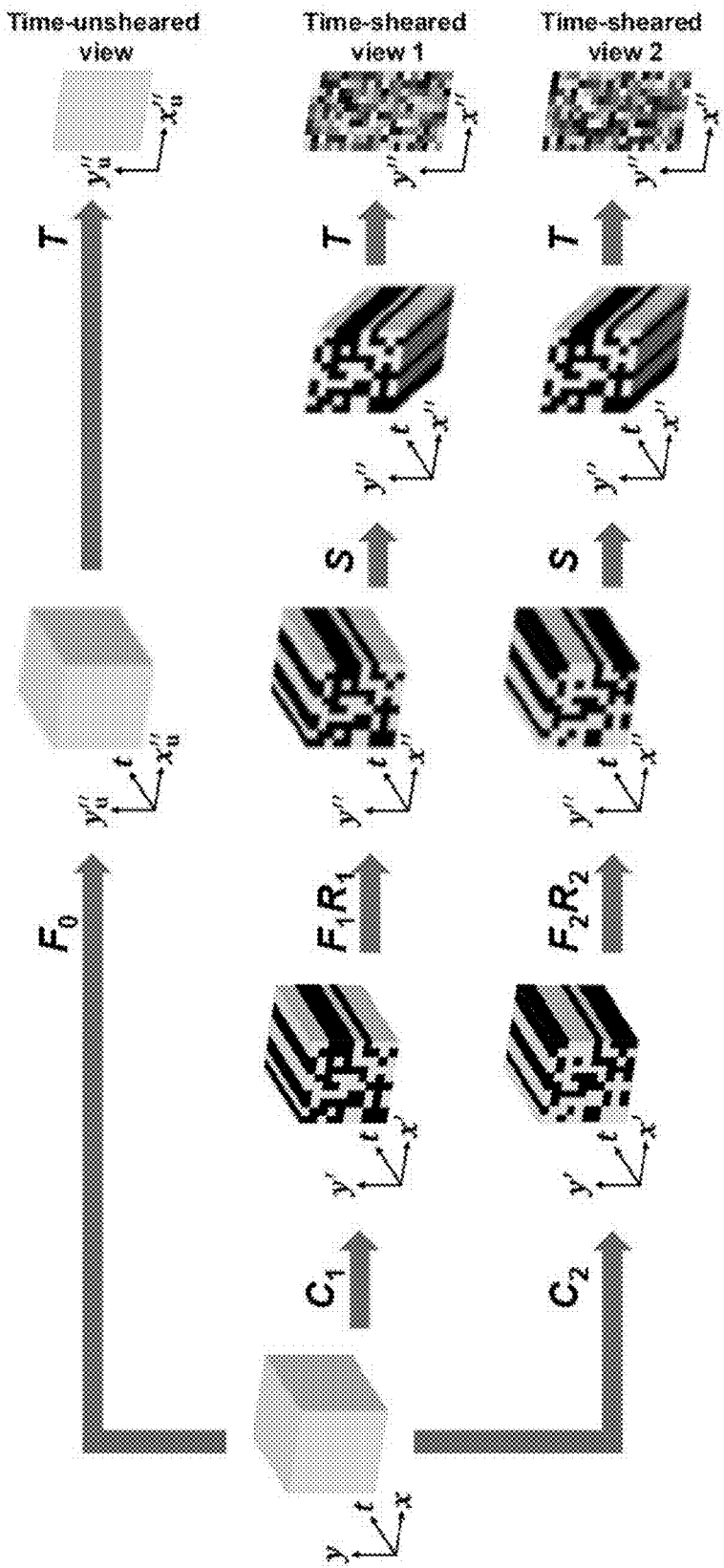
FIG. 23 is a schematic illustration of MV-CUP data acquisition, showing: t, time; x, y, spatial coordinates of the scene; x', y', spatial coordinates at the DMD plane; xu", yu", spatial coordinates at the external CCD camera; x", y" spatial coordinates at the streak camera; Ci(i=1, 2), spatial encoding operators; Fj(j=0, 1, 2), spatial low-pass filtering operators, which blur the images as indicated; Ri (i=1, 2), image co-registration operators; S, temporal shearing operator; and T, spatiotemporal integration operator.

As a computational imaging approach, the MV-CUP imaging method involves physical data acquisition and computational image reconstruction. In data acquisition, the scene is imaged in three views, as illustrated in FIG. 23. One view is directly recorded as the time-unsheared view by an external CCD camera, and the measured optical energy distribution is denoted as $E^{(0)}$. For two timesheared views, the image is first spatially encoded by a pair of complementary pseudo-random binary patterns, then temporally sheared along the vertical spatial axis using a time-shearing camera including, but not limited to, a streak camera, and finally imaged to a detector including, but not limited to, an internal CCD camera of a streak camera as optical energy distributions $E^{(1)}$ and $E^{(2)}$. Mathematically, the three views can be related to the intensity distribution of the dynamic scene I(x,y,t) as follows:

$$E^{(0)}=TF_0I(x,y,t)$$

$$E^{(1)}=TSR_1F_1C_1I(x,y,t)$$

$$E^{(2)}=TSR_2F_2C_2I(x,y,t) \quad (16)$$

where the linear operator T represents spatiotemporal integration, $F_j$ (j=0, 1, 2) represents spatial low-pass filtering, S represents temporal shearing, $R_i$ (i=1, 2) represents image coregistration in reference to the time-unsheared view, and $C_I$ (i=1, 2) represents complementary spatial encoding with $C_1+C_2=1$. The lossless complementary spatial encoding preserves more details in the dynamic scene than the lossy encoding in our first-generation CUP. Equations (16) can be concatenated as:

$$E=OI, \quad (17)$$

where $E=[E^{(0)}, \alpha E^{(1)}, \alpha E^{(2)}]^T$ and $O=[TF_0, \alpha TSR_1F_1C_1, \alpha TSR_2F_2C_2]^T$. The scalar factor $\alpha$ is related to the energy calibration of the streak camera against the external CCD camera. Given the known operator O and the spatiotemporal sparsity of the dynamic scene, a compressed-sensing reconstruction algorithm built upon the two-step iterative shrinkage/thresholding (TwIST) algorithm recovers I(x, y, t) by solving the inverse problem of equation (17).

Figure 24C:
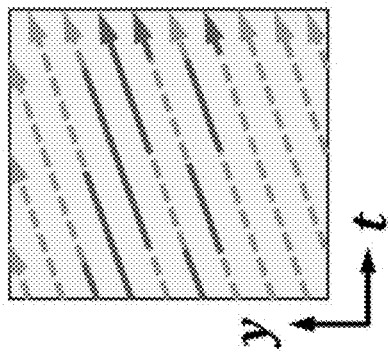
FIG. 24C is a schematic illustration of data acquisition in the first time-sheared view in the y-t coordinates. The temporal integration is along the tilted direction.
Figure 24F:
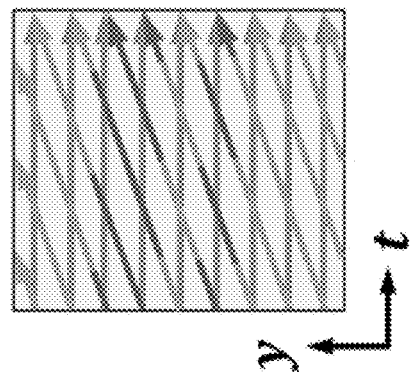
FIG. 24F is a schematic illustration of data acquisition in the MV-CUP system. The three-view projection implementation provides two lossless projection angles to the dynamic scene, where the complementary spatial encoding prevents spatiotemporal information loss. The vertical spatial axis of the dynamic scene and that of the measurement are denoted by y and y", respectively.
Figure 24B:
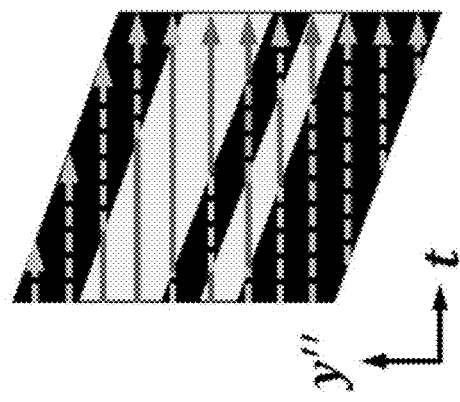
FIG. 24B is a schematic illustration of data acquisition in the first time-sheared view. Black areas in the y"-t cross section show the blocked space due to the spatial encoding. The temporal integration operates in the direction indicated by the arrow. The preserved spatiotemporal information is marked by the solid magenta lines, whereas the lost spatiotemporal information is marked as the gray dashed lines.
Figure 24E:
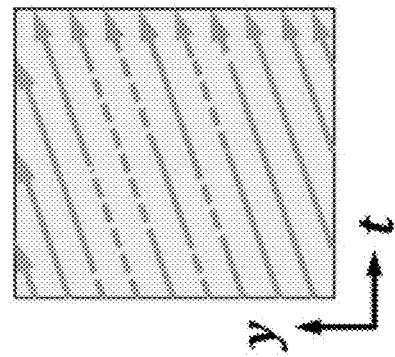
FIG. 24E is a schematic illustration similar to FIG. 24C for the second time-sheared view.
Figure 24A:
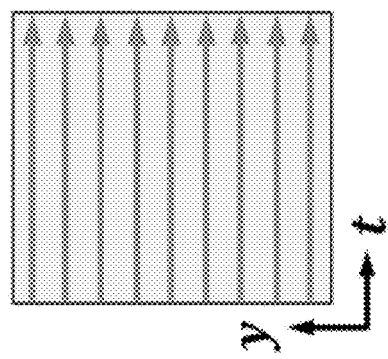
FIG. 24A is a schematic illustration of data acquisition in the time-unsheared view illustrated using a y-t cross section of the input scene. The direction of temporal integration is shown as the orange solid arrow.
Figure 24D:
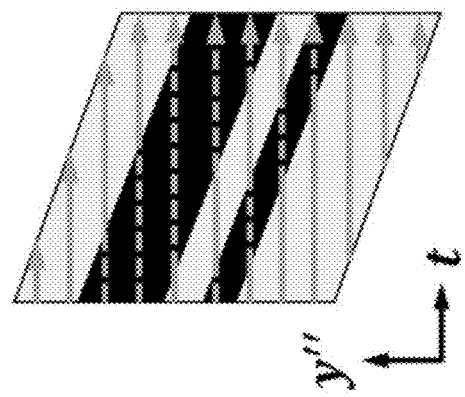
FIG. 24D is a schematic illustration similar to FIG. 24B for the second time-sheared view. The preserved spatiotemporal information is marked by the turquoise solid lines.

MV-CUP provides three views to recover more details of the dynamic scene. The time-unsheared view records only spatial information, without either spatial encoding or temporal shearing. The projection angle, represented by the direction of temporal integration, is parallel to the t axis (FIG. 24A). In comparison, the two time-sheared views record spatiotemporal information by both spatial encoding and temporal shearing before spatiotemporal integration along the x", y", and t axes, as illustrated in FIGS. 24B-24F. In the y"-t coordinates, illustrated in FIG. 24B, the temporal integration is performed along the t axis. Equivalently, in the y t coordinates illustrated in FIG. 24C, the integration is performed along the tilted direction as shown. Thus, the two time-sheared views record the dynamic scene with another projection view. In each time-sheared view, lossy spatial encoding blocks part of the scene, reducing information transmission. As lossless encoding is desired by compressed sensing theory, the two lossy time-sheared views based on complementary spatial encoding are combined to synthesize an equivalent lossless single time-sheared view. Overall, the MV-CUP imaging method combines three views (FIG. 24F) to provide two distinct lossless projection views of the dynamic scene, improving information transmission.

Figure 25A:
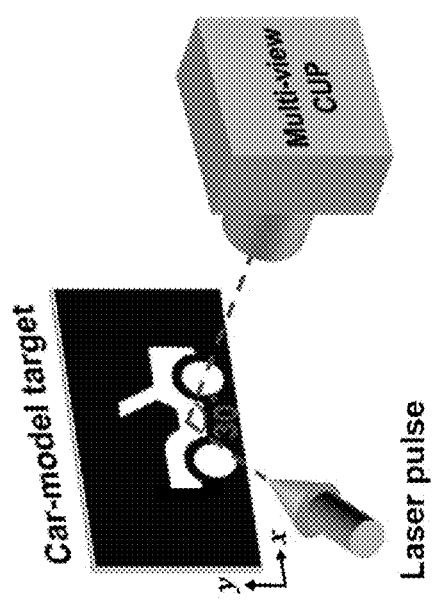
FIG. 25A is a schematic illustration showing an experimental setup for testing the MV-CUP system. A collimated laser beam illuminates a car-model target obliquely. The MV-CUP system is placed perpendicular to the target to collect the scattered photons.
Figure 25C:
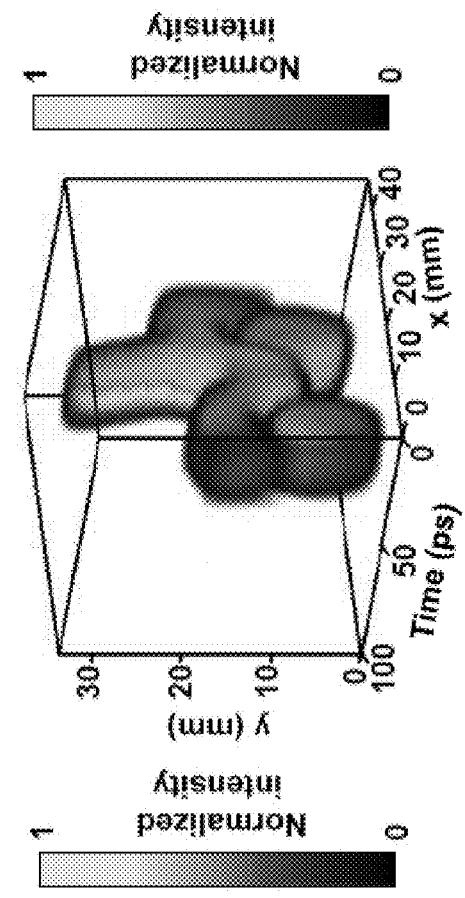
FIG. 25B and FIG. 25C are graphs showing reconstructed x, y, t images representing the superluminal sweeping of a laser pulse's wavefront upon the car-model target, using single- and multi-view CUP, respectively.
Figure 25B:
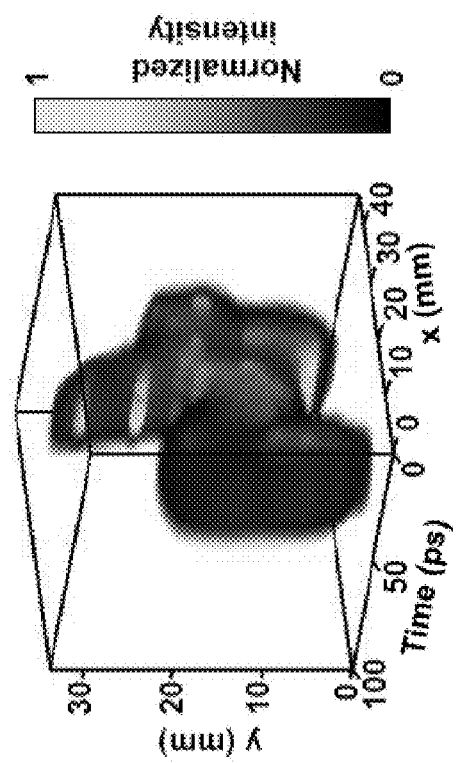
Figure 25E:
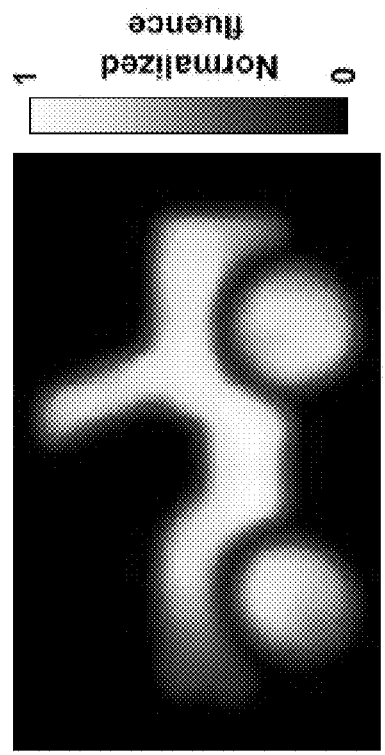
FIG. 25D and FIG. 25E are graphs corresponding to FIG. 25B and FIG. 25C, respectively, with the projected car-model target images generated by summing over the x, y, t datacube voxels along the t axis. Scale bar: 10 mm.
Figure 25D:
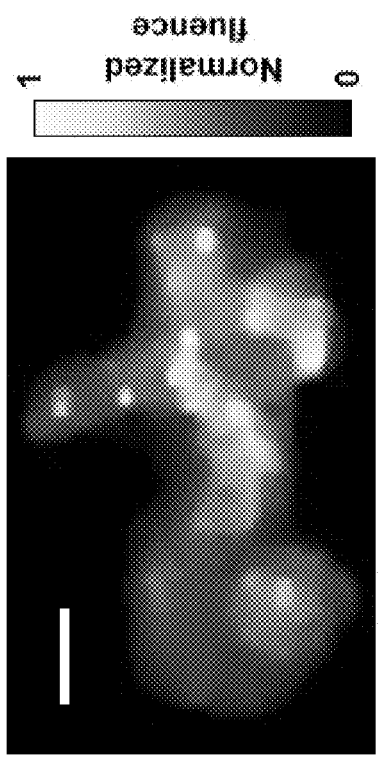

To test the multi-view implementation, we imaged the dynamic scene as shown FIG. 25A. A collimated laser pulse (532 nm wavelength, 7 ps pulse duration) was shined on a car-model target at an oblique angle of ~30 degrees with respect to the normal of the target surface, giving rise to a light wavefront sweeping across the target at a superluminal speed. The imaging system faced the pattern surface and collected the scattered photons from the scene. The dynamic scene was imaged by MV-CUP at 100 billion frames per second. The x, y, t datacube was recovered using single-view and multi-view reconstruction algorithms, as illustrated in FIG. 25B and FIG. 25C, respectively. For presentation the datacube voxels were summed along the t axis, and the resultant images corresponding to FIG. 25B and FIG. 25C are shown in FIG. 25D and FIG. 25E, respectively. The multi-view method (MV-CUP) provides far superior image quality to the single-view counterpart (CUP).

MV-CUP Forward Model

For a dynamic scene with an intensity distribution of (x, y, t), MV-CUP generates three projection views: a time-unsheared view, and two time-sheared views with complementary encoding (FIG. 23). For simplicity of notation, a unit magnification is assumed. In addition, it is assumed that the external CCD camera and the internal CCD camera of the streak camera have the same pixel size, denoted as d. In the time-unsheared view, the input scene is spatially low-pass filtered by the optical system. The intensity distribution on the external CCD camera, $I_{F0}(x, y, t)$, is given by:

$$I_{F0}(x''_u, y''_u, t) = F_0 I(x''_u, y''_u, t), \quad (18)$$

where the subscript u stands for "unsheared" and $F_0$ denotes the spatial low-pass filtering operator in the time-unsheared view. With the spatiotemporal integration operator T, the optical energy measured by the (m, n) pixel on the CCD camera is given by:

$$E_{m,n}^{(0)} = \int dx''_u \qquad (19)$$

$$\int dy''_u \left\{ \left[ \int dt I_{F0}(x''_u, y''_u, t) \right] \cdot rect\left[ \frac{x''_u}{d} - \left(m + \frac{1}{2}\right), \frac{y''_u}{d} - \left(n + \frac{1}{2}\right) \right] \right\}$$

which is essentially a Radon transform measurement from one angle (FIG. 24A). In addition, the spatially low-pass filtered scene $I_{F0}(x''_u, y''_u, t)$ can be voxelized to $I_{m,n,k}^{F0}$ as follows:

$$I_{m,n,k}^{F0} = \qquad (20)$$

$$\int dt \int dx''_u \int dy''_u I_{F0}(x''_u, y''_u, t) \cdot rect\left[ \frac{x''_u}{d} - \left(m + \frac{1}{2}\right), \frac{y''_u}{d} - \left(n + \frac{1}{2}\right), \frac{t}{\tau_s} - \left(k + \frac{1}{2}\right) \right]$$

where $\tau_s = d/v$ is the temporal interval of discretization. By combining Eqs. 19-20, $E_{m,n}^{(0)}$ can be approximated by a discrete summation, $$E_{m,n}^{(0)} = \frac{d^3}{v} \sum_{k=0}^{N_t - 1} I_{m,n,k}^{F0}, \qquad (21)$$

where $I_{m,n,k}^{F0}$ has dimensions of $N_x \times N_y \times N_t$ ($N_x$, $N_y$, and $N_t$ are the numbers of voxels along the x, y, and t axes, respectively).

In addition to the time-unsheared view, two complementary time-sheared views are acquired. For the first time-sheared view, the intensity distribution of the dynamic scene is first spatially encoded by a pseudo-random binary pattern, $c_1(x', y')$, yielding the following intensity distribution:

$$I_{c1}(x', y', t) = c_1(x', y') I(x', y', t) \qquad (22)$$

The spatially encoded dynamic scene then passes through the imaging system to the entrance port of the streak camera and is spatially low-pass filtered by the imaging system:

$$I_{F1}(x'', y'', t) = F_1 I_{c1}(x'', y'', t), \qquad (23)$$

where $F_1$ denotes the spatial low-pass filtering operator in the first time-sheared view.

A coregistration operator is then applied to $I_{F1}(x'', y'', t)$:

$$I_{R1}(x'', y'', t) = R_1 I_{F1}(x'', y'', t) \qquad (24)$$

where $R_1$ denotes the co-registration transformation from the time-unsheared view to the first time-sheared view, which accounts for system alignment imperfection.

The dynamic scene is next temporally sheared by the streak camera along the vertical spatial axis (the y'' axis in FIG. 18 in the Main Text) by:

$$I_{S1}(x'', y'', t) = I_{R1}(x'', y'' = vt, t) \qquad (25)$$

$I_{S1}(x'', y'', t)$ is imaged by an internal CCD camera in the streak camera. Akin to the time-unsheared view, the optical energy measured by the (m, n) pixel on the CCD takes the form of:

$$E_{m,n}^{(1)} = \int dx'' \qquad (26)$$

$$\int dy'' \left\{ \left[ \int dt I_{S1}(x'', y'', t) \right] \cdot rect\left[ \frac{x''}{d} - \left(m + \frac{1}{2}\right), \frac{y''}{d} - \left(n + \frac{1}{2}\right) \right] \right\}$$

In addition, $I_{F1}(x'', y'', t)$ can be voxelized to $I_{m,n,k}^{F1}$ as follows:

$$I_{m,n,k}^{F1} = \qquad (27)$$

$$\int dt \int dx'' \int dy'' I_{F1}(x'', y'', t) \cdot rect\left[ \frac{x''}{d} - \left(m + \frac{1}{2}\right), \frac{y''}{d} - \left(n + \frac{1}{2}\right), \frac{t}{\tau_s} - \left(k + \frac{1}{2}\right) \right]$$

Equation (26) can be rewritten in a discrete form as:

$$E_{m,n}^{(1)} = \frac{d^3}{v} \sum_{k=0}^{n-1} I_{f_{R1}(m,n), g_{R1}(m,n) - k, k}^{F1} \qquad (28)$$

where $I_{f_{R1}(m,n), g_{R1}(m,n) - k, k}^{F1}$ represents a spatially encoded, spatially low-pass filtered, and temporally sheared scene with co-registration for the first time-sheared view, and $f_{R1}(m, n)$ and $g_{R1}(m, n)$ denote the coordinate transformation functions in the image co-registration for the first time-sheared view.

Given the calibrated 2D projective transformation defined by a 3-by-3 matrix:

$$\begin{bmatrix} h_{11} & h_{12} & h_{13} \\ h_{21} & h_{22} & h_{23} \\ h_{31} & h_{32} & 1 \end{bmatrix}, \qquad (29)$$

the functions $f_{R1}(m, n)$ and $g_{R1}(m, n)$ can be explicitly expressed as:

$$f_{R1}(m, n) = \text{round}\left( \frac{h_{11} m + h_{12} n + h_{13}}{h_{31} m + h_{32} n + 1} \right) \qquad (30)$$

-continued $$g_{R1}(m, n) = \text{round}\left(\frac{h_{21}m + h_{22}n + h_{23}}{h_{31}m + h_{32}n + 1}\right) \quad (31)$$

where round(·) gives the closest integer of the input real number.

Akin to the first time-sheared view, the data acquisition process of the second time-sheared view is mathematically equivalent to successively applying a series of linear operators to the intensity distribution of the input dynamic scene, as described herein above (see equation (16). Specifically, the spatial encoding operator $C_2$ is implemented by the encoding mask $c_2(x', y')$, which is complementary to that in the first time-sheared view (that is, $c_1(x', y')+c_2(x', y')=1$). The operator $R_2$ denotes the co-registration transformation for the second time-sheared view. Following a treatment similar to that for the first time-sheared view described above, we can derive the optical energy measured by the (m, n) pixel on the internal CCD camera, $E_{m,n}^{(2)}$, as:

$$E_{m,n}^{(2)} = \frac{d^3}{v}\sum_{k=0}^{n-1} I_{f_{R2}(m,n),g_{R2}(m,n)-k,k}^{F2} \quad (32)$$

where $I_{f_{R2}(m,n),g_{R2}(m,n)-k,k}^{F2}$ represents a spatially encoded, spatially low-pass filtered, and temporally sheared scene with co-registration for the second time-sheared view. $f_{R2}(m, n)$ and $g_{R2}(m, n)$ denote the coordinate transformation functions in the image co-registration for the second time-sheared view and follow the same definition as $f_{R1}(m, n)$ and $g_{R1}(m, n)$.

MV-CUP Image Reconstruction

To register all three views using co-registration operators $R_1$ and $R_2$, a resolution target was imaged. No sweeping voltage was applied to the streak camera. The external CCD camera directly imaged the resolution target. The DMD was controlled to set all micromirrors to be either "on" or "off" (corresponding to a first angle or a second angle, respectively) to direct the reflected light into the two time-sheared views to image the resolution target. To compute the co-registration operators, $R_1$ and $R_2$, a pixel-by-pixel co-registration algorithm based on the 2D projective transformation was applied to the two time-sheared views. As shown in equation (26), operator $R_1$ is coupled with the shearing and spatiotemporal integration operators and is treated as part of the overall operator of the first time-sheared view, $O_1=TSR_1F_1C_1$. To implement an iterative reconstruction method, an adjoint operator was used, which can be derived as $O^*_1=C^*_1F^*_1R^*_1(TS)^*$, in which $C^*_1$ and $(TS)^*$ are corresponding adjoint operators. In the discrete format, $R_1$'s adjoint operator, $R^*_1$, can be expressed as:

$$R^*_1 I = \sum_{p=0}^{N_p-1} <R_1 e_p, I> e_p \quad (33)$$

where $N_p = N_x \times N_y \times N_t$ is the total number of voxels in the entire datacube; $e_p$ is the p-th basis of the datacube space, where only the p-th voxel is set to 1; and $<\cdot,\cdot>$ denotes the inner product operation.

Since operator $R_1$ is a point-to-point mapping in the image space, and $e_p$ is a singlepoint image, the operation $<R_1 e_p, I> e_p$ is equivalent to picking the value of the mapped pixel in the input image I and putting it in the p-th pixel. To implement $R^*_1$, the results of $R_1 e_p$ were cached in a point-to-point map and the input image pixel values were inversely mapped to the corresponding output pixel. By following the same procedure described above, $R^*_2$ can be obtained.

In addition, the images of the resolution target captured in the three views were used to calculate the spatial low-pass filtering operator $F_j$ (j=0, 1, 2). For each view, the line spread function (LSF) in both the horizontal and vertical axes in the bar group was analyzed. The averaged FWHM of the LSF was used for the presumed Gaussian-shaped point spread function (PSF), which was used as $F_j$. In addition, because $F_j$ accounts for spatial low-pass filtering of the optical system and is a convolution operation, the corresponding adjoint operator is a correlation operation. Since the Gaussian-shaped PSF is a real and spatially symmetric function, correlation and convolution are identical, i.e. $F^*_j=F_j$.

To find the linear operators $C_i$ (i=1, 2) for the two time-sheared views, a uniform-intensity scene was used as the input image. By way of non-limiting example, the first time-sheared view is used herein below as an example to illustrate the procedure. The encoding pattern displayed on the DMD was directly imaged onto the streak camera operated with zero shearing. In addition, a background image was acquired by setting all DMD pixels to "on" (i.e. at a first angle) for the first time-sheared view. The image of the encoding pattern was divided by the background image to correct for the intensity non-uniformity pixel by pixel. Finally, the image of the intensity-corrected encoding pattern was deconvolved with $F_1$ to calculate $C_1$. For the second time-sheared view, the encoding pattern displayed on the DMD formed a complementary mask to the first time-sheared view. In addition, another background image was acquired by setting all DMD pixels to "off" for the second time-sheared view. Following the same procedure as described above, $C_2$ can be obtained.

With the prior knowledge of O, I(x, y, t) can be estimated from the measurements from the three views, E, by solving the inverse problem of equation (17) as described herein above. Because of the sparsity in the input scene, the image reconstruction can be realized by solving the following optimization problem:

$$I = \text{arg min}[\tfrac{1}{2}\|E-OI\|^2 + \beta\Phi(I)] \quad (34)$$

where the first term $\tfrac{1}{2}\|E-OI\|^2$ represents the measurement fidelity and the regularization term $\Phi(I)$ encourages sparsity. The regularization parameter $\beta$ adjusts the weight ratio between fidelity and sparsity. For MV-CUP image reconstruction, a compressed-sensing reconstruction algorithm developed from two-step iterative shrinkage/thresholding (TwIST) algorithm described herein above was employed. The three-dimensional total variation (TV) was chosen as the regularizer, given by:

$$\Phi(I)=$$

$$\sum_m \sum_{n,k} \sqrt{(I_{m,n+1,k}-I_{m,n,k})^2+(I_{m,n,k+1}-I_{m,n,k})^2} +$$

$$\sum_n \sum_{m,k} \sqrt{(I_{m+1,n,k}-I_{m,n,k})^2+(I_{m,n,k+1}-I_{m,n,k})^2} +$$

$$\sum_k \sum_{m,n} \sqrt{(I_{m+1,n,k}-I_{m,n,k})^2+(I_{m,n+1,k}-I_{m,n,k})^2} \quad (35)$$

EXAMPLES

The following examples illustrate various aspects of the disclosure.

Figure 2A:
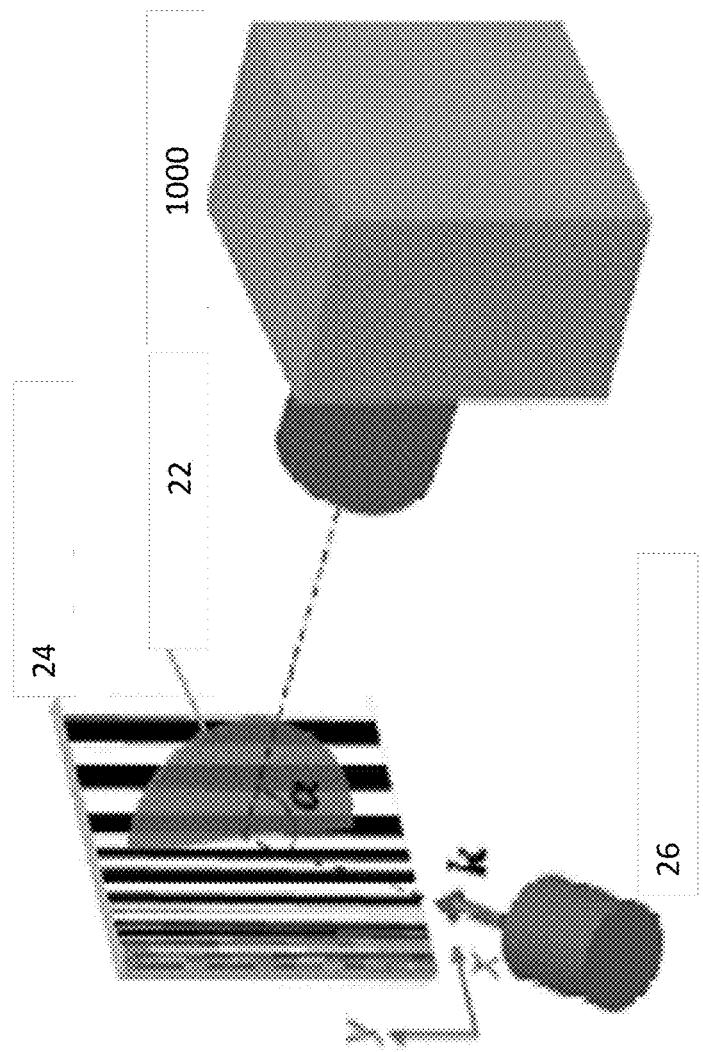
FIG. 2A is a schematic diagram illustrating the imaging of a stripe pattern using a CUP system according to one aspect.

Example 1: 2D Ultrafast Imaging of the Impingement of a Laser Pulse Upon a Stripe Pattern and Characterization of the System's Spatial Frequency Responses To characterize the system's spatial frequency responses, a dynamic scene was imaged. A laser pulse 22 impinging upon a stripe pattern 24 with varying periods is shown in FIG. 2A. The stripe periods frequency (in line pairs/mm) descends stepwise along the x axis from one edge to the other. A pulsed laser 26 delivered a collimated laser pulse (532 nm wavelength, 7 ps pulse duration, Anodyne APL-4000) to the stripe pattern 24 at an oblique angle of incidence a of about 30 degrees. The imaging system 1000 faced the pattern surface 24 and collected the scattered photons from the scene. The impingement of the light wavefront upon the pattern surface 24 was imaged by CUP at 100 billion frames per second with the streak camera's shearing velocity set to 1.32 mm/ns. The reconstructed 3D x, y, t image of the scene in intensity (W/m$^2$) is shown in FIG. 2B, and the corresponding time-lapse 2D x, y images (50 mm×50 mm FOV; 150×150 pixels frame size) were created.

Figure 2B:
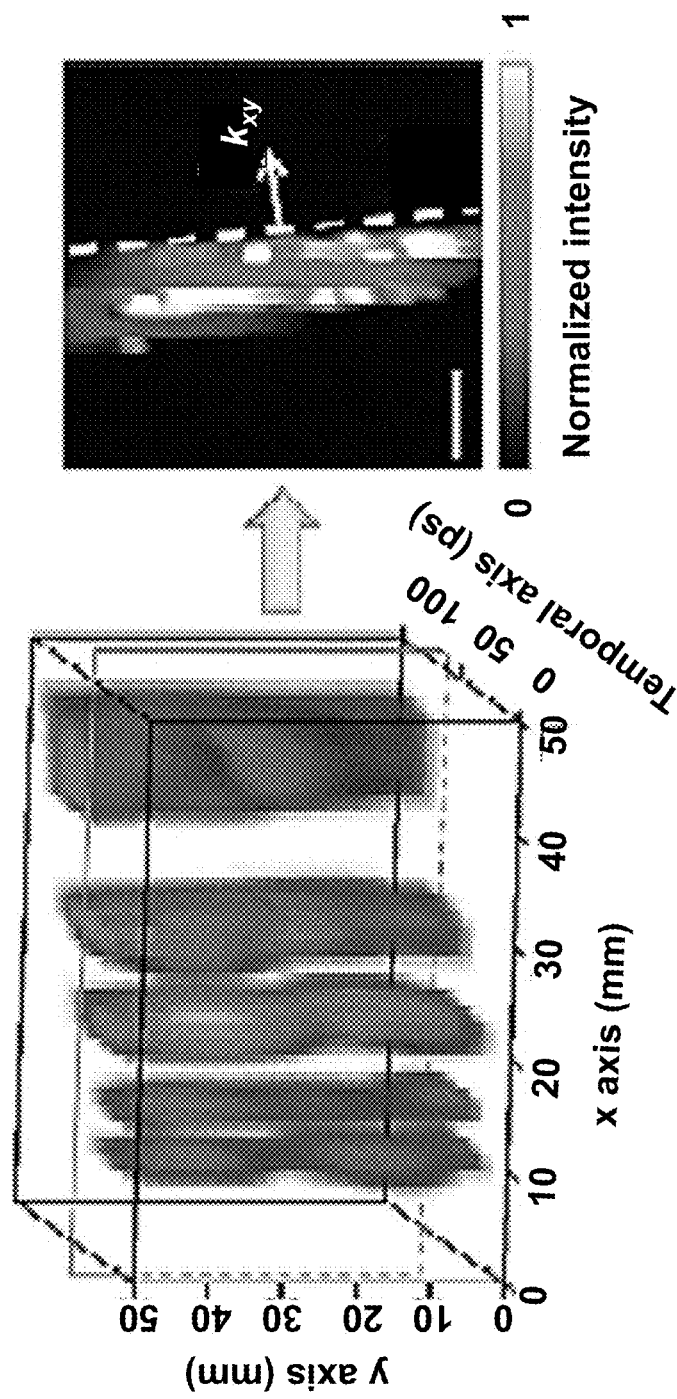
FIG. 2B is an image of a reconstructed datacube of the striped pattern and a representative frame from the reconstructed datacube obtained using the CUP system illustrated in FIG. 2A.

FIG. 2B also shows a representative temporal frame at t=60 ps. The dashed line indicates the light wavefront on the pattern surface, and the arrow denotes the in-plane light propagation direction ($k_{xy}$). Within a 10 ps frame exposure, the wavefront propagates about 3 mm in space. Including the thickness of the wavefront itself, which is about 2 mm, the wavefront image is approximately 5 mm thick along the wavefront propagation direction. The corresponding intersection with the x-y plane is 5 mm/sin α≈10 mm thick, which agrees with the actual measurement (about 10 mm).

Figure 2D:
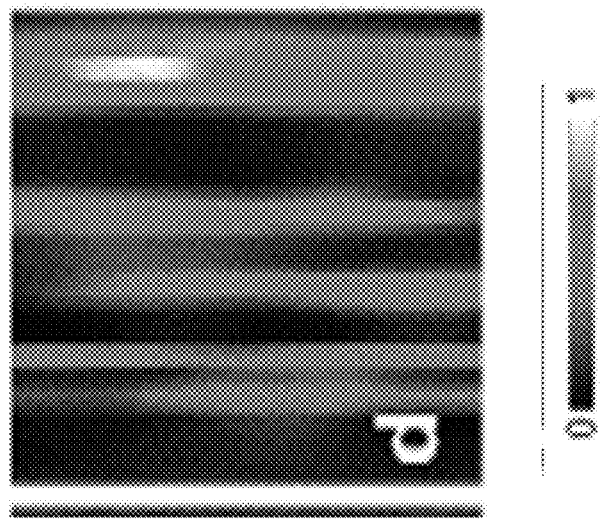
FIG. 2D is a projected vertical stripe image obtained using a CUP system according to one aspect and calculated by summing over x, y, and t datacube voxels along a temporal axis.
Figure 2C:
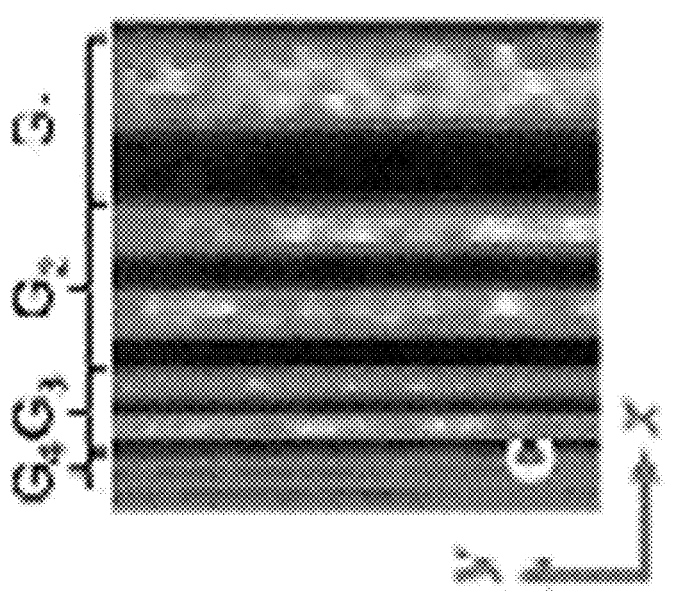
FIG. 2C is a reference image obtained using a CUP system according to one aspect without introducing temporal dispersion.
Figure 2E:
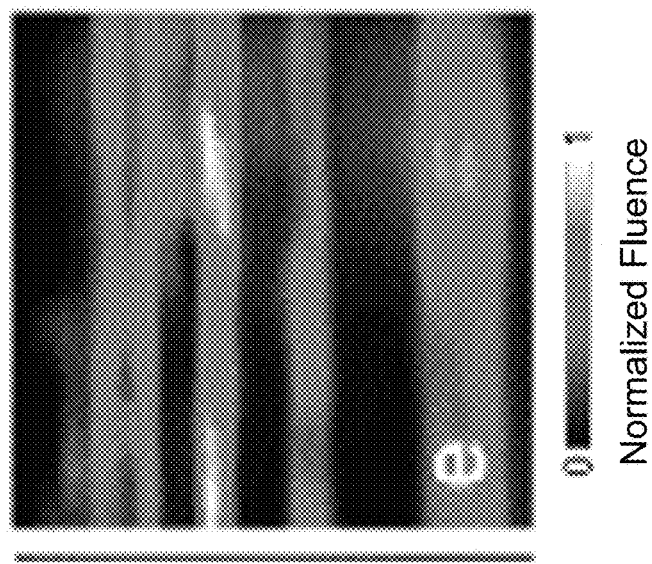
FIG. 2E is a projected horizontal stripe image obtained using a CUP system according to one aspect and calculated by summing over x, y, and t datacube voxels along a temporal axis.
Figure 2F:
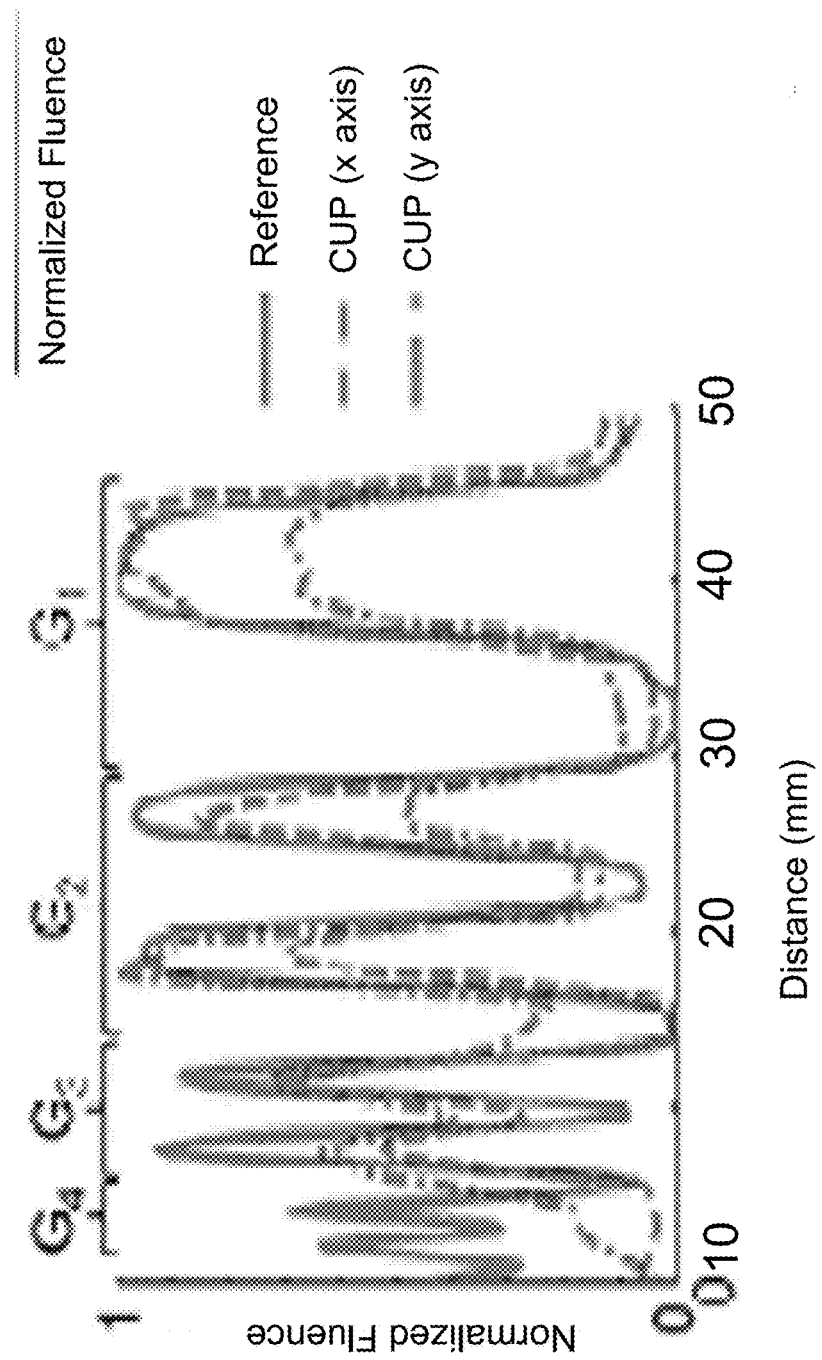
FIG. 2F is a graph comparing the average light fluence distributions along the x axis from FIG. 2C (Reference), along the x axis from FIG. 2D (CUP (x axis)), and along the y axis from FIG. 2E (CUP (y axis)).

To provide a reference, the scene was directly imaged in fluence (J/m$^2$) without introducing temporal dispersion (FIG. 2C). Next, the stripe pattern was rotated in 22.5° steps to four additional angles (22.5°, 45°, 67.5°, and 90° with respect to the x axis) and repeated the light sweeping experiment. The x, y, t scenes were projected onto the x, y plane by summing over the voxels along the temporal axis. The resultant images at two representative angles (0° and 90°) are shown in FIGS. 2D and 2E, respectively. The average light fluence distributions were compared along the x axis from FIG. 2C and FIG. 2D as well as that along the y axis from FIG. 2E. The comparison in FIG. 2F indicates that the CUP system can recover spatial frequencies up to 0.3 line pairs/mm (groups $G_1$, $G_2$, and $G_3$) along both x and y axes; however, the stripes in group $G_4$—having a fundamental spatial frequency of 0.6 line pairs/mm—are beyond the CUP system's resolution. This bandwidth limitation was further analysed by computing the spatial frequency spectra of the average light fluence distributions for all five orientations (FIG. 2G). Each angular branch appears continuous rather than discrete because the object has multiple stripe groups of varied frequencies and each has a limited number of periods. As a result, the spectra from the individual groups are broadened and overlapped. The CUP's spatial frequency response band is delimited by the inner white dashed circle, whereas the band purely limited by the optical modulation transfer function of the system without temporal shearing—derived from the reference image (FIG. 2C)—is enclosed by the outer yellow dash-dotted circle. Thus, the CUP system achieved temporal resolution at the expense of some spatial resolution.

Example 2: 2D Ultrafast Imaging of Laser Pulse Reflection, Refraction, and Racing of Two Pulses in Different Media, and Characterization of the System's Temporal Resolution To demonstrate CUP's 2D ultrafast imaging capability, three fundamental physical phenomena were imaged with single laser shots: laser pulse reflection, refraction, and racing of two pulses in different media (air and resin). It is important to mention that one-time events were truly recorded: only a single laser pulse was fired during image acquisition. In these experiments, to encompass the events within a preset time window (10 ns) on the streak camera, the pulsed laser (Anodyne APL-4000) was synchronized with the streak camera through a digital delay generator (Stanford Research Systems DG645). Moreover, to scatter light from the media to the CUP system, dry ice was evaporated into the light path in the air and added zinc oxide powder into the resin, respectively.

Figure 3A:
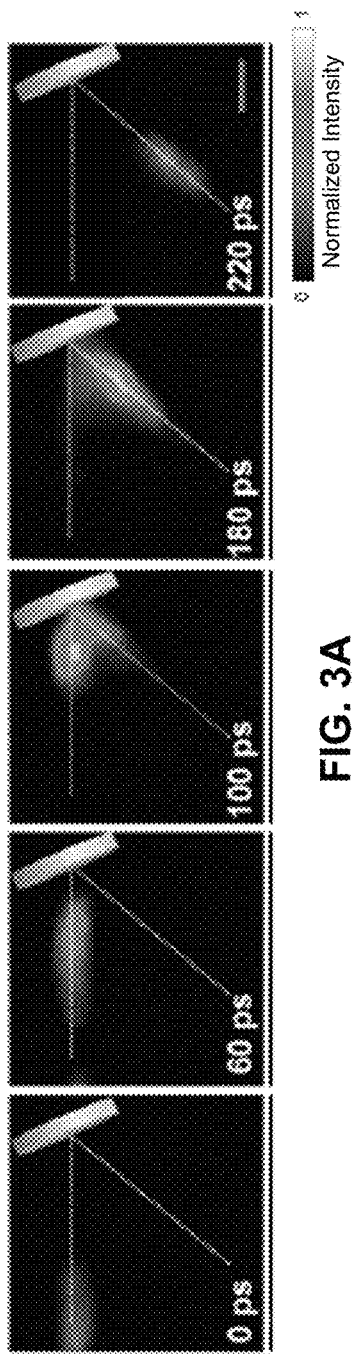
FIG. 3A is a series of images of laser pulse reflection obtained using obtained using a CUP system according to one aspect.
Figure 3B:
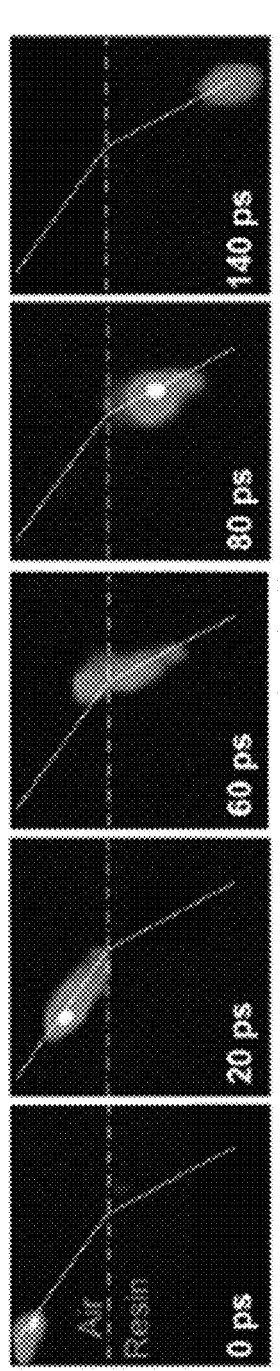
FIG. 3B is a series of images of laser pulse refraction obtained using a CUP system according to one aspect.

FIGS. 3A and 3B show representative time-lapse frames of a single laser pulse reflected from a mirror in the scattering air and refracted at an air—resin interface, respectively. With a shearing velocity of 0.66 mm/ns in the streak camera, the reconstructed frame rate is 50 billion frames per second. Such a measurement allows the visualisation of a single laser pulse's compliance to the laws of light reflection and refraction, the underlying foundations of optical science. It is worth noting that the heterogeneities in the images are likely attributable to turbulence in the vapour and non-uniform scattering in the resin.

Figure 3C:
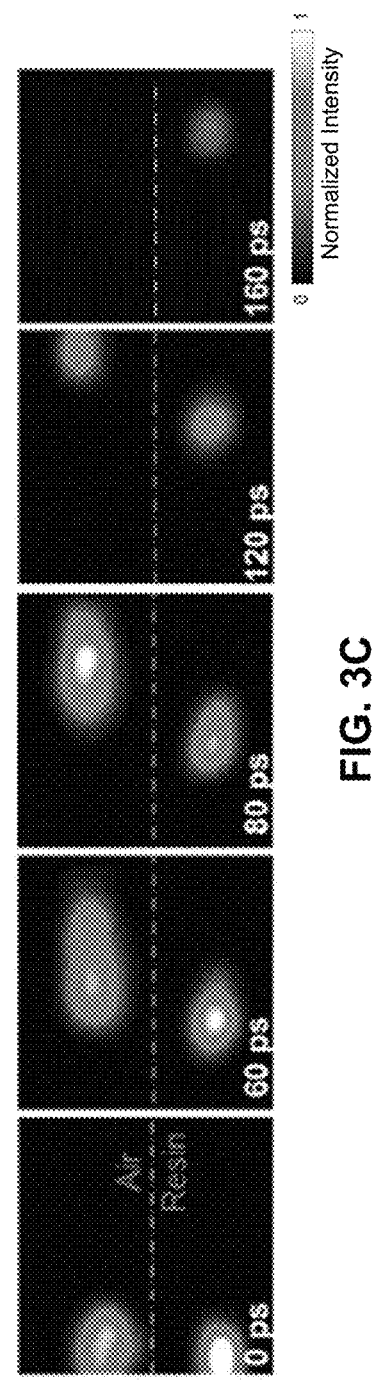
FIG. 3C is a series of images of two laser pulses propagating in air and in resin obtained using a CUP system according to one aspect.
Figure 3D:
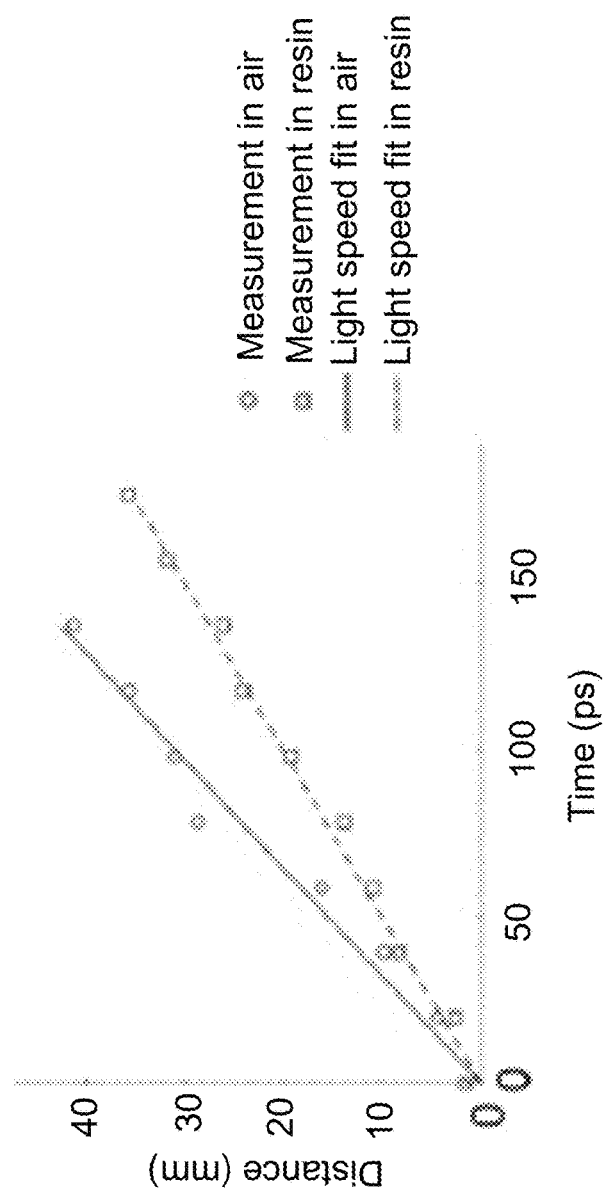
FIG. 3D is a graph comparing the change in position with time of a laser pulse in air and in resin measured from the images of FIG. 3C.

To validate CUP's ability to quantitatively measure the speed of light, photon racing was imaged in real time. The original laser pulse was split into two beams: one beam propagated in the air and the other in the resin. The representative time-lapse frames of this photon racing experiment are shown in FIG. 3C. As expected, due to the different refractive indices (1.0 in air and 1.5 in resin), photons ran faster in the air than in the resin. By tracing the centroid from the time-lapse laser pulse images (FIG. 3D), the CUP-recovered light speeds in the air and in the resin were $(3.1±0.5)×10^8$ m/s and $(2.0±0.2)×10^8$ m/s, respectively, consistent with the theoretical values ($3.0×10^8$ m/s and $2.0×10^8$ m/s). Here the standard errors are mainly attributed to the resolution limits.

By monitoring the time-lapse signals along the laser propagation path in the air, CUP's temporal resolution was quantified. Because the 7 ps pulse duration is shorter than the frame exposure time (20 ps), the laser pulse was considered as an approximate impulse source in the time domain. The temporal point-spread-functions (PSF) were measured at different spatial locations along the light path imaged at 50 billion frames per second (20 ps frame exposure time), and their full widths at half maxima averaged 74 ps. Additionally, to study the dependence of CUP's temporal resolution on the frame rate, this experiment was repeated at 100 billion frames per second (10 ps frame exposure time) and re-measured the temporal PSFs. The mean temporal resolution was improved from 74 ps to 31 ps at the expense of signal-to-noise ratio. At a higher frame rate (i.e., higher shearing velocity in the streak camera), the light signals are spread over more pixels on the CCD camera, reducing the signal level per pixel and thereby causing more potential reconstruction artefacts.

Figure 4A:
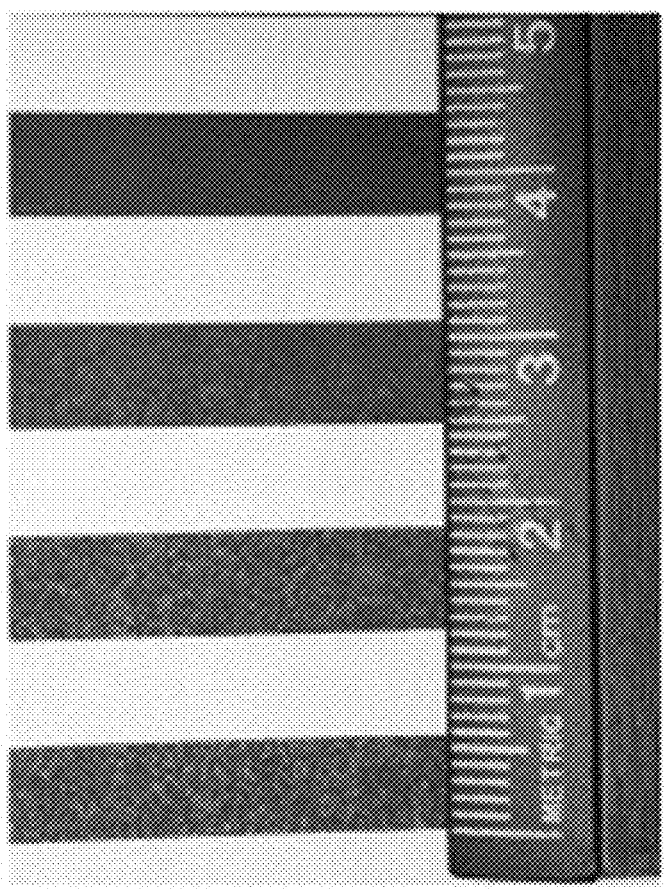
FIG. 4A is a photographic image of a stripe pattern with a constant period of 12 mm.

Example 3: 2D Ultrafast Imaging of Faster-than-Light (FTL) Travel of Non-Information To explore CUP's potential application in modern physics, apparent faster-than-light phenomena were imaged in 2D movies. According to Einstein's theory of relativity, the propagation speed of matter cannot surpass the speed of light in vacuum because it would need infinite energy to do so. Nonetheless, if the motion itself does not transmit information, its speed can be faster than light. This phenomenon is referred to as faster-than-light propagation of non-information. To visualise this phenomenon with CUP, an experiment was designed using a setup similar to that shown in FIG. 2A. The pulsed laser illuminates the scene at an oblique angle of incidence of about 30 degrees, and CUP images the scene normally (0 degree angle). To facilitate the calculation of speed, a stripe pattern was imaged with a constant period of 12 mm (FIG. 4A).

Figure 4B:
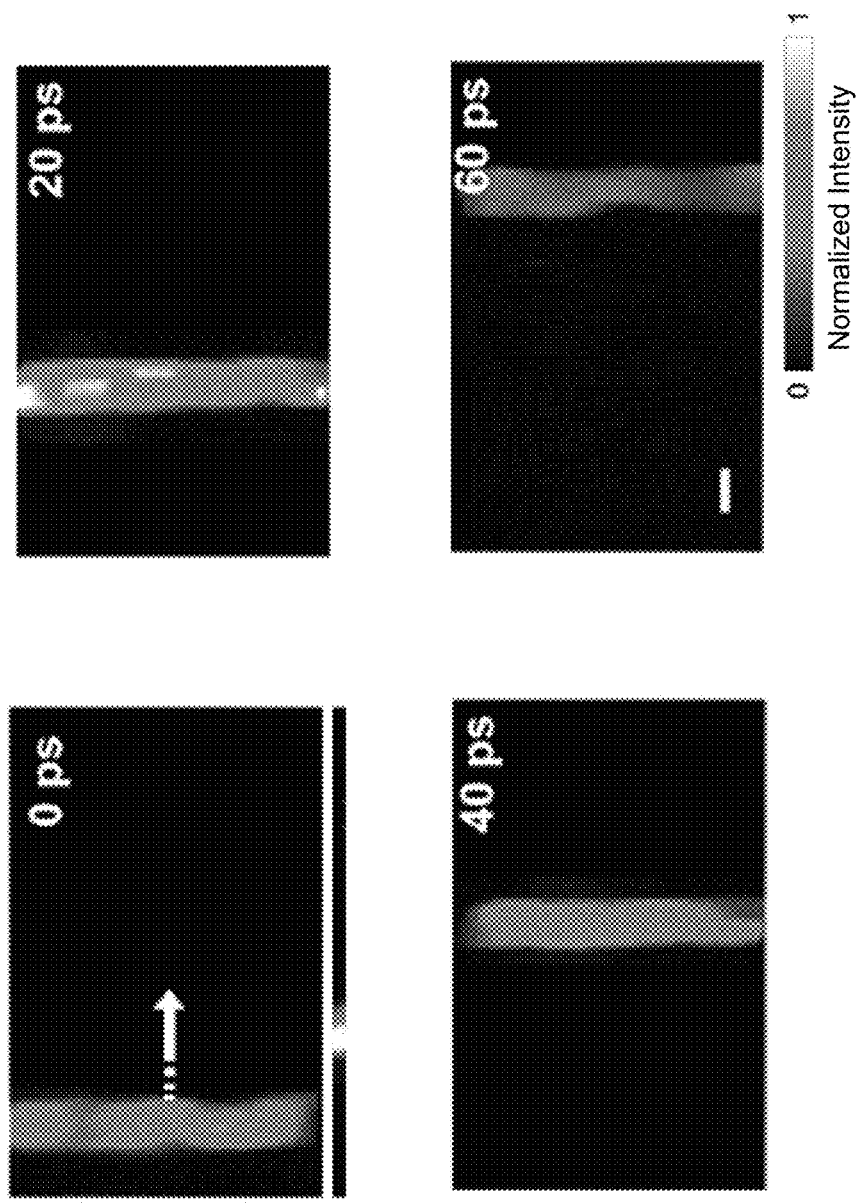
FIG. 4B is a series of images of an optical wavefront sweeping across the stripe pattern depicted in FIG. 4A that was obtained using a CUP system according to one aspect.
Figure 4C:
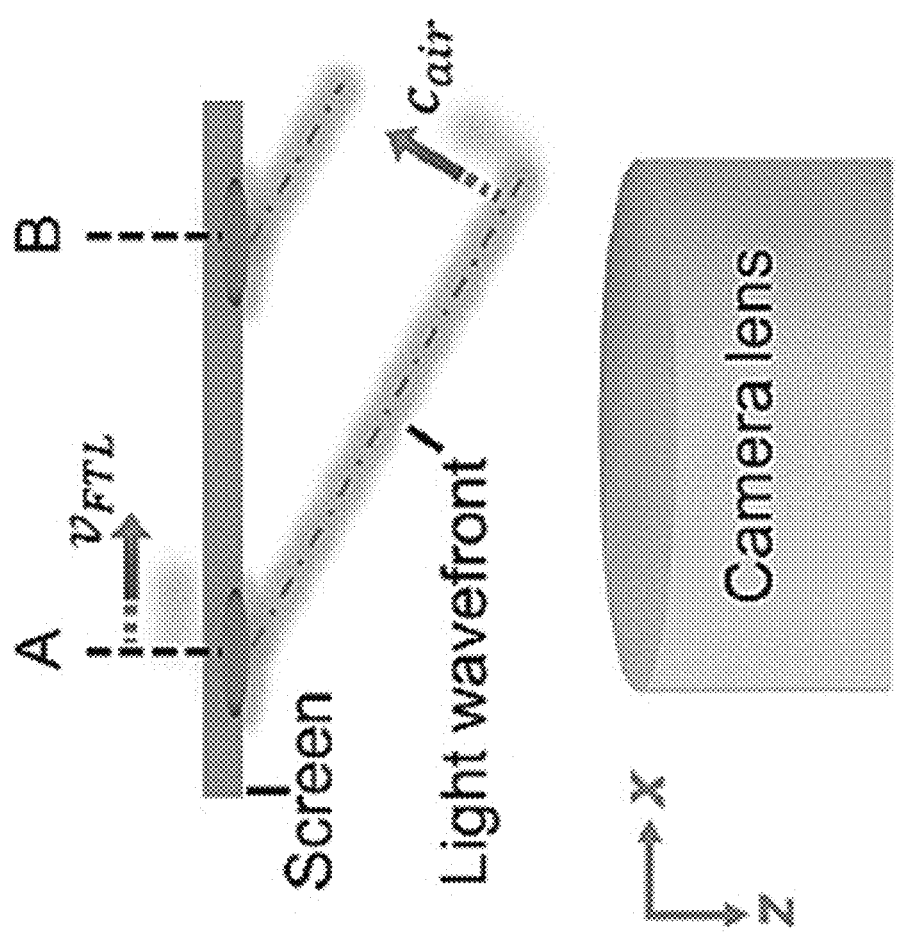
FIG. 4C is a schematic diagram illustrating the intersection of optical wavefronts with the pattern depicted in FIG. 4A.

The movement of a light wavefront intersecting with this stripe pattern is captured at 100 billion frames per second with the streak camera's shearing velocity set to 1.32 mm/ns. Representative temporal frames are provided in FIG. 4B. As shown in FIG. 4B, the white stripes shown in FIG. 4A are illuminated sequentially by the sweeping wavefront. The speed of this motion, calculated by dividing the stripe period by their lit-up time interval, is $V_{FTL}$=12 mm/20 ps=6×10$^8$ m/s, two times of the speed of light in the air due to the oblique incidence of the laser beam. As shown in FIG. 4C, although the intersected wavefront—the only feature visible to the CUP system—travels from location A to B faster than the light wavefront, the actual information is carried by the wavefront itself, and thereby its transmission velocity is still limited by the speed of light in the air.

Example 4: Multicolor Compressed-Sensing Ultrafast Photography (Multicolor-CUP)

To extend CUP's functionality to reproducing colors, a spectral separation module was added in front of the streak camera. As shown in FIG. 5A, a dichroic filter 302 (562 nm cut-on wavelength) is mounted on a mirror 304 at a small tilt angle 314 (~5°). The light reflected from this module is divided into two beams according to the wavelength: green light (wavelength <562 nm) is directly reflected from the dichroic filter 302, while red light (wavelength >562 nm) passes through the dichroic filter 302 and bounces from the mirror 304. Compared with the depth of field of the imaging system, the introduced optical path difference between these two spectral channels is negligible, therefore maintaining the images in focus for both colors.

Figure 5B:
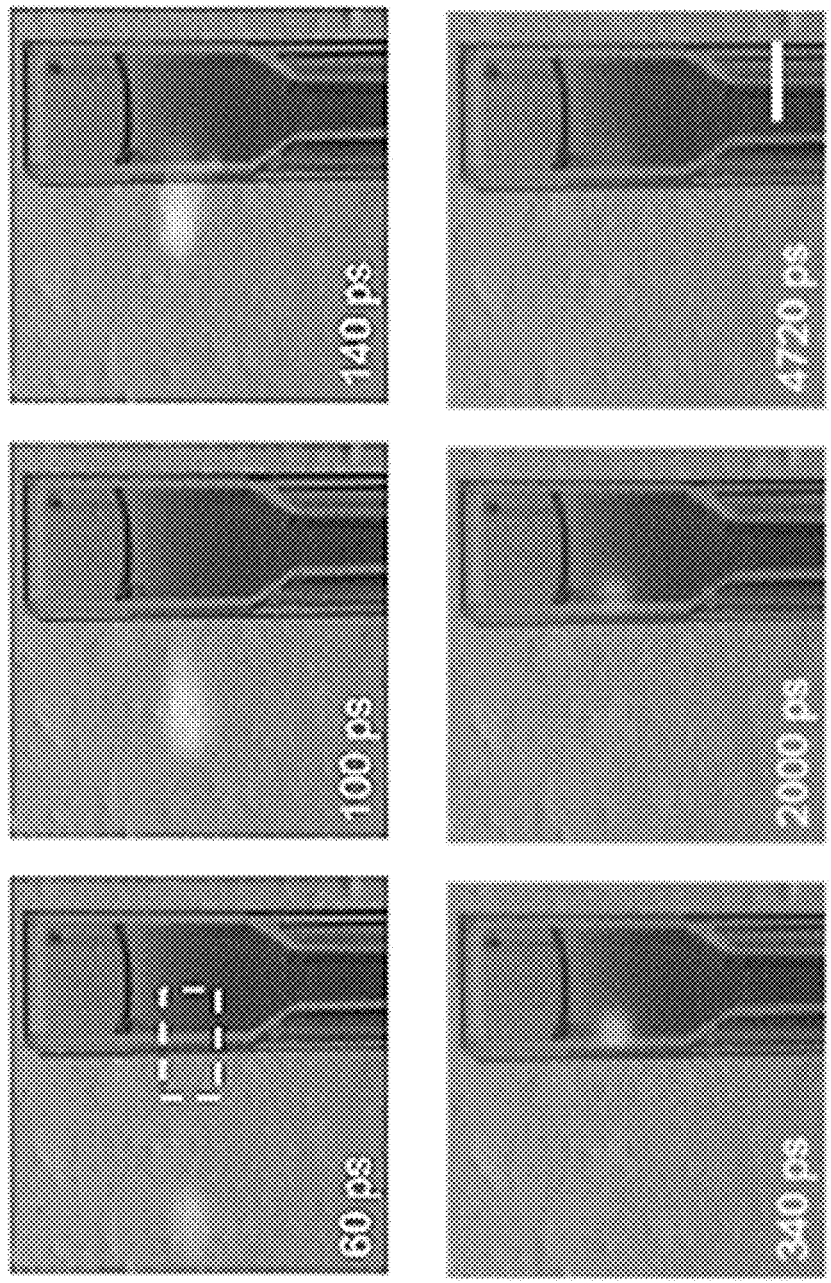
FIG. 5B is a series of images of a pulsed-laser-pumped fluorescence emission process obtained using the multicolor compressed-sensing ultrafast photography (Multicolor-CUP) system illustrated in FIG. 5A.
Figure 5C:
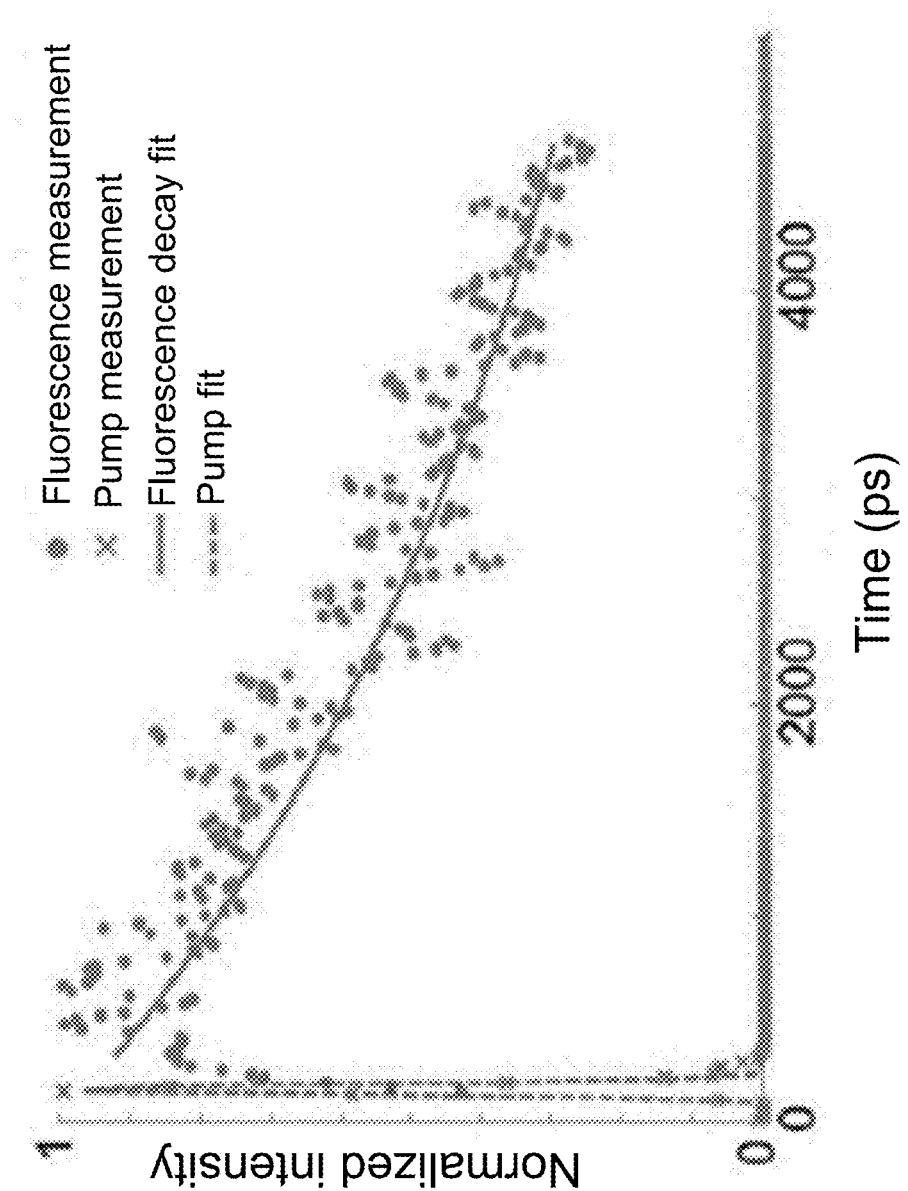
FIG. 5C is a graph summarizing the time-lapse pump laser and fluorescence emission intensities within the dashed box shown in FIG. 5B.

Using the multicolor CUP system, a pulsed-laser-pumped fluorescence emission process was imaged. A fluorophore, Rhodamine 6G, in water solution was excited by a single 7 ps laser pulse at 532 nm. To capture the entire fluorescence decay, 50 billion frames per second was used by setting a shearing velocity of 0.66 mm/ns on the streak camera. Some representative temporal frames are shown in FIG. 5B. In addition, the time-lapse mean signal intensities were calculated within the dashed box in FIG. 5B for both the green and red channels (FIG. 5C). Based on the measured fluorescence decay, the fluorescence lifetime was found to be 3.8 ns, closely matching a previously reported value.

Figure 6B:
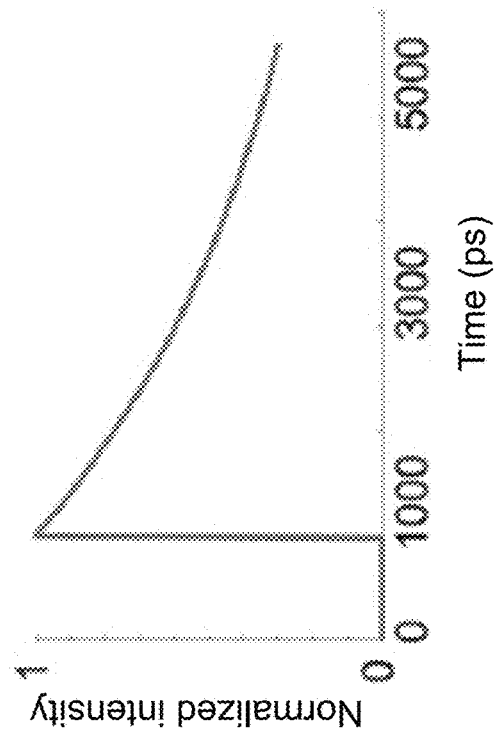
FIG. 6B is a graph of an event function describing the fluorescence emission from a simulated temporal responses of a pulsed-laser-pumped fluorescence emission.
Figure 6A:
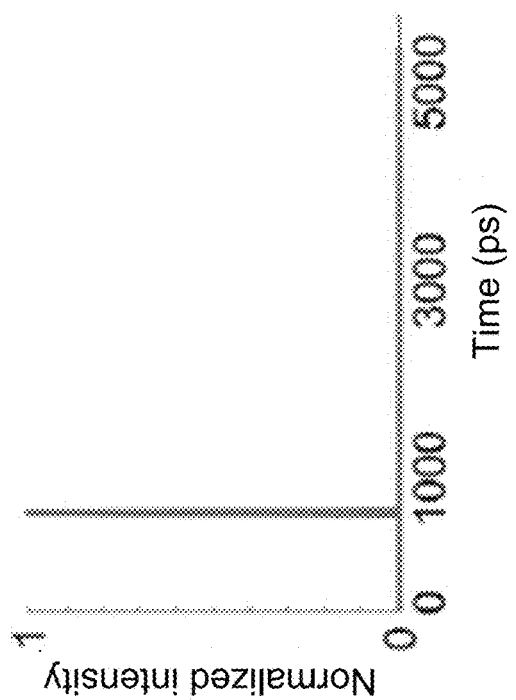
FIG. 6A is a graph of an event function describing the pulsed laser fluorescence excitation from a simulated temporal response of a pulsed-laser-pumped fluorescence emission.
Figure 6D:
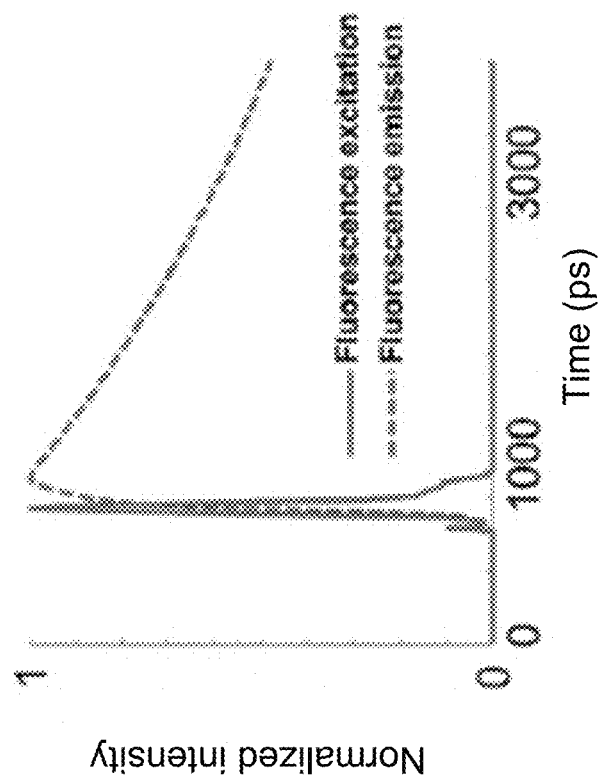
FIG. 6D is a graph illustrating the simulated temporal responses of the two event functions shown in FIG. 6A and FIG. 6B after being convolved with the temporal PSF shown in FIG. 6C.

In theory, the time delay from the pump laser excitation to the fluorescence emission due to the molecular vibrational relaxation is ~6 ps for Rhodamine 6G. However, results show that the fluorescence starts to decay ~180 ps after the pump laser signal reaches its maximum. In the time domain, with 50 billion frames per second sampling, the laser pulse functions as an approximate impulse source while the onset of fluorescence acts as a decaying edge source. Blurring due to the temporal PSF stretches these two signals' maxima apart. This process was theoretically simulated by using the experimentally measured temporal PSF and the fitted fluorescence decay as the input. The time lag between these two events was found to be 200 ps, as shown in FIG. 6D, which is in good agreement with experimental observation.

Figure 6C:
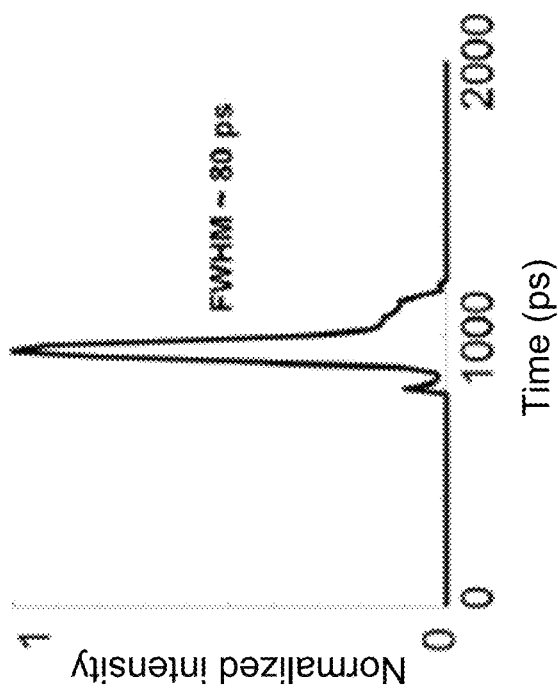
FIG. 6C is a graph of a measured temporal point-spread-function (PSF).

A simulation of temporal responses of pulsed-laser-pumped fluorescence emissions was conducted. FIG. 6A shows an event function describing the pulsed laser fluorescence excitation. FIG. 6B shows an event function describing the fluorescence emission. FIG. 6C is a measured temporal point-spread-function (PSF), with a full width at half maximum of ~80 ps. Due to reconstruction artefacts, the PSF has a side lobe and a shoulder extending over a range of 280 ps. FIG. 6D are simulated temporal responses of these two event functions after being convolved with the temporal PSF. The maxima of these two time-lapse signals are stretched by 200 ps.

Example 5: Simulation of Temporal Responses of Pulsed-Laser-Pumped Fluorescence Emission The temporal response of pulsed-laser-pumped fluorescence emission was simulated in Matlab. The arrival of the pump laser pulse and the subsequent fluorescence emission are described by a Kronecker delta function (FIG. 6a) and an exponentially decaying edge function (FIG. 6b), respectively. For the Rhodamine 6G fluorophore, the molecular vibrational relaxation time was neglected and the arrival of the pump laser pulse and the onset of fluorescence emission were considered to be simultaneous. After pump laser excitation, the decay of the normalized fluorescence intensity, $\hat{I}(t)$, is modelled as $\hat{I}(t)=\exp(-t/\tau)$, where $\tau$=3.8 ns. To simulate the temporal-PSF-induced blurring, an experimentally measured temporal PSF (Extended Data FIG. 1c) was convolved with these two event functions shown in FIGS. 6A and 6B. The results in FIG. 6D indicate that this process introduces an approximate 200 ps time delay between the signal maxima of these two events. Although the full width at half maximum of the main peak in the temporal PSF is only ~80 ps, the reconstruction-induced side lobe and shoulder extend over a range of 280 ps, which temporally stretches the signal maxima of these two events apart.

Example 6: Depth Resolution of ToF-CUP 3D Imaging

Figure 10A:
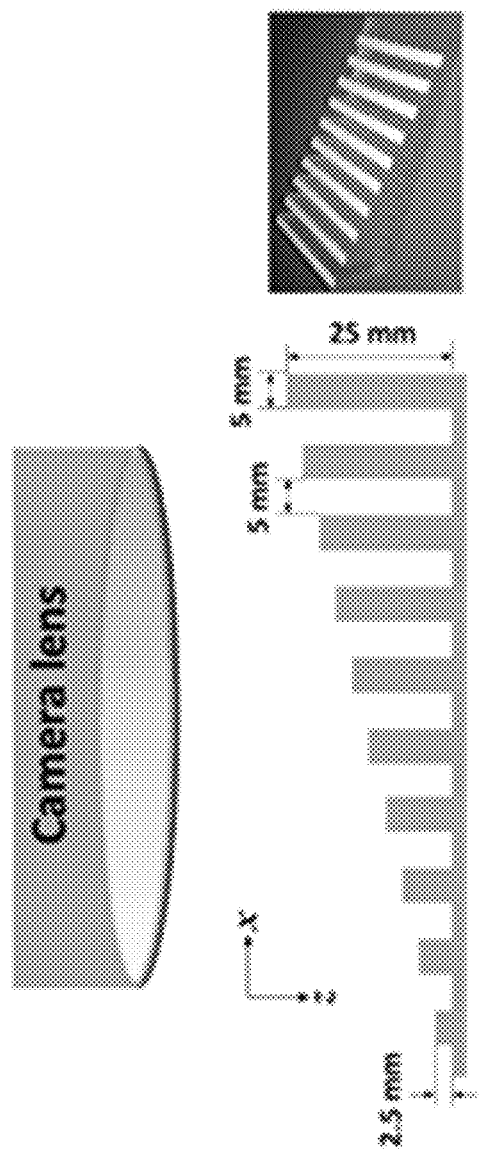
FIG. 10A is a schematic diagram of a target body positioned beneath a camera lens of a ToF-CUP system.
Figure 10B:
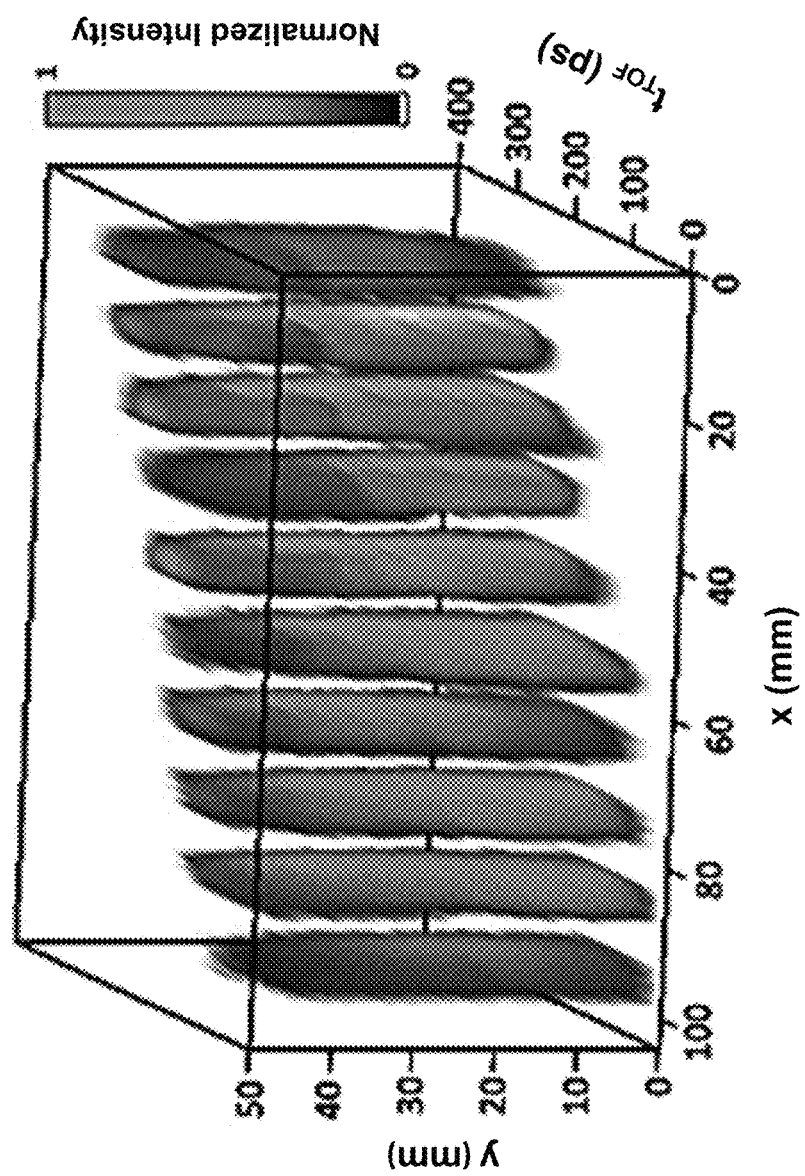
FIG. 10B is a graph of the reconstructed x, y, $t_{ToF}$ datacube representing the backscattered laser pulse intensity from the fins with different depths of the target body illustrated in FIG. 10A.
Figure 10C:
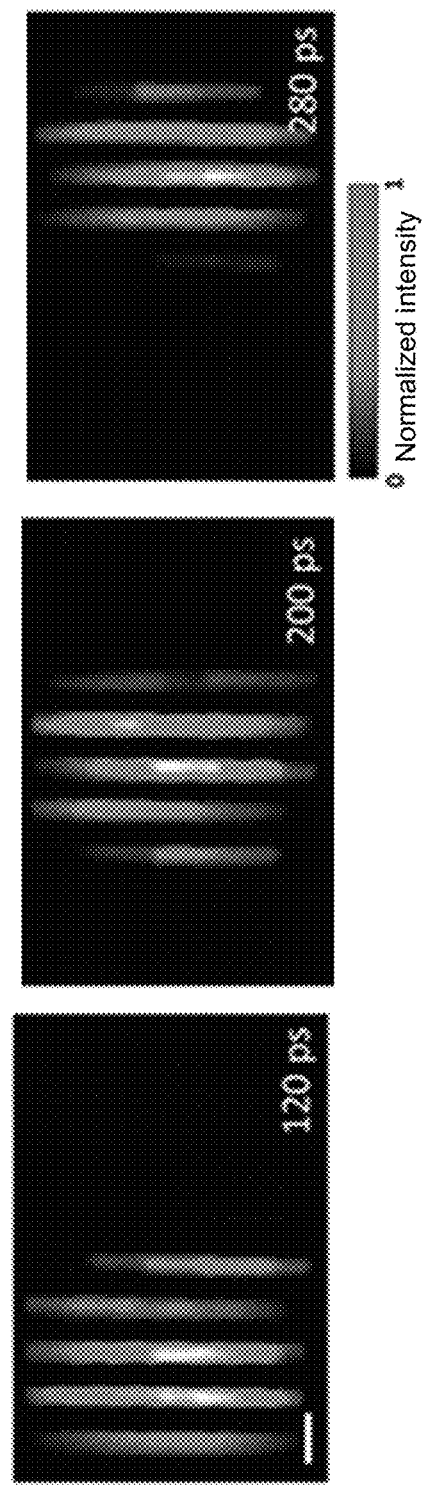
FIG. 10C is a series of representative x-y frames obtained by a ToF-CUP system at $t_{ToF}$=120, 200, and 280 ps.

To quantify the ToF-CUP system's depth resolution, a 3D target with fins of varying heights (FIG. 10A) was imaged. This target (100 mm×50 mm along the x and y axes) was fabricated using a 3D printer (Form 1+, Formlabs). Along the x axis, each fin had a width of 5 mm, and the height of the fins ascended from 2.5 mm to 25 mm, in steps of 2.5 mm. The imaging system was placed perpendicular to the target and collected the backscattered photons from the surface. Image reconstruction retrieved the ToF 2D images (FIG. 10B). Three representative temporal frames at $t_{ToF}$=120, 200, and 280 ps are shown in FIG. 10C. In each frame, five fins are observed, indicating that the system's depth resolution is approximately 10 mm.

Example 7: ToF-CUP 3D Imaging of Static Objects

Figure 11C:
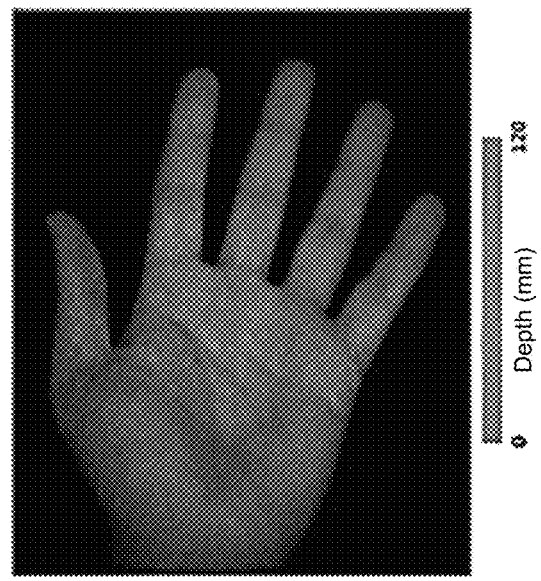
FIG. 11C is a depth-encoded ToF-CUP image of a human hand.
Figure 11B:
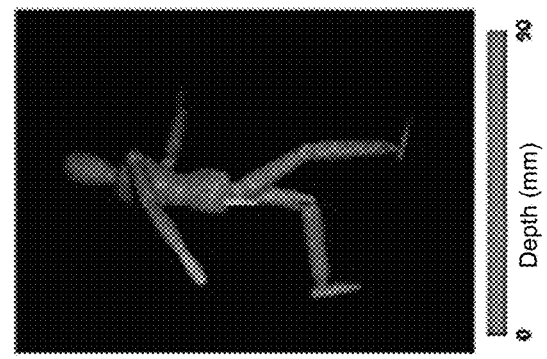
FIG. 11B is a depth-encoded ToF-CUP image of a wooden mannequin.
Figure 11A:
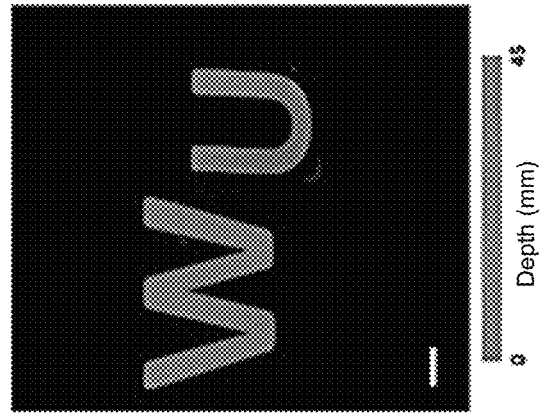
FIG. 11A is a depth-encoded ToF-CUP image of the stationary letters "W" and "U" with a depth separation of 40 mm.

To demonstrate ToF-CUP's 3D imaging capability, static objects were imaged. Specifically, two letters, "W" and "U", were placed with a depth separation of 40 mm. The streak camera acquired a spatially-encrypted, temporally-sheared image of this 3D target in a single snapshot. The reference camera also directly imaged the same 3D target without temporal shearing to acquire a reference. The ToF signal was converted into depth information as described herein above, and ToF-CUP reconstructed a 3D x, y, z image of the target. For each pixel in the x-y plane, we found the maximum intensity in the z axis and recorded that coordinate to build a depth map. We color-encoded this depth map and overlaid it with the reference image to produce a depth-encoded image (FIG. 11A). For this object, the depth distance between the two letters was measured to be ~40 mm, which agreed with the true value. In addition, we imaged two additional static objects, a wooden mannequin and a human hand (FIGS. 11B and 11C). In both cases, the depth information of the object was obtained using ToF-CUP. It is worth noting that the lateral resolution of the reconstructed datacube was ~0.1 line pairs per mm, and the reference images taken by the external CCD camera had a higher lateral resolution (~0.8 line pairs per mm). Because the depth-encoded image was produced by overlaying the depth map with the reference image, it had a lateral resolution limited by the reconstructed datacube.

Example 8: Encryption of ToF-CUP 3D Images

Figure 12A:
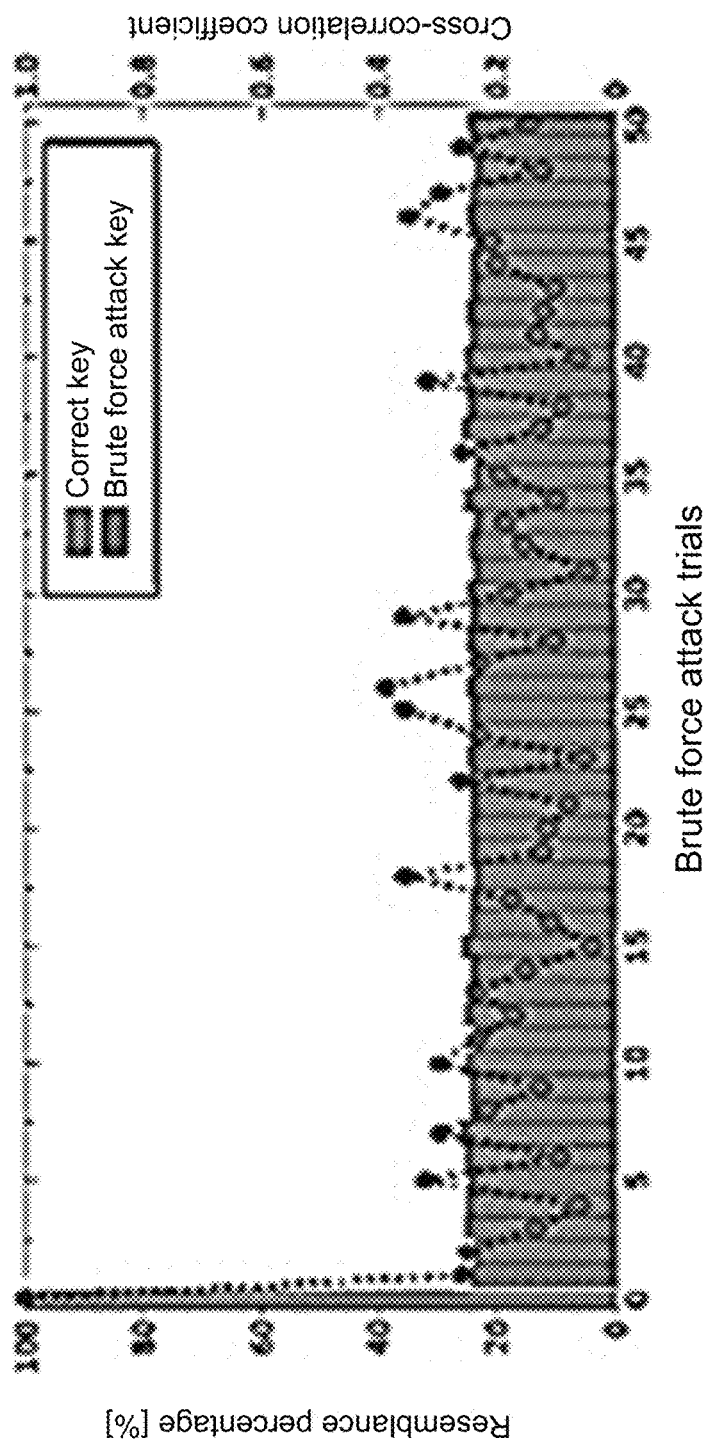
FIG. 12A is a graph summarizing the cross-correlation coefficients between an image decrypted using the correct decryption key and images decrypted using 50 brute force attacks with incorrect random binary masks.
Figure 12C:
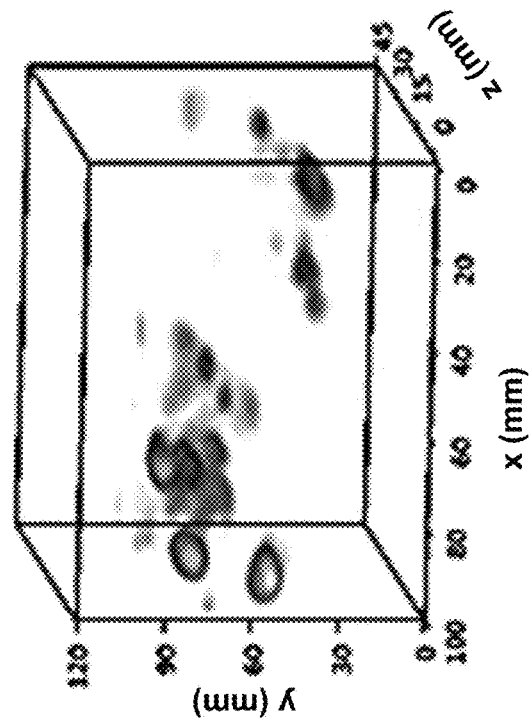
FIG. 12C is a graph illustrating a 3D datacube of the letters "W" and "U" (see FIG. 11A) decrypted using an invalid correct decryption key from one of the brute force attacks presented in FIG. 12A.
Figure 12B:
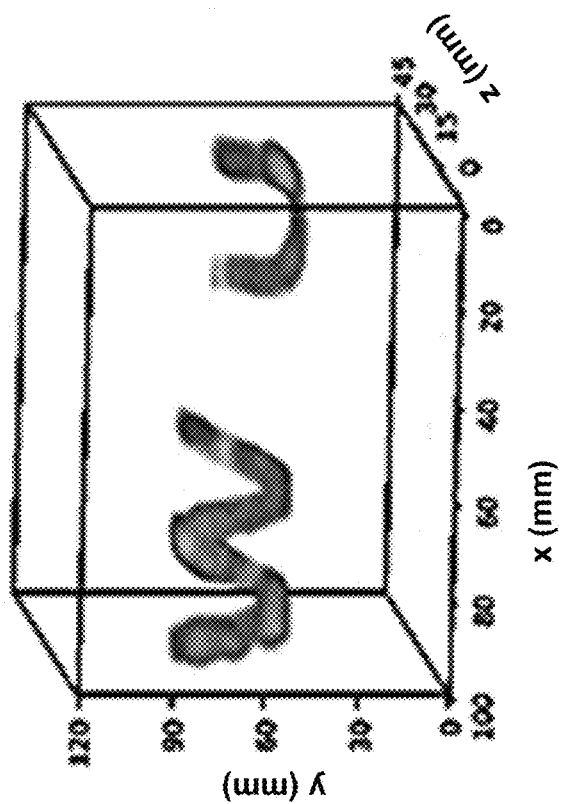
FIG. 12B is a graph illustrating a 3D datacube of the letters "W" and "U" (see FIG. 11A) decrypted using the correct decryption key.

To verify the system's encryption capability, the image quality of the 3D datacubes reconstructed under two types of decryption attacks was compared to a reference image. The static 3D object "WU" was used in these tests. First, a brute force attack was simulated, which attempted to guess the decryption key without any prior information. Pseudo-random binary masks were generated as invalid decryption keys. For each invalid key, the percentage of resemblance to the correct key was calculated. After the reconstruction, the cross correlations between the 3D datacubes based on these invalid keys and the one based on the correct key were calculated to quantify the reconstructed image quality (FIG. 12A). Without the valid decryption key, the reconstructed image quality was largely degraded, as reflected in the decreased correlation coefficients. For direct comparison, the reconstructed 3D datacube of the "WU" target produced by the valid and invalid keys are shown (FIGS. 12B and 12C, respectively). With the correct decryption key, the reconstructed image resembled the object. The image reconstructed using the invalid decryption key, on the contrary, yielded no useful information. In each attack, the reconstruction using the invalid key failed to retrieve the depth information, which demonstrated that the ToF-CUP encryption method is resistant to brute force attacks.

Figure 12D:
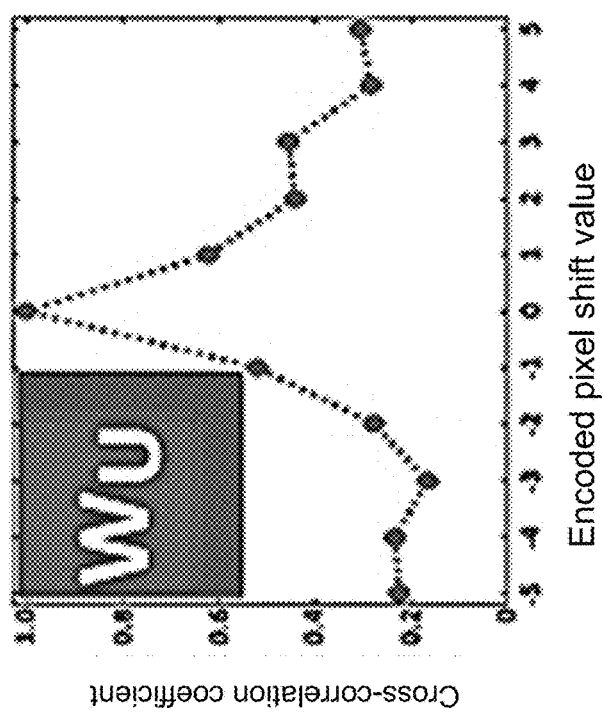
FIG. 12D is a graph summarizing the cross-correlation coefficients between a reconstructed image decrypted using a correct decryption key and a series of images reconstructed using a subset of the correct decryption key with a different horizontal shifts to the left (negative pixel shift values) and to the right (positive pixel shifts).
Figure 12E:
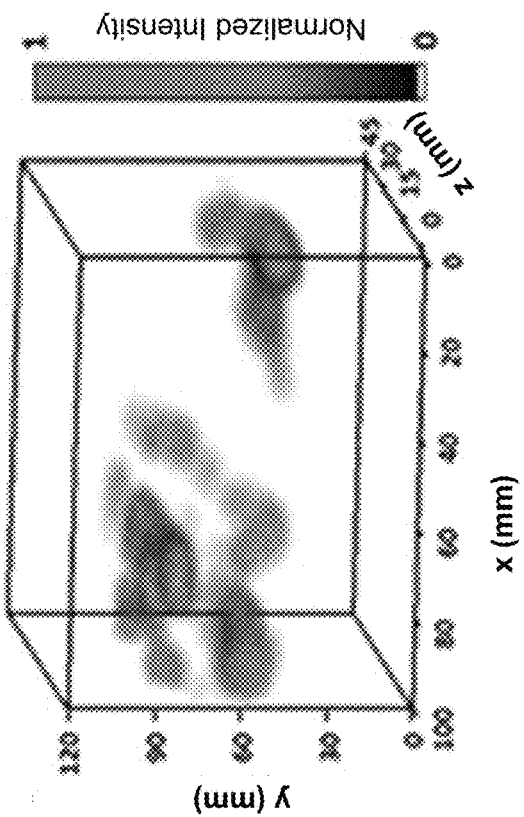
FIG. 12E is a graph illustrating a 3D datacube of the letters "W" and "U" (see FIG. 11A) decrypted using the correct decryption key shifted horizontally by a single encoded pixel.

In addition, the strength of encryption was assessed when part of the encryption key was known, but its position with respect to the encrypted image was unknown. To simulate this situation, a subarea (40×40 encoded pixels in the x and y axes) was selected from the full encryption key (50×50 encoded pixels in the x and y axes) as the decryption key (FIG. 12D). This decryption key was horizontally shifted by various numbers of the encoded pixels. For each shift, the reconstructed 3D datacube was compared with the correct reconstruction result to calculate the cross-correlation coefficient (FIG. 12D). The comparison showed that the reconstruction quality was sensitive to the relative position between the decryption key and the encrypted data (FIG. 12E), demonstrating that ToF-CUP encrypting can protect the information in the 3D datacube even when part of the encryption key is leaked. The reconstructed datacubes from invalid decryption keys contained randomly distributed artifacts, some of which may have high intensity. These artifacts may affect the cross-correlation calculation. However, as shown in FIGS. 12C and 12E, even with seemingly high cross-correlation coefficients, the reconstruction using invalid encryption keys did not resemble the original 3D object.

Example 9: ToF-CUP 3D Images of Moving Objects

Figure 13A:
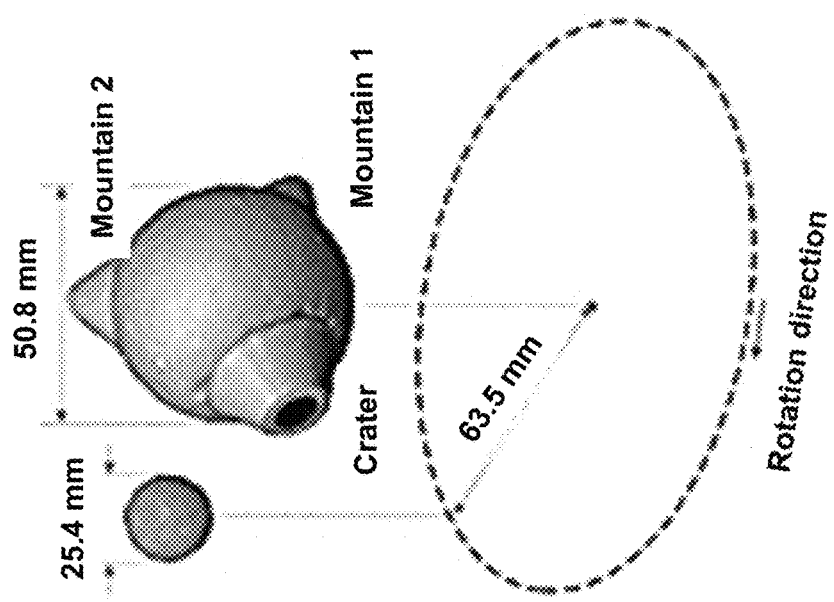
FIG. 13A is a schematic illustration of a target body that includes two rotating balls.
Figure 13B:
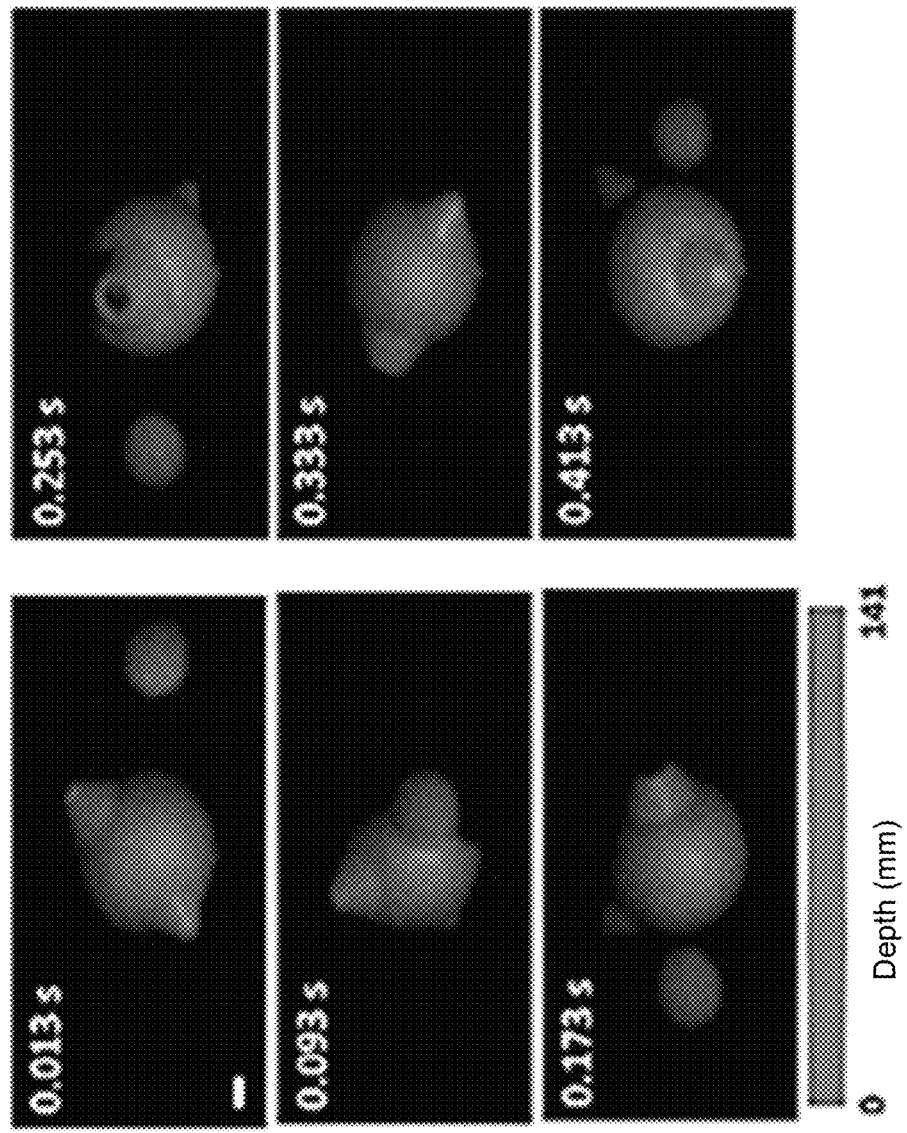
FIG. 13B is a series of representative depth-encoded 3D images obtained at different time points in the motion of the two balls showing the relative depth positions of the two balls.

To demonstrate ToF-CUP's dynamic 3D imaging capability, a rotating object was imaged in real time (FIG. 13A). In the experiment, a foam ball with a diameter of 50.8 mm was rotated by a motorized stage at ~150 revolutions per minute. Two "mountains" and a "crater" were added as features on this object. Another foam ball, 25.4 mm in diameter, was placed 63.5 mm from the larger foam ball and rotated concentrically at the same angular speed. The ToF-CUP camera captured the rotation of this two-ball system by sequentially acquiring images at 75 volumes per second. Once each image was reconstructed to a 3D x, y, z datacube, these datacubes formed a time-lapse 4D x, y, z, is datacube. FIG. 13B shows representative depth-encoded images at six different slow-time points, which revealed the relative depth positions of these two balls.

Example 10: ToF-CUP 3D Images of Live Organisms

Figure 14A:
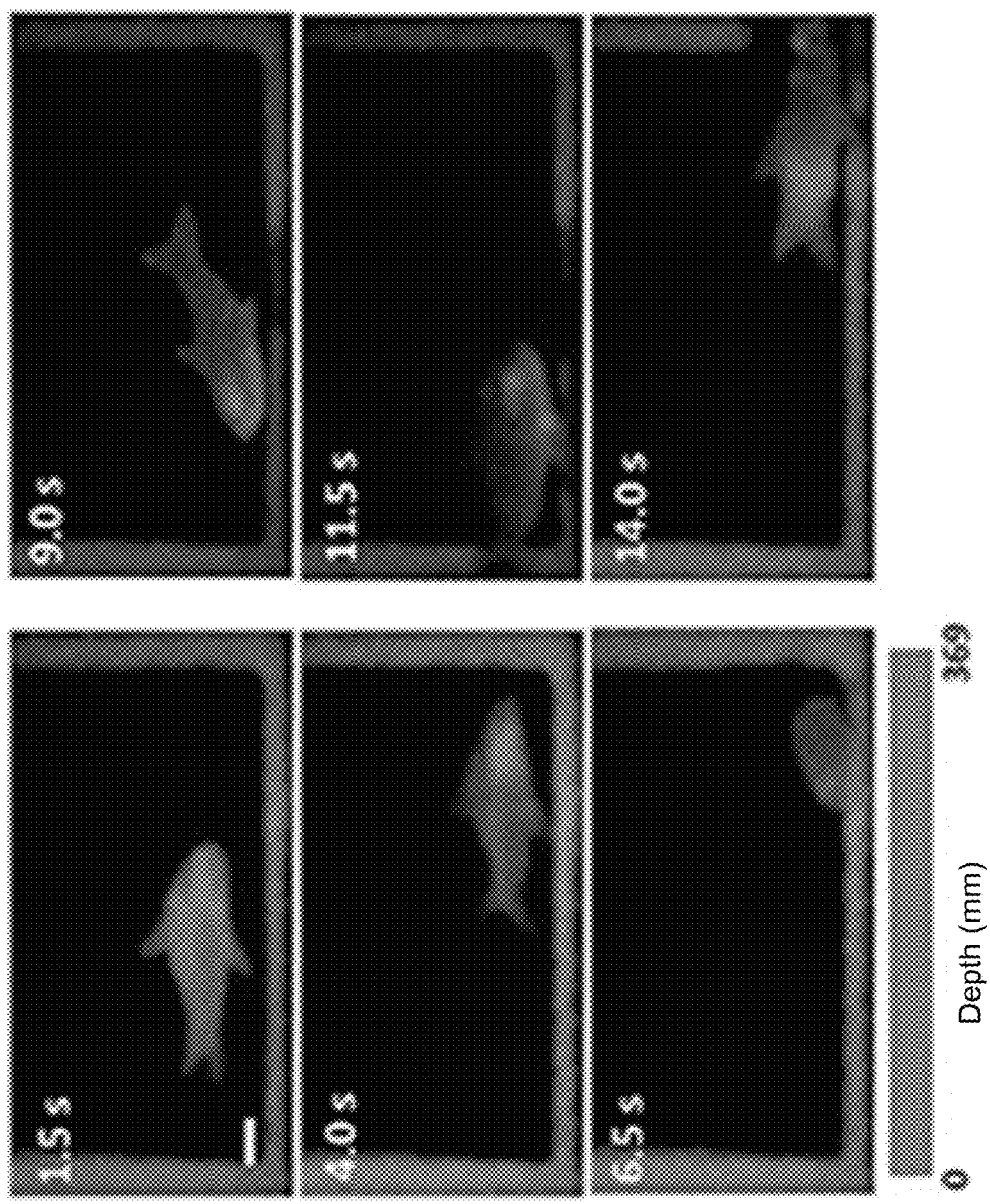
FIG. 14A is a series of representative depth-encoded 3D images of a live comet goldfish swimming in a tank obtained at different time points in the motion of the goldfish.
Figure 14B:
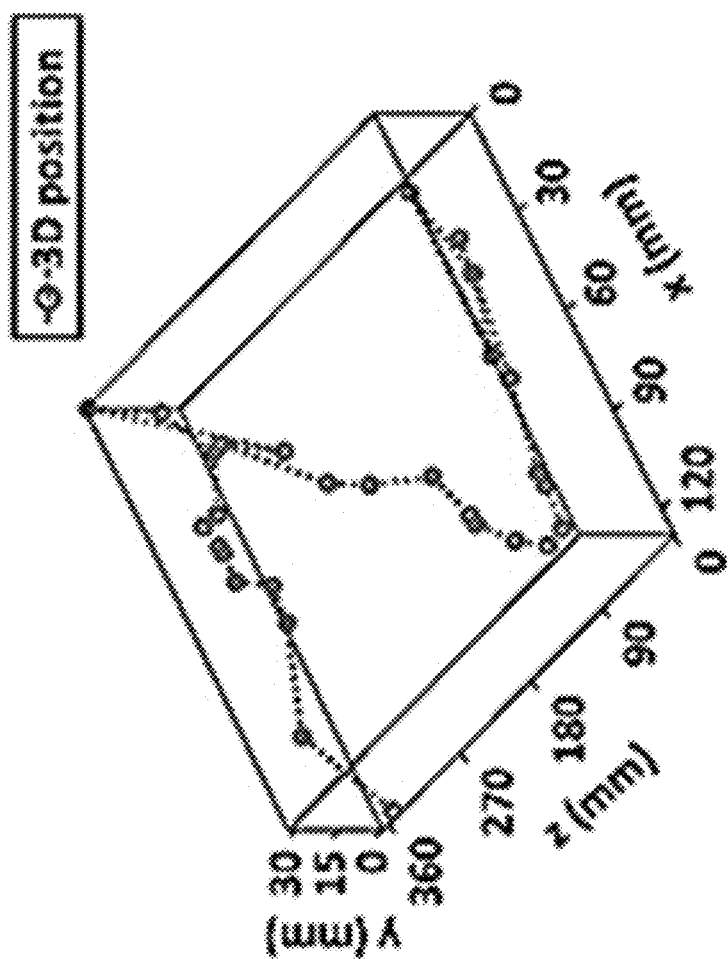
FIG. 14B is graph summarizing changes in 3D position of a goldfish swimming in a tank obtained by the analysis of 3D images obtained using the ToF-CUP system according to one aspect.

To apply ToF-CUP's dynamic 3D imaging capability to biological applications, a swimming comet goldfish (*Carassius auratus*) was imaged. The ToF-CUP camera acquired 3D images at two volumes per second to capture the fish's relatively slow movement over a sufficiently long time. FIG. 14A shows six representative depth-encoded images of the fish. By tracing the centroid of each reconstructed datacube, we demonstrated 3D spatial position tracking of the fish (FIG. 14B). In this representative example, the ToF-CUP camera revealed that the fish first stayed at the rear lower left corner and then moved toward the right, after which it started to move toward the front wall of the fish tank.

In these dynamic 3D imaging experiments, the external CCD camera was operated at a relatively long exposure time to tolerate relatively weak backscattered light. As a result, the movement of objects blurred the reference image. In contrast, because the exposure time of the streak camera is on the nanosecond level, the movement of the object did not noticeably affect the reconstructed datacube. Hence, the lateral and depth resolutions in the reconstructed images were not degraded.

Example 11: ToF-CUP 3D Images of Objects in Scattering Media

Figure 15A:
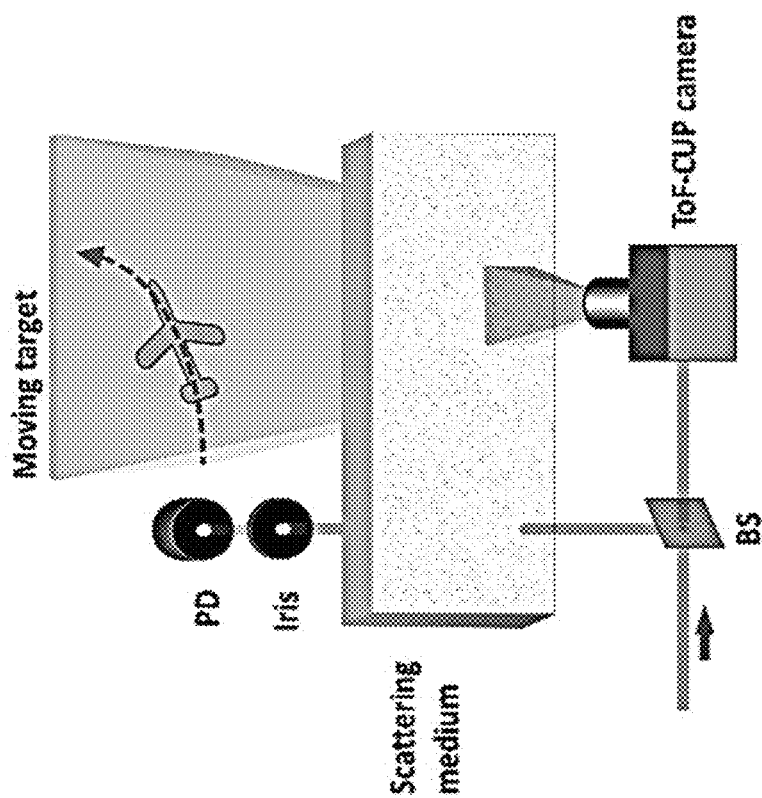
FIG. 15A is a schematic diagram illustrating a moving target in a scattering medium.

To explore ToF-CUP's imaging capability in a real-world environment, the ToF-CUP system was used to image an object moving behind a scattering medium that was composed by adding various concentrations of milk to water in a tank. The experimental setup is illustrated in FIG. 15A. Specifically, the incident laser beam was first de-expanded to ~2 mm in diameter. A beam sampler reflected a small fraction of the energy of the beam toward the tank. After propagating through the scattering medium, the transmitted beam passed through an iris (~2 mm in diameter). Then, the transmitted beam was measured by a photodiode detector to quantify the scattering level in the medium, which is presented as the equivalent scattering thickness in units of the mean free path ($l_t$). The rest of the incident laser beam was sent through the beam sampler and reflected by a mirror to an engineered diffuser (see FIG. 9), which generated widefield illumination of a moving airplane-model target behind the scattering medium. This manually operated airplane-model target moved in a curved trajectory illustrated in FIG. 15A.

Figure 15B:
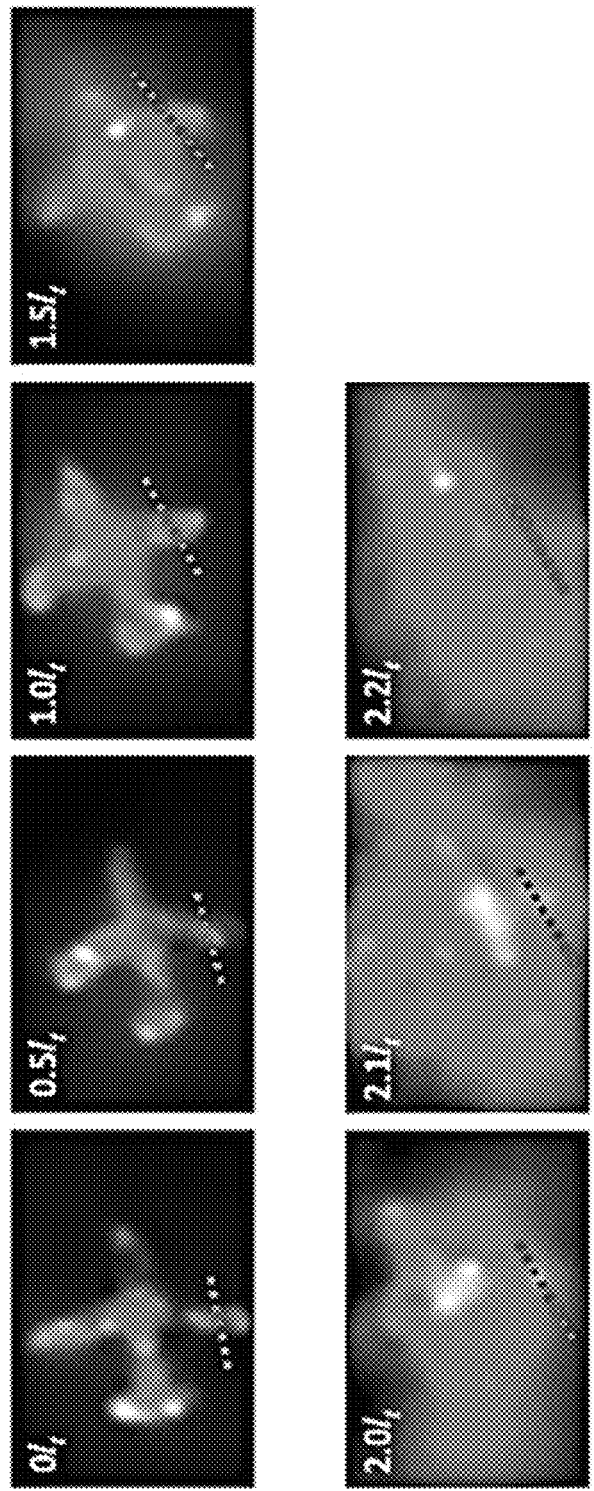
FIG. 15B is a series of images of a moving object in a scattering medium obtained using a ToF CUP 3D imaging system according to one aspect.
Figure 15C:
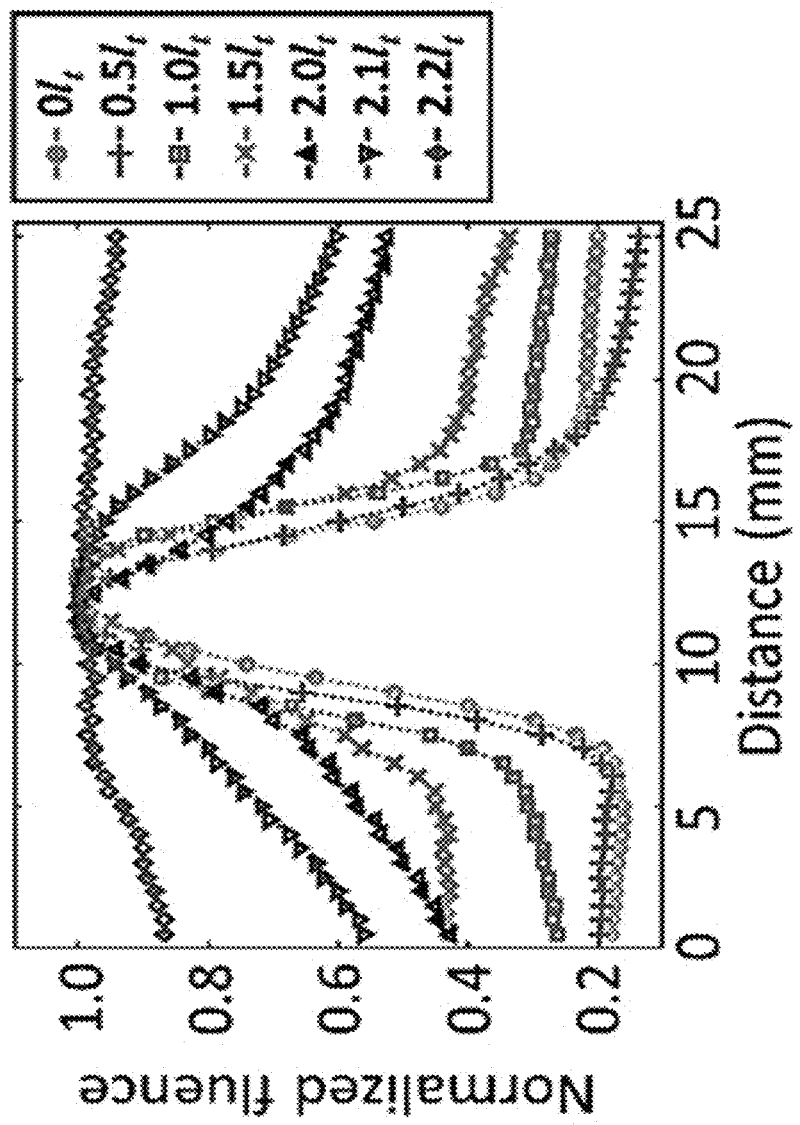
FIG. 15C is a graph summarizing the normalized intensity profiles for a cross section of a target airplane wing at different scattering conditions.
Figure 15D:
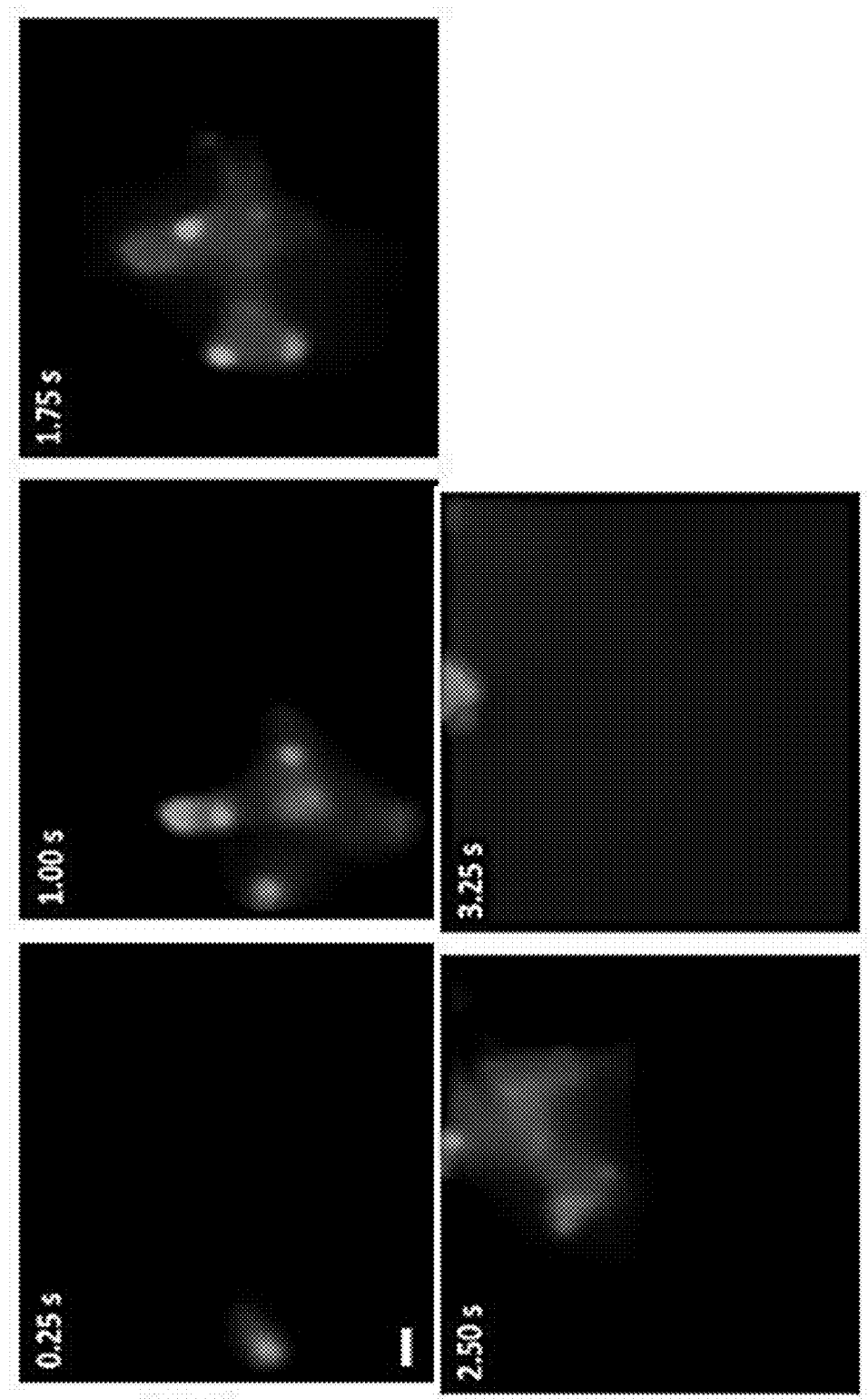
FIG. 15D is a series of images of a moving object in a scattering medium obtained using a ToF CUP 3D imaging system according to one aspect.
Figure 15E:
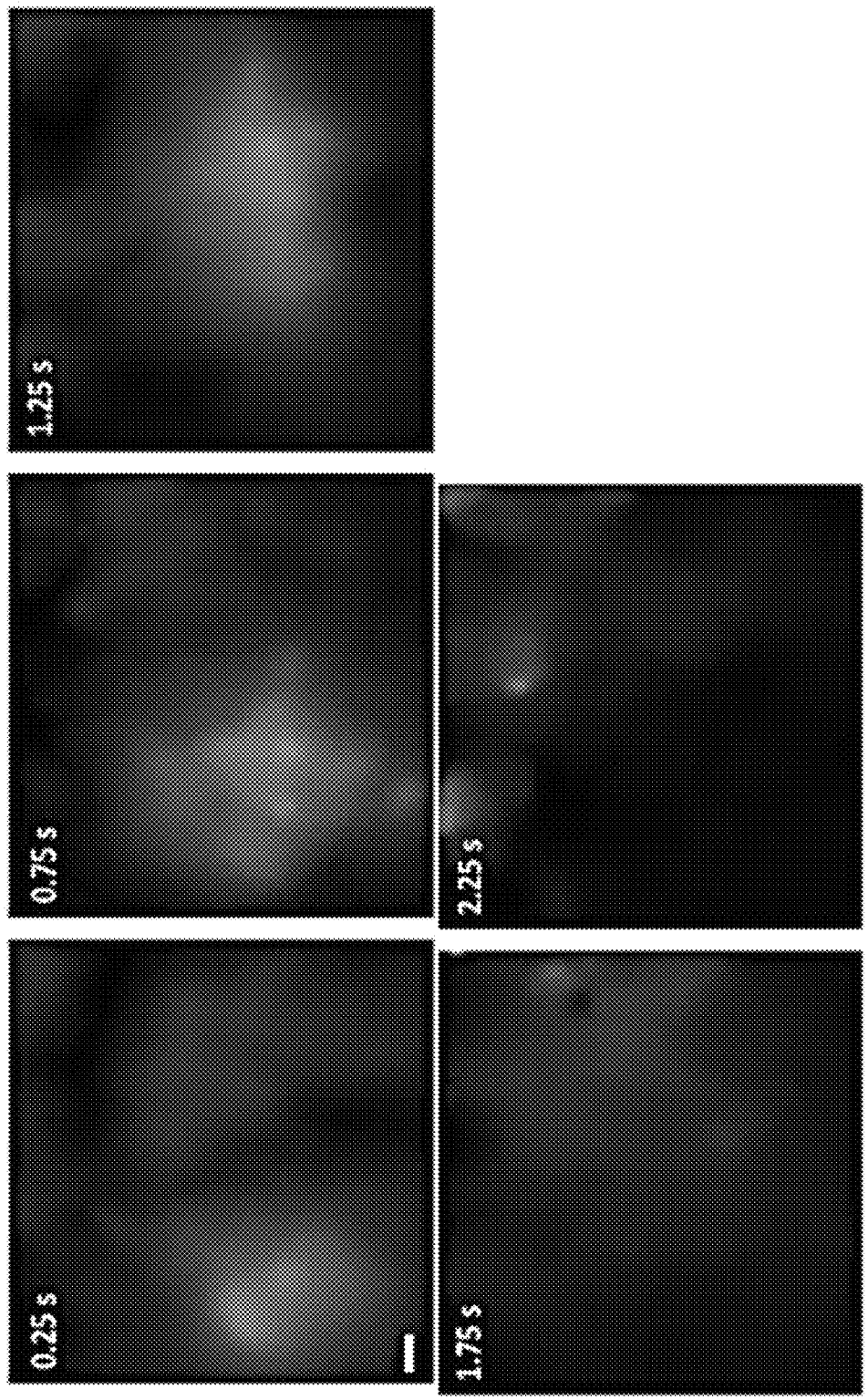
FIG. 15E is a series of images of a moving object in a scattering medium obtained using a ToF CUP 3D imaging system according to one aspect.

The ToF-CUP camera imaged this moving object through the scattering medium with various scattering thicknesses. To quantitatively compare the image quality, we selected a representative reconstructed 3D x, y, z, image at a single slow-time point for each scattering thickness, and summed over the 3D image voxels along the z axis. The resultant projected images are shown in FIG. 15B. In addition, the intensity profile of a cross section of the airplane wing is plotted under these conditions in FIG. 15C. The image contrast decreased with increased scattering in the medium and finally vanishes when the scattering thickness reaches $2.2 l_t$. FIGS. 15D and 15E show representative images of this moving airplane target at five different slow-time points with two scattering thicknesses ($1.0 l_t$ in FIG. 15D and $2.1 l_t$ in FIG. 15E), which record that the airplane-model target moved from the lower left to the upper right, as well as toward the ToF-CUP camera in the depth direction. Although scattering causes loss of contrast and features in the image, the depth can still be perceived. Due to the manual operation, the speed of the airplane-model target was slightly different in each experiment. As a result, the recorded movies with two scattering thicknesses ($1.0 l_t$ and $2.1 l_t$) have different lengths, and so have the selected representative images in FIGS. 15D and 15E.

Example 12: Generation of a Photonic Mach Cone

To test the imaging capabilities of the MV-CUP imaging system and methods described herein above, a photonic Mach cone was generated in a laboratory setting. This photonic Mach cone was theoretically predicted to exist under specific conditions, but had not been directly observed due to the limitations of previous high-speed imaging methods as discussed herein above.

Figure 16:
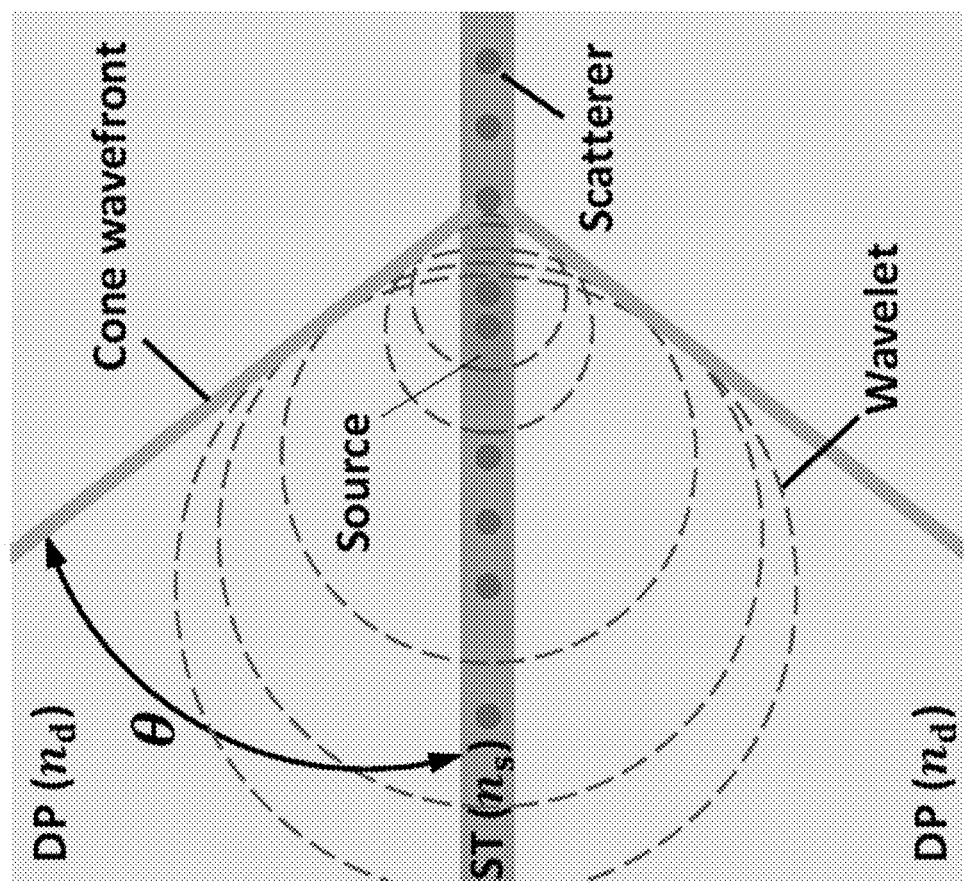
FIG. 16 is a schematic illustration showing generation of a photonic Mach cone, showing a display panel (DP), a source tunnel (ST), a refractive index of the display panel medium (nd), and refractive index of the source tunnel medium (ns) and a semivertex angle of the photonic Mach cone (θ). The photonic Mach cone is produced when ns<nd.

An apparatus for generating a photonic Mach cone was assembled using materials of different refractive indices and scattering coefficients arranged as illustrated schematically in FIG. 16. Specifically, a "source tunnel" (ST) with a refractive index of $n_s$ scatters a collimated laser beam into two "display panels" (DP) with a refractive index of $n_d$ positioned above and below the source tunnel. The scattering events in the source tunnel emit primary wavelets, denoted as dashed circles in FIG. 16, which form a wavefront in the display panels by superposition. When $n_s < n_d$, light propagates faster in the source tunnel than in the display panels, giving rise to a photonic Mach cone due to a superluminal light source. A superluminal light source is defined herein as a light source moving through a medium at a translation speed that is higher than the speed of light propagation in that same medium. The cone boundary is delineated by the common tangents of the primary wavelets, where the wavelets overlap most to produce the greatest intensity. The semivertex angle of the photonic Mach cone, denoted by $\theta$ in FIG. 16, is determined by:

$$\theta = \sin^{-1}\left(\frac{n_s}{n_d}\right) \tag{36}$$

Because the scatterers in the source tunnel are randomly distributed within the cylindrical volume illuminated by the laser beam, whose diameter is greater than the optical wavelength, the scattered light contributes to the overall cone intensity randomly, forming a laser speckle pattern. To obtain the analytical formula describing the intensity distribution of the cone, we first derive the impulse response from a spatiotemporal Dirac delta excitation, travelling at a superluminal speed $c_s$ in the +x direction (FIG. 21):

$$J(r, t) = \frac{c_s}{c_d} \frac{2q}{(q^2 + \rho^2)\sqrt{Y}} \tag{37}$$

where $c_d$ denotes the speed of light in the display panels ($c_d < c_s$), t denotes time, $r = x\hat{x} + y\hat{y} + z\hat{z}$ denotes position in a Cartesian coordinate system, $q = c_s t - x$, $\rho = \sqrt{y^2 + z^2}$, $Y = q^2 - B_0^2 \rho^2$, and $B_0 = \sqrt{(c_s^2 - c_d^2)/c_d^2}$, as described in detail in Ex. 13 below.

For a spatiotemporally arbitrarily shaped pulse, the spatiotemporal distribution of light intensity of the resultant cone can be found by a three-dimensional (3D) convolution:

$$I(r,t) \propto J(r,t) \otimes U(r) \tag{38}$$

where U(r) denotes the 3D snapshot intensity distribution of the excitation pulse, and "$\otimes$" is an operator representing convolution in 3D (see Ex. 13 below). Extending the concept of the Mach number from fluid dynamics, we define the photonic Mach number as:

$$M_p = \frac{c_s}{c_d} \tag{39}$$

Figure 22B:
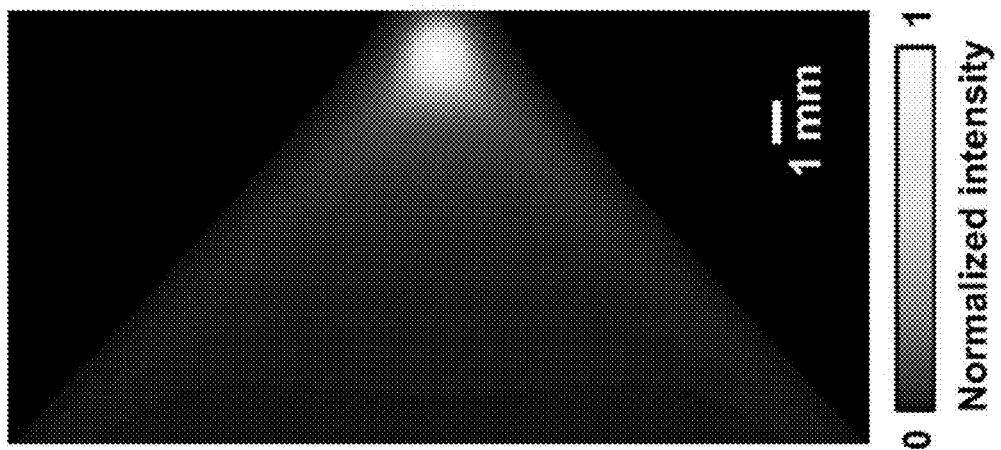
FIG. 22B is a graph showing the normalized light intensity distribution of a cone excited by a Gaussian pulse with Mp=1.4. The Gaussian beam had an intensity full width at half maximum of 1 mm in both the x and y directions.
Figure 22A:
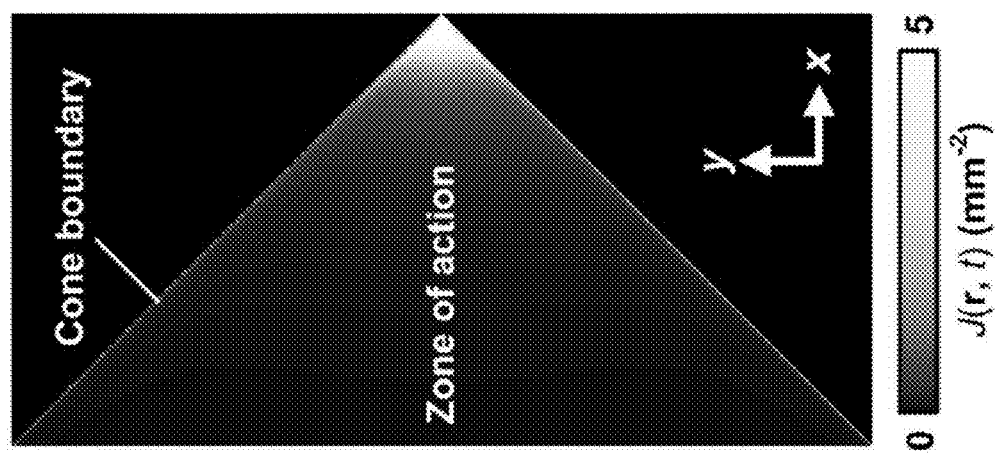
FIG. 22A is a graph showing the impulse response J(r, t) with Mp=1.4 obtained from a numerical simulation of a photonic Mach cone.

As an example, the light intensity distribution corresponding to a superluminal impulse excitation at $M_p = 1.4$ was calculated according to equation (37). The central x-y cross section of the Mach cone is shown in FIG. 22A. The cone edge was defined by setting $Y=0$, where the intensity approached infinity. For a spatiotemporal Gaussian pulse excitation, the intensity distribution of the photonic Mach cone computed by equation (38) is shown in FIG. 22B.

Example 13: Simulation of a Photonic Mach Cone

Figure 17B:
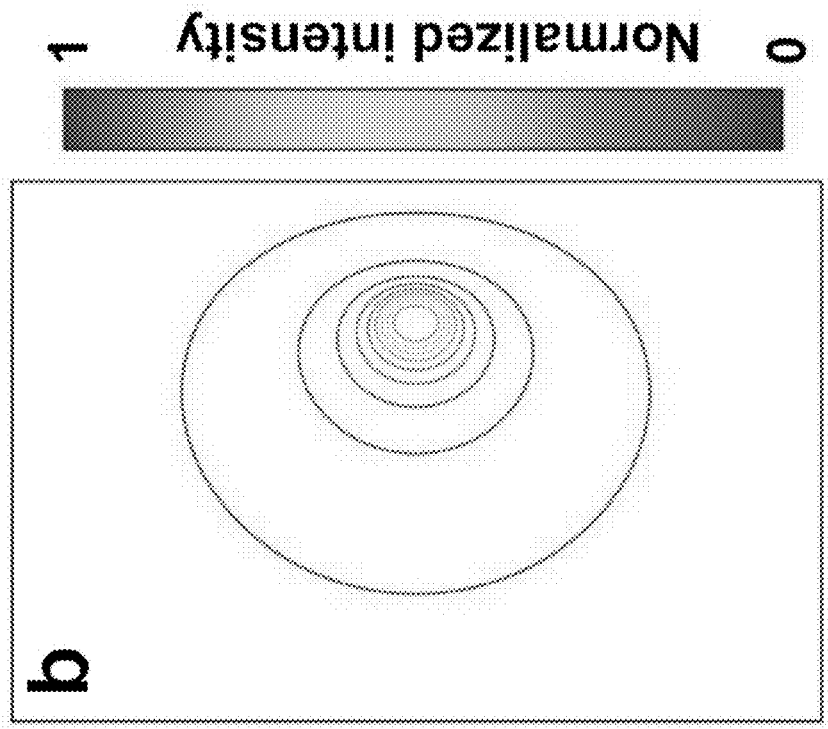
FIG. 17B is a graph showing a contour plot of a light intensity distribution when a laser beam propagates subluminally in a medium with a photonic Mach number of 0.8 as estimated by a Monte Carlo simulations of light intensity distributions on a thin scattering sheet under subluminal conditions in which the excitation light pulses are spatiotemporally Gaussian and propagate along the +x direction.
Figure 17A:
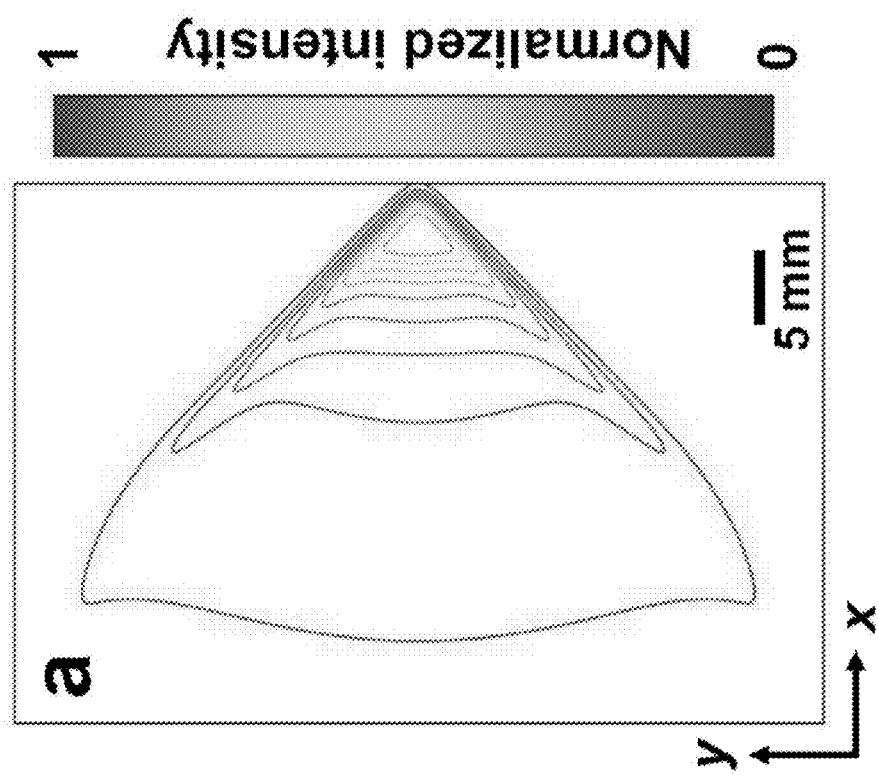
FIG. 17A is a graph showing a contour plot of a light intensity distribution when a laser beam propagates superluminally in a medium with a photonic Mach number of 1.4 as estimated by a Monte Carlo simulations of light intensity distributions on a thin scattering sheet under superluminal conditions in which the excitation light pulses are spatiotemporally Gaussian and propagate along the +x direction.

The photonic Mach cone described in Ex. 12 above also numerically evaluated using a Monte Carlo method. Both superluminal ($M_p = 1.4$) and subluminal ($M_p = 0.8$) light propagations were simulated. Briefly, an infinitely narrow source beam propagated through a thin scattering sheet with a speed of $c_s$ along the +x direction. During the propagation, $10^5$ simulated scattering events were randomly triggered with a uniform probability distribution. Each scattering event emitted an outgoing primary wavelet, which contributed to the total light intensity distribution. The resultant light intensity distribution was then convolved with a normalized spatiotemporal Gaussian function representing the finiteness of the laser pulse. FIGS. 17A and 17B show contour plots of the scattered light intensity distributions on the sheet for the superluminal simulation and the subluminal simulation, respectively. Under the superluminal condition (FIG. 17A), the contours depicted a nearly triangular region dragged behind the excitation pulse, representing a photonic Mach cone. Under the subluminal condition (FIG. 17B), however, no such cone was formed. As illustrated in FIG. 17B, the expanding primary wavelets always the excitation pulse, preventing the formation of a photonic Mach cone.

Figure 21:
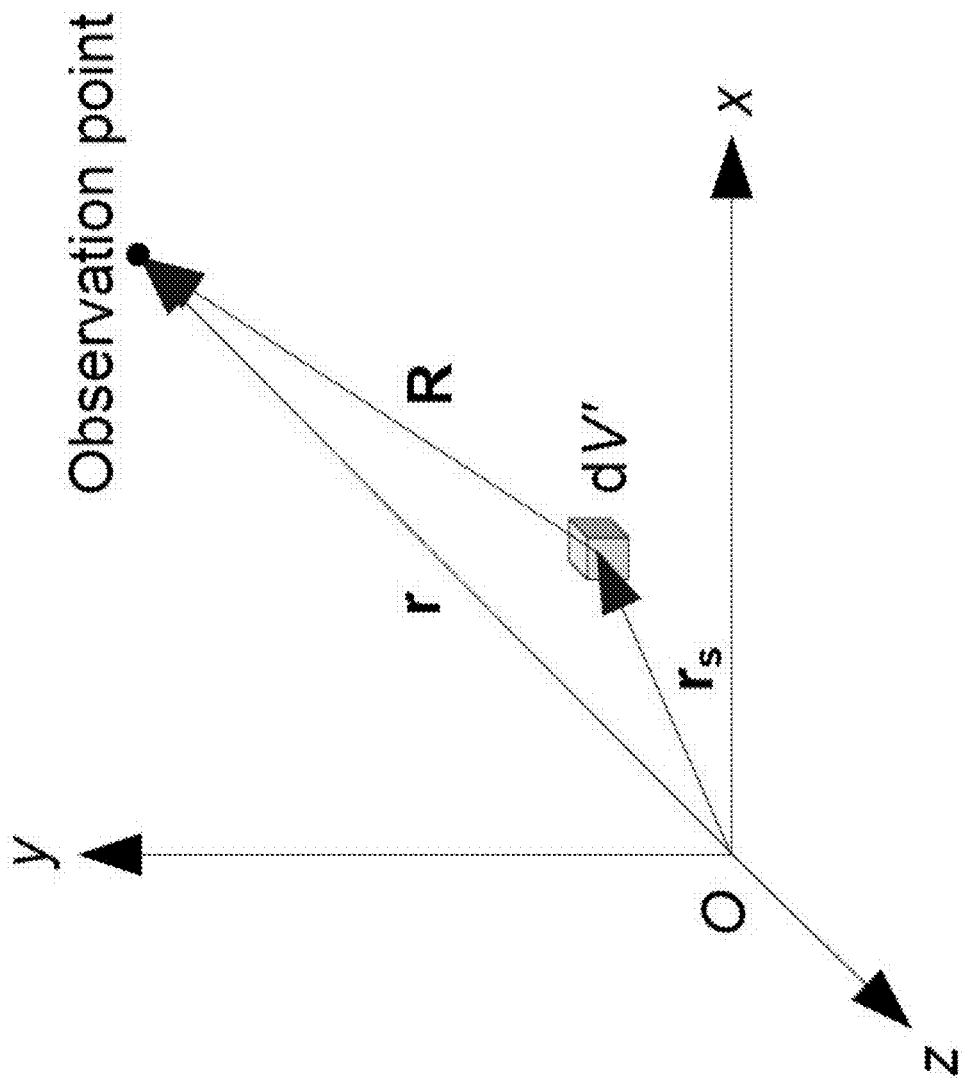
FIG. 21 is a graph showing the Cartesian coordinates used for analyzing the photonic Mach cone.

The Cartesian coordinates used to develop the mathematical formulation of the simulated photonic Mach cone is illustrated in FIG. 21. The source was located at $r_s$, labeled by ($x_s$, $y_s$, $z_s$), and the observation was made at r, labeled by (x, y, z). $R = r - r_s$ denoted a vector pointing from the source to the observation point.

The incident laser pulse experienced light scattering in an elementary volume dV', located at $r_s$. The excited scatterers had a number density N, an average radius α, and a refractive index $n_{sc}$. The wave vector of the incident beam was defined as k. If kα<<1, the scattering may be treated in the context of Rayleigh scattering. The z=0 plane was chosen to display the photonic Mach cone in this simulation, and light was defined to be polarized along the z axis. This condition eliminated the angular dependence of the scattered light distribution on the z=0 plane. Moreover, the electric fields originating from the randomly distributed scatterers were considered to be uncorrelated due to the random and variable (>2π (on average) phase delays from the scatterers to the observation point. As a result of these assumptions, fully developed speckles are formed. Therefore, the final light distribution was calculated by adding the intensity values from the scatterers. The expected light intensity contributed by the elementary volume dV' can be expressed as:

$$dI = \frac{k^4 a^6}{|R|^2} \Delta_n^2 I_0 N dV' \quad (40)$$

where $I_0$ is the incident light intensity and $\Delta_n = (n_{sc}^2 - n_s^2)/(n_{sc}^2 + 2n_s^2)$.

It was assumed that the incident light pulse has a Gaussian intensity distribution along the x, y, and z axes and travels along the +x direction at a speed $c_s$, which exceeds the speed in the display panels, $c_d$. The total light intensity at r was therefore:

$$I(r, t) = k^4 a^6 \Delta_n^2 I_0 N \quad (41)$$

$$\int\int\int \frac{1}{|R|^2} \exp\left[-\frac{y_s^2}{2\sigma_y^2} - \frac{z_s^2}{2\sigma_z^2} - \frac{\left(x_s + \frac{c_s}{c_d}|R| - c_s t\right)^2}{2\sigma_x^2}\right] dx_s dy_s dz_s$$

In equation (41), $\sigma_i$ (i=x, y, z) denoted the pulse width along direction i, the term $-c_s t$ implied travelling along the +x direction, and $c_s|R|/c_d$ accounted for the retarded response at the observation point. The magnitude of R can be calculated from $|R|=\sqrt{(x-x_s)^2+(y-y_s)^2+(z-z_s)^2}$, and was thereafter denoted by a real number R.

Equation (41) can be rewritten in a time-convolution form as:

$$I(r, t) = k^4 a^6 \Delta_n^2 I_0 N \int\int\int dx_s dy_s dz_s \int d\tau \frac{\delta\left(t - \tau - \frac{R}{c_d}\right)}{R^2} \exp \quad (42)$$

$$\left[-\frac{y_s^2}{2\sigma_y^2} - \frac{z_s^2}{2\sigma_z^2} - \frac{(x_s - c_s\tau)^2}{2\sigma_x^2}\right],$$

where δ(·) was the Dirac delta function.

Variable substitutions defined by Eq. (43) were used to produce an expression for I(r, t) in a spatial convolution form:

$$\Delta y = y - y_s, \Delta z = z - z_s, \text{ and } \Delta x = x - x_s + c_s\tau \quad (43)$$

$$I(r, t) = k^4 a^6 \Delta_n^2 I_0 N \int\int\int d\Delta x d\Delta y d\Delta z \left[\int d\tau \frac{\delta\left(t - \tau - \frac{R}{c_d}\right)}{R^2}\exp\right. \quad (44)$$

$$\left.\left\{-\left[\frac{(x-\Delta x)^2}{2\sigma_x^2} + \frac{(y-\Delta y)^2}{2\sigma_y^2} + \frac{(z-\Delta z)^2}{2\sigma_z^2}\right]\right\}\right]$$

The time integration over τ in the bracket on the right-hand side of equation (44) can be interpreted as a temporal impulse response of the system, yielding a closed-form solution by setting $\Delta\rho^2 = \Delta y^2 + \Delta z^2$:

$$J(\Delta x, \Delta y, \Delta z, t) = \int \frac{\delta\left(t - \tau - \frac{\sqrt{\Delta\rho^2 + (\Delta x - c_s\tau)^2}}{c_d}\right)}{\Delta\rho^2 + (\Delta x - c_s\tau)^2} d\tau. \quad (45)$$

Equation (45) can be evaluated by:

$$J = \sum_{i=1}^{2} \frac{f(\tau_i)}{|g'(\tau_i)|}, \quad (46)$$

where $$f(\tau) = \frac{1}{\Delta\rho^2 + (\Delta x - c_s\tau)^2}, \quad (47)$$

$$g(\tau) = t - \tau - \frac{\sqrt{\Delta\rho^2 + (\Delta x - c_s\tau)^2}}{c_d}, \quad (48)$$

$$g'(\tau) = -1 - \frac{c_s^2\tau - c_s x}{c_d\sqrt{\Delta\rho^2 + (\Delta x - c_s\tau)^2}}, \quad (49)$$

and $\tau_i$ are the solutions of g(τ)=0, which are found to be:

$$\tau_{1,2} = \frac{1}{B_0^2}\left(\frac{xc_s}{c_d} - t \pm \frac{\sqrt{Y}}{c_d}\right). \quad (50)$$

In equation (50), $$Y = q^2 - B_0^2 \Delta\rho^2 \quad (51)$$

where $$q = c_s t - \Delta x, \text{ and} \quad (52)$$

$$B_0 = \sqrt{\frac{c_s^2 - c_d^2}{c_d^2}} \text{ is the Prandtl-Glauert coefficient.} \quad (53)$$

It should be noted that according to equation (45), the location of the excitation impulse is $\Delta x(t)=c_s t$ at the time point t, so both solutions $\Delta x(t)=c_s t$ should satisfy:

$$\tau_i \leq t \text{ for } z \leq c_s t, \quad (54)$$

which can be verified by simple algebra.

Setting equation (48) to zero, we get the relationship:

$$c(t-\tau_i)=\sqrt{\Delta\rho^2 \times (\Delta x - c_s\tau)^2} \quad (55)$$

by inserting Equations (47), (49), (50), and (51) into equation (46).

After mathematical manipulations, the closed-form solution may be obtained for the impulse response, expressed as $$J = \frac{c_s}{c_d} \frac{2q}{(q^2 + \Delta\rho^2)\sqrt{Y}}. \quad (56)$$

Equation (56) describes the shape of the cone. The cone boundary is defined by setting Y=0. Inserting equation (51), we can easily verify the cone angle (see equation (36)). On the cone boundary, the impulse response intensity theoretically goes to infinity (see equation (56)).

FIG. 22A is a map of the simulated impulse response for a photonic Mach number of $M_p$=1.4. For display purposes, large values near the cone boundary were saturated to 5 mm$^{-2}$. By inserting equation (56) into equation (44) (see equation (38)) and numerically evaluating the volumetric integral, the exact expected intensity distribution of the photonic Mach cone was determined.

FIG. 22B depicts the intensity distribution of a cone excited by a Gaussian pulse in the z=0 plane. In the simulation, it was assumed $M_p$=1.4 and the intensity full-width at half-maximum (FWHM) of the pulse was 1 mm in both x and y directions.

Example 14: Monte Carlo Simulation of a Photonic Mach Cone

A theoretical model similar to the simulation described in Ex. 13 was used in a Monte Carlo simulation to characterize a Mach cone of finite duration, in which the Mach cone underwent a build-up process before reaching its steady state. To account for this dynamic process, the experimentally investigated superluminal condition ($M_p$=1.4) and subluminal condition ($M_p$=0.8) were we simulated using the Monte Carlo method.

To reduce computational complexity, a thin scattering sheet with negligible thickness was assumed to perform the simulation in 2D. Having a uniform scattering coefficient, this scattering sheet had dimensions of 37.5 mm×50 mm. Light excitation was introduced from left to right along the central line of the sheet. An infinitely narrow beam entered the left edge of the sheet, traveled along the +x direction with a speed of $c_s$, and encountered a sequence of scattering events during its propagation. The location of each scattering event was randomly determined, with a uniform probability density distribution along the x axis.

Each scattering event emitted an outgoing spherical wave, which subsequently deposited photons with energy 1/R$^2$ within those voxels positioned a distance R=$c_d$(t–$t_s$) away from the scatterer, with $t_s$ being the instant of that particular scattering event. The above scattering process was repeated as t progressed, and all voxels accumulated photons according to the procedure above until the beam exited the right edge of the sheet. A total of 10$^5$ scattering events were used in each simulation. The accumulated results were convolved with a Gaussian probability density function in 2D (i.e., x and y axes) to simulate excitation by a spatiotemporally finite pulse. The numerical results, shown in FIGS. 17A and 17B for the superluminal and subluminal simulations, respectively, were consistent with the experimental results presented in Ex. 15 below.

Example 15: Real-Time Imaging of a Photonic Mach Cone

To characterize the real-time development and propagation of a photonic Mach cone, the following experiments were conducted.

The apparatus for producing a photonic Mach cone described in Ex. 12 was used to produce the photonic Mach cone for these experiments. As described previously in Ex. 12, the apparatus was a thin scattering plate assembly containing a central source tunnel sandwiched by two display panels, as illustrated in FIG. 16. Air mixed with dry ice fog scatterers was used as the medium for the source tunnel ($n_s$=1.0), and silicone rubber ($n_d$=1.4) mixed with scattering aluminum oxide powder was used as the medium for the display panels.

A collimated laser pulse (532 nm wavelength, 7 ps pulse duration) propagated through the source tunnel to produce a photonic Mach cone with an expected semivertex angle of 45 degrees (see equation (36)) in the display panels. The scattering in the plate assembly made the photonic Mach cone visible to the MV-CUP camera.

A single light pulse was launched into the source tunnel and the light distribution was imaged in real time using the MV-CUP imaging system described herein above. Because the MV-CUP imaging system obtains all images from a single event, no averaging or gating over multiple laser pulses was required. FIGS. 19A, 19B, 19C, and 19D shows four representative time-lapse frames of the light distribution, showing a propagating photonic Mach cone at 0 ps, 40 ps, 80 ps, and 120 ps, respectively. The central x-y cross section of the photonic Mach cone was displayed by the scattering plate assembly. The cone edge was seen as two light tails extending from the tip of the propagating laser pulse in the source tunnel, forming a V-shaped wedge. The semivertex angle, directly measured in these temporal frames, was ~45 degrees, in agreement with the theoretical value predicted using Equation (36).

A subluminal control experiment was conducted using a similar apparatus to the apparatus described above, but with high-refractive-index liquid oil ($n_s$=1.8) as the medium for the source tunnel. Because this source tunnel medium has a greater refractive index than the display panel medium, with an $M_p$=0.8, no photonic Mach cone was produced, as shown in FIGS. 20A, 20B, 20C, and 20D, which correspond to FIGS. 19A, 19B, 19C, and 19D, respectively.

The geometry of the photonic Mach cone observed in these experiments was similar to that of a sonic boom. Although both sonic booms and photonic Mach cones result from the addition of primary wavelets from supersonic or superluminal sources, respectively, the mechanisms by which these structures are generated differ. While any homogeneous acoustic medium can support a supersonic source, two different optical materials with different refraction indices were used for the source tunnel and display panels to produce a superluminal source.

In addition, the waves forming sonic booms and photonic Mach cones propagate differently. For sound, while a supersonic object progressively builds up the pressure in the surrounding medium, the subsequent nonlinear pressure propagation at amplitude-dependent speed reshapes the wavefront, resulting in an abrupt rising edge in pressure. In comparison, the photonic Mach cone was observed to form linearly without sharpening of the wavefront. Although observed as a "flash", the photonic Mach cone did not represent a shock wave but instead was characterized by a duration defined by the incident laser pulse width.

Further, the photonic Mach cone imaged using the MV-CUP system was a speckle pattern due to the randomly distributed scatterers. Statistically, the expected spatiotemporal intensity distribution of the cone resulted from the intensity addition of wavelets. Nevertheless, intensity addition did not undermine the formation of the photonic Mach cone as predicted theoretically and verified experimentally.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A multi-view compressed-sensing ultrafast photography system to obtain a series of final recorded images of an object, the system comprising:
    a spatiotemporal integrating module to receive a first series of object images and to produce a spatiotemporally integrated image;
    a spatial encoding module to receive the first series of object images and to produce a second series of spatially encoded images, each spatially encoded image of the second series comprising a first view comprising one object image of the first series superimposed with a pseudo-random binary spatial pattern and a second view comprising the one object image of the first series superimposed with a complementary pseudo-random binary spatial pattern, wherein the first view and the second view are positioned in spatially separate regions within an entire field of view; and
    a temporal encoding module operatively coupled to the spatial encoding module, the temporal encoding module configured to receive the entire field of view of each spatially encoded image of the second series, to deflect each spatially encoded image by a temporal deflection distance proportional to time-of-arrival, and to record each deflected image as a third series of spatially/temporally encoded images, each spatially/temporally encoded image of the third series comprising the first view and the second view of one spatially encoded image of the second series deflected by the temporal deflection distance.

2. The system of claim 1, wherein the series of final recorded images are obtained with a frame rate of up to about 1 billion frames per second from a single event.

3. The system of claim 2, wherein the spatial encoding module comprises a digital micromirror device comprising an array of micromirrors, each micromirror configured to reflect a portion of the object image at a deflection angle according to the pseudo-random binary pattern.

4. The system of claim 3, wherein the deflection angle consists of a first angle and a second angle, wherein the first view comprises all portions of the one object image of the first series reflected at the first angle and the second view comprises all portions of the one object image of the first series reflected at the second angle.

5. The system of claim 3, wherein the temporal encoding module comprises a time-shearing camera comprising an entrance and a detector:
    receive an entire field of view of each spatially encoded image of the second series through the entrance;
    deflect each spatially encoded image by a temporal deflection distance to produce each deflected image of the third series of spatially/temporally encoded images, wherein the temporal deflection distance is proportional to the time-of-arrival of each spatially encoded image; and
    receive and record each deflected image of the third series of spatially/temporally encoded images at the detector.

6. The system of claim 5, wherein the system further includes an optical module to direct the first series of object images to the spatiotemporal integrating module and to the spatial encoding module, and to direct the second series of spatially encoded images to the temporal encoding module.

7. The system of claim 6, wherein the optical module comprises a camera lens operatively coupled to a beam splitter, a first tube lens operatively coupled to the beam splitter, a stereoscope objective operatively coupled to the first tube lens via a mirror, and to a second and a third tube lens, wherein:
    the camera lens receives the first series of object images;
    the stereoscope objective is operatively coupled to the spatial encoding module to deliver the first series of object images to the digital micromirror device and to receive the second series of spatially encoded images;
    the second and third tube lenses are operatively coupled to the temporal encoding module to receive the first and second views, respectively, of the second series of spatially encoded images, and to deliver the first and second views to the entrance of the time-shearing camera via a second and a third mirror.

8. A method of obtaining a series of final recorded images of an object using a multi-view compressed-sensing ultrafast photography system at a rate of up to one billion frames per second, the method comprising:
    collecting a first series of object images;
    superimposing a pseudo-random binary spatial pattern and a complementary pseudo-random binary spatial pattern onto each object image of the first series to produce a first view and a second view, respectively, of a second series of spatially encoded images;
    deflecting each spatially encoded image of the second series by a temporal deflection distance proportional to a time-of-arrival of each spatially encoded image;
    recording each deflected spatially encoded image as a third series of spatially/temporally encoded images; and
    reconstructing a fourth series of final object images by processing each spatially/temporally encoded image of the third series according to an image reconstruction algorithm.

* * * * *